United States Patent [19]

Taylor et al.

[11] Patent Number: 5,553,310
[45] Date of Patent: Sep. 3, 1996

[54] SPLIT TRANSACTIONS AND PIPELINED ARBITRATION OF MICROPROCESSORS IN MULTIPROCESSING COMPUTER SYSTEMS

[75] Inventors: Mark Taylor, Houston; Paul R. Culley, Cypress; Maria L. Melo; Roger E. Tipley, both of Houston, all of Tex.

[73] Assignee: Compaq Computer Corporation, Houston, Tex.

[21] Appl. No.: 955,930

[22] Filed: Oct. 2, 1992

[51] Int. Cl.$^6$ .............................. G06F 13/14; G06F 13/18
[52] U.S. Cl. ......................... 395/860; 395/728; 395/478; 395/550; 370/85.6; 364/230; 364/230.1; 364/242.6; 364/242.92
[58] Field of Search ................................... 395/200, 325, 395/275, 550, 425, 478, 728, 860; 364/900; 370/85

[56] References Cited

U.S. PATENT DOCUMENTS

| | | | |
|---|---|---|---|
| 4,257,095 | 3/1981 | Nadir | 364/200 |
| 4,395,710 | 7/1983 | Einolf, Jr. et al. | 340/825.5 |
| 4,402,040 | 8/1983 | Evett | 364/200 |
| 4,417,302 | 11/1983 | Chimienti et al. | 364/200 |
| 4,463,445 | 7/1984 | Grimes | 364/900 |
| 4,554,628 | 11/1985 | Bell . | |
| 4,556,939 | 12/1985 | Read | 364/200 |
| 4,560,985 | 12/1985 | Strecker et al. | 340/825.5 |
| 4,571,672 | 2/1986 | Hatada et al. | 364/200 |
| 4,663,756 | 5/1987 | Retterath | 370/85 |
| 4,719,458 | 1/1988 | Miesterfeld et al. | 340/825.5 |
| 4,727,479 | 2/1988 | Kirrmann | 364/200 |
| 4,739,323 | 4/1988 | Miesterfeld et al. | 340/825.5 |
| 4,748,586 | 5/1988 | Bonci | 364/900 |
| 4,750,168 | 6/1988 | Trevitt | 370/85 |
| 4,755,938 | 7/1988 | Takahashi et al. | 364/200 |
| 4,779,089 | 10/1988 | Theus | 340/825.5 |
| 4,785,394 | 11/1988 | Fischer | 364/200 |
| 4,787,033 | 11/1988 | Bomba et al. | 364/200 |
| 4,800,484 | 1/1989 | Baize et al. | 364/200 |
| 4,858,173 | 8/1989 | Stewart et al. | 364/900 |
| 4,920,486 | 4/1990 | Nielsen | 364/200 |

(List continued on next page.)

FOREIGN PATENT DOCUMENTS

| | | |
|---|---|---|
| 04374521 | 6/1990 | European Pat. Off. . |
| 0426183 | 5/1991 | European Pat. Off. . |
| 0432978 | 6/1991 | European Pat. Off. . |
| WO88/02150 | 3/1988 | WIPO . |
| WO91/20041 | 12/1991 | WIPO . |
| WO91/2041 | 12/1991 | WIPO . |

*Primary Examiner*—Thomas C. Lee
*Assistant Examiner*—Rehana P. Kriek
*Attorney, Agent, or Firm*—Pravel, Hewitt, Kimball & Krieger

[57] ABSTRACT

Three prioritization schemes for determining which of several CPUs receives priority to become bus master of a host bus in a multiprocessor system, and an arbitration scheme for transferring control from one bus master to another. Each prioritization scheme prioritizes n elements, where a total of (n/2)×(n−1) priority bits monitors the relative priority between each pair of elements. An element receives the highest priority when each of the n−1 priority bits associated with that element points to it. In the arbitration scheme, the current bus master of the host bus determines when transfer of control of the host bus occurs as governed by one of the prioritization schemes. The arbitration scheme gives EISA bus masters, RAM refresh and DMA greater priority than CPUs acting as bus masters, and allows a temporary bus master to interrupt the current bus master to perform a write-back cache intervention cycle. The arbitration scheme also supports address pipelining, bursting, split transactions and reservations of CPUs aborted when attempting a locked cycle. Address pipelining allows the next bus master to assert its address and status signals before the beginning of the data transfer phase of the next bus master. Split transactions allows a CPU posting a read to the EISA bus to arbitrate the host bus to another device without re-arbitrating for the host bus to retrieve the data. The data is asserted on the host bus when it is idle even if the host bus is being controlled by another device.

9 Claims, 24 Drawing Sheets

U.S. PATENT DOCUMENTS

| | | | |
|---|---|---|---|
| 4,953,081 | 8/1990 | Feal et al. | 364/200 |
| 4,964,034 | 10/1990 | Jaskowiak | 364/200 |
| 4,967,344 | 10/1990 | Scavezze et al. | 364/200 |
| 4,980,854 | 12/1990 | Donaldson et al. | 364/900 |
| 4,987,529 | 1/1991 | Craft et al. | 364/200 |
| 5,067,071 | 11/1991 | Schanin et al. | 395/275 |
| 5,127,089 | 6/1992 | Gay et al. | 395/325 |
| 5,148,112 | 9/1992 | Gahan | 328/110 |
| 5,151,994 | 9/1992 | Willie et al. | 395/800 |
| 5,168,570 | 12/1992 | Eckert et al. | 395/725 |
| 5,170,481 | 12/1992 | Begun et al. | 395/725 |
| 5,191,656 | 3/1993 | Forde, III et al. | 395/325 |
| 5,195,185 | 3/1993 | Marenin | 395/325 |
| 5,265,223 | 11/1993 | Brockmann et al. | 395/325 |
| 5,317,696 | 5/1994 | Hilgendorf | 395/325 |
| 5,325,502 | 6/1994 | McLawry | 395/425 |
| 5,333,276 | 7/1994 | Solari | 395/325 |

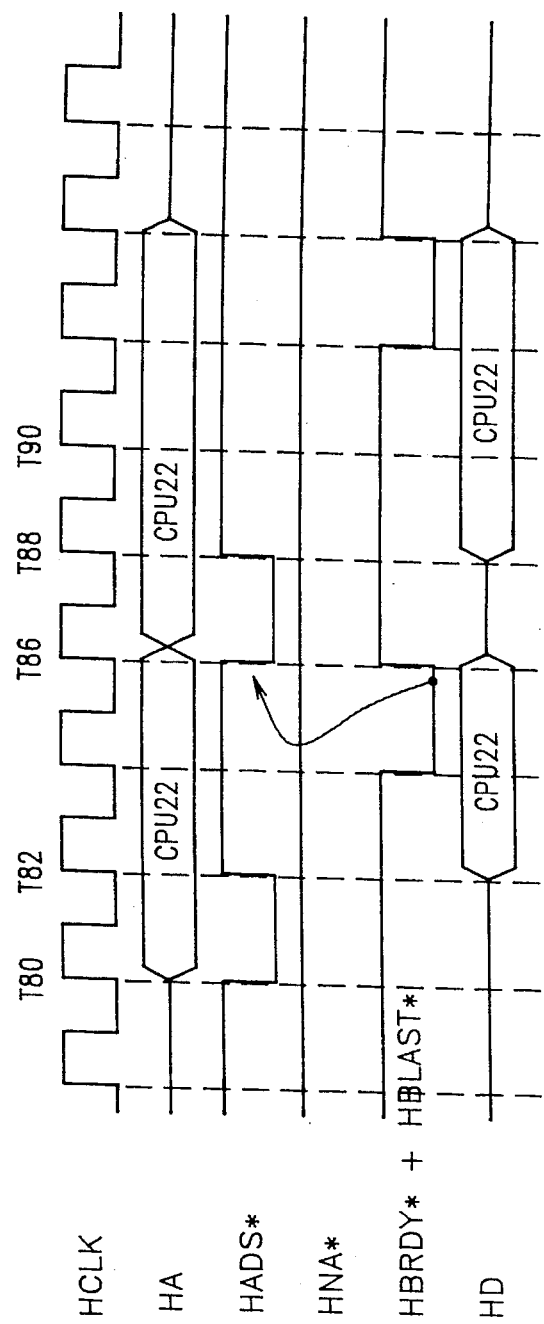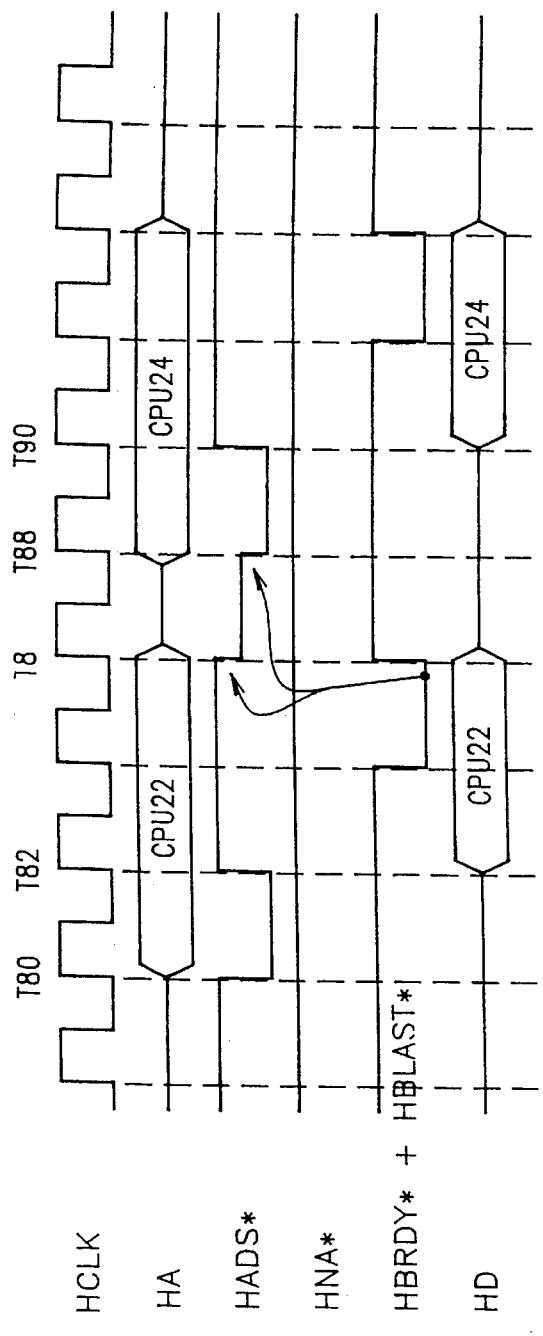
FIG. 6A
FIG. 6B

SPLIT TRANSACTIONS AND PIPELINED ARBITRATION OF MICROPROCESSORS IN MULTIPROCESSING COMPUTER SYSTEMS

BACKGROUND OF THE INVENTION

1. Field of the Invention

The present invention relates to prioritization and arbitration of multiple elements in a system, including least recently used and first-in-first-out prioritization schemes, a reservation scheme for overriding prioritization and an arbitration scheme including split transactions and pipelined arbitration for multiple microprocessors sharing a single host bus.

2. Description of the Related Art

The personal computer industry is evolving quickly due to the increasing demand for faster and more powerful computers. Historically, computer systems have developed as single microprocessor, sequential machines which process one instruction at a time. However, performance limits are being reached in single microprocessor computer systems so that a major area of research in computer system architecture is parallel processing or multiprocessing. Multiprocessing involves a computer system which includes multiple microprocessors that work in parallel on different problems or different parts of the same problem. The incorporation of several microprocessors in a computer system introduces many design problems that are not present in single microprocessor architectures.

One difficulty in multiprocessor computer systems is that all of the microprocessors often share a single host bus and only one microprocessor can access or control the bus at any given time. Another difficulty is that many of the microprocessors may request control of the host bus at the same time. Therefore, some type of arbitration scheme is necessary to determine which microprocessor will take control of the host bus, when, and how that microprocessor takes control from the microprocessor or other device previously having control.

A complication that is encountered in multiprocessor computer systems is the maintenance of cache coherency when each microprocessor includes its own local cache memory. For simplicity, the system comprising the microprocessor and its local cache memory and cache support logic will be referred to as a central processing unit (CPU). Cache memory was developed in order to bridge the gap between fast microprocessor cycle times and slow memory access times. A cache is a small amount of very fast, relatively expensive, zero wait state memory that is used to store a copy of frequently accessed code and data from main memory. A CPU can operate out of its cache and thereby reduce the number of wait states that must be interposed during memory accesses. When a microprocessor requests data from the memory and the data resides in the local cache, then a cache "hit" takes place, and the data from the memory access can be returned to the microprocessor from the local cache without incurring wait states. If the data is not in the cache, then a cache read "miss" takes place, and the memory request is forwarded to the system and the data is retrieved from main memory, as would normally be done if the cache did not exist. On a cache miss, the data that is retrieved from main memory is provided to the microprocessor and is also written into the cache due to the statistical likelihood that this data will be requested again by the microprocessor.

The development of cache memory has facilitated the multiprocessor computer system in that each CPU requires access to the host bus less frequently, thereby making the computer system more efficient. CPUs operating out of their local cache in a multiprocessing environment have a much lower individual "bus utilization." This reduces system bus bandwidth used by each of the CPUs, making more bandwidth available for other CPUs and bus masters. However, each CPU may change the data within its own local cache, thereby requiring the need to update the main memory since other CPUs will also be accessing the main memory and would otherwise receive obsolete or dirty data. Therefore, one difficulty that has been encountered in multiprocessing architectures is the maintenance of cache coherency such that when one CPU alters the data within its local cache, this altered data will be reflected back to the main memory.

In a multiprocessor computer system using a single bus architecture, system communications take place through a shared busy which allows each CPU to monitor other CPU bus requests by watching or snooping the bus. Each CPU has a cache system which monitors activity on the shared bus and the activity of its own microprocessor and decides which block of data to keep and which to discard in order to reduce bus traffic. A request by a CPU to modify a memory location that is stored in more than one cache requires bus communication in order for each copy of the corresponding line to be marked invalid or updated to reflect the new value.

In a write-back scheme, a cache location is updated with the new data on a CPU write hit and main memory is generally only updated when the updated data block must be exchanged with a new data block. The multiprocessor cache systems which employ a write-back scheme generally utilize some type of ownership protocol to maintain cache coherency. In this scheme, any copy of data in a cache must be identical to (or actually be) the owner of that location's data.

The arbitration scheme should include a mechanism for an "owner" cache to interrupt the current controller of the single host bus if the current controller attempts to access data from main memory that has been modified or altered by the owner cache. The arbitration scheme therefore, should include a mechanism for one of the CPUs to temporarily interrupt the current CPU controlling the host bus, so that CPU can return as the bus master when the temporary interruption is over.

A multiprocessor computer system usually includes an input/output (I/O) bus, such as the Industry Standard Architecture (ISA) bus or the Extended ISA (EISA) bus, as well as direct memory access (DMA) and random access memory (RAM) refresh. The EISA bus is not directly connected to the host bus, but includes an EISA bus controller (EBC) connected between the host bus and the EISA bus. The EBC must have access and control of the host bus occasionally to facilitate transfers of data between the CPUs and I/O devices, such as ISA or EISA bus masters which are connected to the EISA bus, as well as to return data from an I/O device or other system resource through the host bus to one of the CPUs of the computer system. Additionally, bus masters must also have access to the host bus when a bus master installed on the I/O bus directs an activity to the main memory. The DMA and RAM refresh operations also require access to the host bus. The bus masters, DMA and RAM refresh need greater priority than the CPUs in the multiprocessor system. The arbitration scheme used in a multiprocessor system must give greater priority to the DMA, RAM refresh and EISA requests to control the host bus, without disturbing the relative priorities of the CPUs.

Prioritization schemes can be implemented in multiprocessor computer systems to prioritize between several CPUs requesting control of a single host bus at the same time. Also, prioritization schemes are very useful in establishing which blocks of data within a cache, or which of the cache "ways", are to be replaced since a lower priority cache way is less likely to be used by a CPU. In general, the problem to be solved by a prioritization scheme is how to efficiently prioritize a plurality of elements. The elements reside in a system where all elements would have symmetric access to system resources, such as the host bus. Prior-art daisy-chaining and round-robin priority schemes had inherent latency and fairness problems when elements were not installed or not requesting.

Two of the most commonly implemented prioritization schemes are the first-in-first-out (FIFO) and least recently used (LRU) priority schemes. In a FIFO scheme, priority is given to that element which has requested the host bus or system resources first. A FIFO scheme used to replace cache ways may be less efficient if a certain cache way is being frequently used but is replaced since it is the oldest element. FIFO schemes are generally fair when prioritizing between several CPUs in a multiprocessor system. The least recently used (LRU) scheme gives priority to that element that had the highest priority least recently. It is based on the very reasonable assumption that the least recently used element is the one element that should have the highest priority in the future. The LRU policy avoids giving low priority to a very active element as occurs in a FIFO scheme.

FIFO prioritizers available in prior art were too large to implement efficiently. The pseudo-LRU algorithms found in the prior art are inherently unworthy if implemented in multiprocessor systems, since they violate the symmetry clause by allowing higher utilization of elements on less populated branches of the pseudo-LRU tree structure.

SUMMARY OF THE PRESENT INVENTION

There are three prioritization schemes of the present invention. First, there is the true-LRU structure which could be used on any cache design that requires that a true-LRU be kept on its cache ways. The second scheme is a modified true-LRU and the third is a FIFO scheme. The second and third schemes can be used in caches or on any prioritizer or arbiter where some of the elements are missing or are not available.

The true-LRU prioritization scheme of the present invention uses $(n/2)\times(n-1)$ priority bits where each priority bit keeps track of the relative priority between a corresponding pair of elements of the n elements. There are $(n/2)\times(n-1)$ unique pairs where each of the n elements is paired with every other element, and each element is associated with $n-1$ pairings or priority bits. Any time that all $n-1$ priority bits associated with a particular element point to that element, then that element has the highest priority, whether priority means that a CPU is the highest in priority to assume control of the host bus, or that a cache way is next to be replaced. Also, each time that an element uses the bus, or a cache way gets used, then each priority bit associated with that element is updated to point away from that element. All priority bits not associated with the element are unaffected when that element's associated bits are updated.

There are n priority equations, one for each of the n elements, to determine which of the n elements has the highest priority. Each equation is associated with one of the n elements and is derived from the $n-1$ priority bits that are associated with that element. Each priority equation determines a priority term such that there are a total n priority terms, one priority term associated with a corresponding one of the n elements. Only one of the priority terms is true at any time such that only one of the elements has the highest priority.

The modified true-LRU prioritizer of the present invention uses the same priority bits as defined for the true-LRU priority scheme. However, the modified true-LRU includes a request signal for each element. The priority bit values are each modified resulting in the same number of modified priority bits, where the modified priority bits change the relative priority between a pair of elements to the other element if the element normally having priority is not requesting and the other element is requesting priority. An alternative modifier equation changes the relative priority to point to the other element if the element that normally has priority is not requesting priority. Using either modifier equation, the modified priority bits are used in the priority equations rather than the regular priority bits to determine the priority terms.

The last prioritization scheme is a FIFO prioritizer which is similar to the true-LRU schemes described above. The FIFO prioritization scheme uses the original priority bits in the priority equations to determine the priority terms where there are n priority terms, one for each of the n elements. These priority bits are derived, however, from the same modified priority bits as described above.

The prioritization schemes described above can be used in a multiprocessor system to determine which of several CPUs has the highest priority to assume control of a host bus in a multiprocessor system. For example, one of the prioritization schemes could be implemented at a central location attached to the host bus of a computer system. The host bus includes request signals for each of the CPUs so that each CPU can request control of the host bus and the central prioritizer can detect these request signals. The host bus also includes acknowledge signals derived from the priority terms provided by the central prioritizer so that a CPU can detect if it has the highest priority as determined by the prioritizer. Additional logic is required so that the EISA bus masters or the DMA and RAM refresh have higher priority than the CPUs such that if the EISA bus masters or the DMA or RAM refresh request use of the host bus, they receive priority over the regular CPUs. An EISA host master (EHM) is included which requests the use of the host bus on behalf of EISA bus masters or other devices performing DMA or RAM refresh operations initiated on the EISA bus. The addition of the EHM, DMA and RAM refresh, however, does not disturb the relative priorities between the CPUs in the multiprocessor system.

The arbitration scheme of the present invention is designed to provide the lowest arbitration latency possible between bus masters and to maximize the computer system throughput. The current bus master is put in control of causing when arbitration is to occur, thus making it accountable for determining when to transfer ownership while allowing it to keep the host bus if it really needs it. The prioritization logic, as described above, is placed into a central location and determines which CPU becomes the next bus master once the current bus master releases control of the host bus.

To facilitate arbitration, the host bus includes a host bus "busy" signal which governs when arbitration between one bus master and the next takes place. The current bus master asserts the host bus busy signal while it has control of the host bus. During this time while the host bus busy signal is asserted, prioritization arbitration is occurring where the acknowledge signals are allowed to change. Once the current bus master is through with the bus, it negates the host bus busy signal which freezes the acknowledge signals at that time. In general, a CPU or other potential bus master requiring control of the host bus asserts its request signal and then monitors its acknowledge signal so that when its acknowledge signal is asserted, it has the highest priority. However, it must wait until the bus is available, during which time it may lose highest priority to another device. The prioritizer detects requests as they occur and determines which of the requesting CPUs has the highest priority at that time. The next bus master is that device having the highest priority when the host bus busy signal is negated. The CPU assumes control of the host bus as soon as it detects that its acknowledge signal is asserted and the host bus busy signal is not asserted, by re-asserting the host bus busy signal and assuming control of the host bus.

The arbitration scheme of the present invention provides for a temporary bus master to interrupt the current, or "permanent" bus master, in order to perform a write-back cache intervention cycle. The owner cache snoops the host bus for memory reads or writes of a modified location and if this occurs, it aborts the permanent host bus master temporarily in order to write-back the modified line to main memory. The arbitration scheme of the present invention includes a back-off mechanism where the host bus includes a backoff signal which is asserted by the snooping cache to temporarily abort the operations of the permanent bus master so that the snooping cache can take control of the host bus. The temporary bus master may then proceed to write-back the modified line to main memory. When the temporary bus master completes its task, it returns control to the permanent bus master that was interrupted.

Intermediate priority is given to the EISA bus masters and the RAM refresh and DMA. The EHM has priority over the normal CPUs acting as permanent bus masters so that any time the bus masters, DMA or RAM refresh request control of the host bus, they receive control of the host bus once it is available. However, the temporary bus masters have the highest priority and can even interrupt the EHM. A temporary bus master will probably not intervene on a RAM refresh cycle, however, since refreshes do not cause snoops, and snoops usually cause interventions.

The arbitration scheme of the present invention also supports address pipelining, bursting and EISA read and write posting. Address pipelining allows the address and status signals on the host bus to be available before the start of the data transfer phase of any given cycle. Pipelining is useful for bus slaves to efficiently transfer data and to reduce the snoop latency induced by bus masters. Pipelining can also occur during arbitration between one bus master and the next. Pipelined arbitration is a way to more efficiently transfer control of the host bus from one permanent bus master to the next without any idle data transfer states. The next bus master can pipeline its addresses and status signals while the data transfer for the present bus master is still in the process of completing. In this manner, the address and status signals are available to the next bus master while the data signals are still being accessed by the previous bus master.

The host bus supports bursting of both memory reads and writes. In a burst sequence according to the preferred embodiment, the most data that can be transferred is 32 bytes. Bursting normally occurs when a temporary bus master assumes control of the host bus and then bursts the data by writing back the modified line to main memory.

A split transaction capability is supported where both reads and writes to the EISA bus from the host bus are posted by the EBC. Posting buffers are provided between the EISA bus and the host bus to temporarily hold data. When a write is posted, the CPU in control of the host bus can continue its cycle. When a read is posted, the bus master usually must wait for the data to return from the EISA bus before continuing. Once an operation is posted, a retry signal is asserted by the EBC to prevent further access to the EISA bus. While that host bus master is waiting for its read data, it may arbitrate the host bus to another permanent bus master if another element or device is requesting it. If a CPU tries to access the EISA bus while another master's access is active on the EISA bus, then the retry signal forces it to abort and try again later. If another CPU is requesting access to the host bus, the aborted CPU arbitrates the bus to the other CPU. The aborted CPU ends up with the lowest priority.

The CPU waiting for read data posted to the EISA bus need not re-arbitrate for the host bus to retrieve the data. The EBC returns the read data when it is valid on the EISA bus and the host data bus is idle. Although the device in control of the host bus may incur some wait states while data from a posted read is being returned, significant time savings still result since an arbitration cycle is avoided.

A CPU may perform a locked cycle where that CPU has sole access to a memory location or to a device on the EISA bus. If the EISA bus is busy, however, a locked retry signal is asserted to prevent the locked cycle since otherwise a deadlock may occur between the EISA and host buses. Since a CPU attempting a locked EISA cycle will be aborted by the EBC even if the posting buffers are available (empty), and thus the CPU may be aborted by both the retry and locked retry signals, it is desirable that the aborted CPU gain the highest priority when the EISA bus is next available regardless of which CPU has highest priority at that time. Thus, the prioritization scheme also includes a reservation scheme which sets a reservation bit identifying a CPU which was aborted when attempting a locked EISA cycle. When the EISA bus becomes available, the reservation overrides the normal prioritization and the aborted CPU becomes the next bus master.

BRIEF DESCRIPTION OF THE DRAWINGS

A better understanding of the invention can be obtained when the following detailed description of the preferred embodiment is considered in conjunction with the following drawings, in which:

FIG. 6A is a timing diagram illustrating a non-pipelined cycle of the host bus of FIG. 1;

FIG. 6B is a timing diagram illustrating a non-pipelined cycle during arbitration of the host bus of FIG. 1;

DETAILED DESCRIPTION OF THE PREFERRED EMBODIMENT

Figure 1:
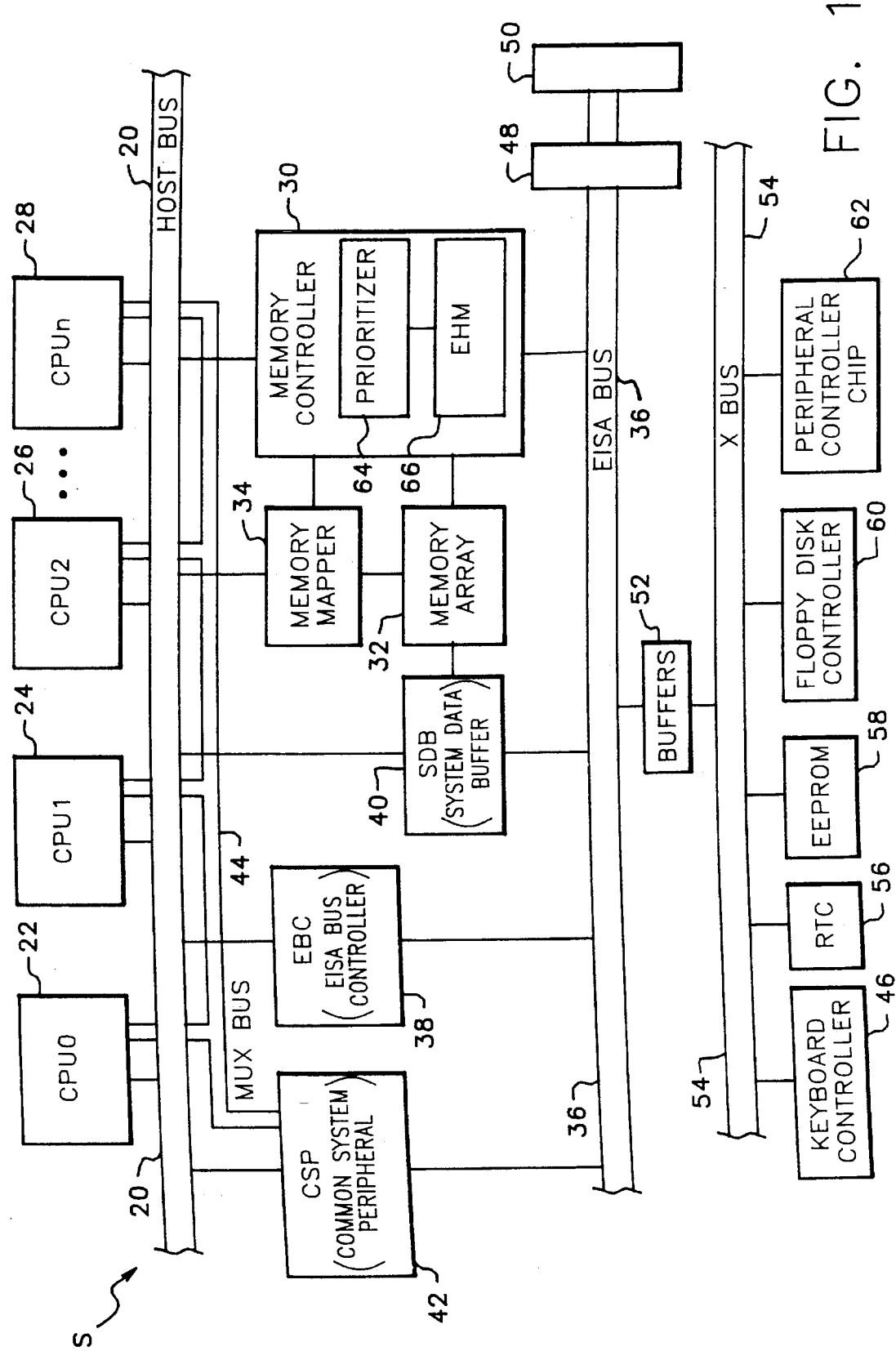
FIG. 1 is a simplified block diagram of a multiprocessor computer system which uses the prioritization and arbitration schemes according to the present invention.

Referring now to FIG. 1, a multiprocessor computer system S is generally shown which uses the prioritization and arbitration schemes according to the present invention. Many of the details of a computer system that are not relevant to the present invention have been omitted for the purpose of clarity. In the present embodiment, the computer system S includes four central processing units (CPUs) 22, 24, 26 and 28 that are coupled to a host bus 20, although it is contemplated that the computer S could include up to sixteen or more CPUs where one or more CPUs would be included between the CPU 26 and the CPU 28. A memory controller 30 is coupled to the host bus 20. A memory array, otherwise referred to as main memory 32, preferably comprises dynamic random access memory (DRAM) and is coupled to the memory controller 30. Memory mapper logic 34 is coupled to the host bus 20, the memory controller 30 and the main array 32. The memory mapper logic 34 provides memory mapping functions to facilitate memory accesses in the main memory 32.

The computer S preferably includes an Extended Industry Standard Architecture (EISA) bus 36 which would also include an EISA bus controller (EBC) 38. EISA is an extension of the Industry Standard Architecture (ISA), a bus architecture introduced in the International Business Machines Corp. (IBM) PC/AT personal computer. The EBC 38 interfaces the host bus 20 to the EISA bus 36, and more particularly controls cycles initiated on the host bus 20 to the EISA bus 36 and provides various bus cycle translation and conversion functions to facilitate transfers between the host bus 20 and the EISA bus 36. The EISA bus 36 could also be another type of bus based on any of the various bus specifications known in the industry. A system data buffer 40 is also coupled between the host bus 20 and the EISA bus 36, and is also coupled to the data lines of the main memory 32. A logic block referred to as the central system peripheral (CSP) 42 is coupled between the host bus 20 and the EISA bus 36. The CSP 42 is also coupled through a MUX bus 44 to a logic block referred to as the distributed system peripheral (DSP) 84 (FIG. 2) which is preferably included with each of the CPUs 22–28. The CSP 42 includes various system functions including a direct memory access (DMA) controller, EISA arbitration controller, and numerous system board logic functions such as refresh control, among others.

The EISA bus 36 includes a plurality of EISA slots 48 and 50 for receiving EISA bus master expansion cards such as network interface cards or a hard disk interface cards to name a few examples. The EISA bus 36 is coupled to buffers 52 to a bus referred to as the X-bus 54. A number of peripheral devices are coupled to the X-bus 54 including the keyboard controller 46, a real time clock (RTC) 56, electrically erasable, programmable, read only memory (EEPROM) 58, a floppy disk controller 60, and a peripheral controller chip 62 which includes numerous ports and universally synchronous receiver/transmitters (not shown).

The memory controller 30 is also coupled to the EISA bus 36 and preferably includes a central prioritizer 64 which is also connected to the host bus 20, where the prioritizer 64 is preferably part of the memory controller 30 to provide a convenient centralized location. The prioritizer 64 could alternatively be a separate unit. The prioritizer 64 includes logic to monitor the control signals appearing on the host bus 20 and to determine which of the CPUs 22–28 has control of the host bus 20 as will be described more fully below. The memory controller 30 also preferably includes an EISA host master (EHM) 66, which is connected to the host bus 20 and the EISA bus 36 and is responsible for running cycles on the host bus 20 in response to EISA initiated accesses including DMA, refresh, and requests by EISA and ISA bus masters. EISA and ISA bus masters are coupled to the EISA bus 36 either directly as part of the computer system S although not shown, or through the EISA slots 48 or 50 as part of bus master expansion cards. The EHM 66 requests the host bus 20 for DMA and refresh devices as well as EISA and ISA bus masters.

Figure 2:
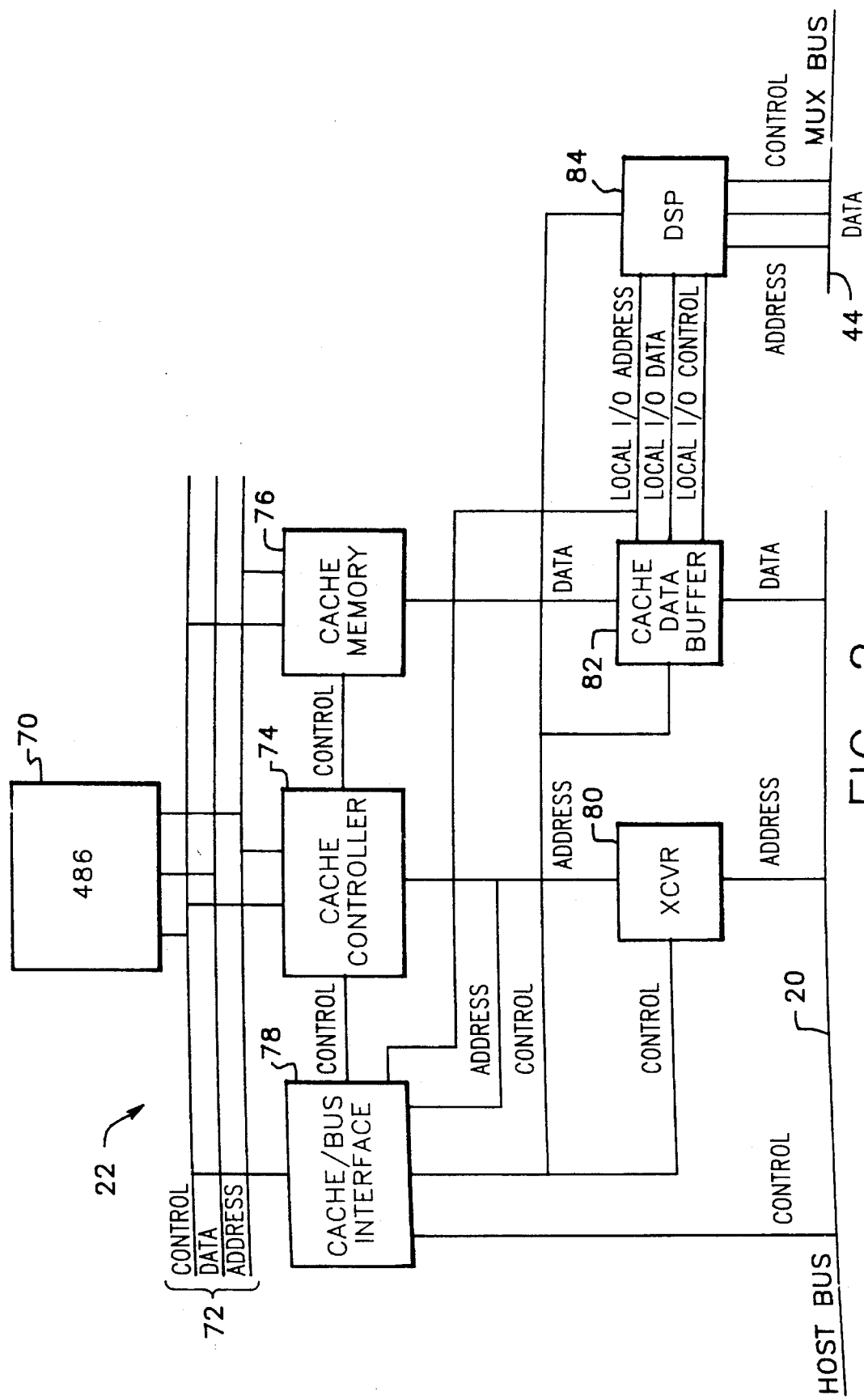
FIG. 2 is a simplified block diagram which illustrates the preferred embodiment of the CPUs of FIG. 1.

Referring now to FIG. 2, a block diagram of the preferred embodiment of the CPU 22 is shown, although other configurations are possible for use with the present invention. The other CPUs 24, 26 and 28 preferably comprise similar configurations as the CPU 22, although they may be different. The CPU 22 includes a microprocessor 70 which is preferably the i486 manufactured by Intel, although other microprocessors are contemplated such as the i386, also by Intel. The microprocessor 70 is coupled to a microprocessor bus 72 including control, data and address bus portions as shown. A second level cache controller 74, which is preferably the 82495 C5 cache controller by Intel, is coupled to the control and address portions of the microprocessor bus 72. A cache memory 76, preferably comprising 82490 C8 static RAMs by Intel normally used with the Intel C5 cache controller, is coupled to the data and address portions of the microprocessor bus 72. The cache controller 74 connects to the cache memory 76 via various control lines as shown.

Cache controller interface logic 78 is preferably coupled to the cache controller 74 through control lines, and provides the required bus controller functions to interface the cache system comprising the cache controller 74 and the cache memory 78 with the host bus 20. The cache interface logic 78 also provides the necessary signal interpretation and translation between the cache controller 74 and the host bus 20. The address portion of the cache controller 74 is connected to a transceiver 80 which, in turn, is connected to the host bus 20. The address portion of the cache controller 74 is also connected to the cache interface logic 78. The address lines coupled between the cache controller 74 and the transceiver 80 are bi-directional, meaning that the cache controller 74 can drive an address through the transceiver 80 onto the host bus 20 and can also receive an address from the host bus 20 through the transceiver 80 to the address portion of the cache controller 74. The cache interface logic 78 is connected to the host bus 20, the transceiver 80, a cache data buffer 82 and the DSP 84 through control lines as shown. These control lines from the cache interface logic 78 are connected to the transceiver 80 and the cache data buffer 82 to allow the cache interface logic 78 to control the output enables for both the cache controller 74 and the cache memory 76. The data portion of the cache memory 76 is connected to the cache data buffer 82, where the cache data buffer 82 is connected to the host bus 20 through similar data lines. The cache data buffer 82 is connected to the DSP 84 via local I/O address data and control lines. The DSP 84 is connected through the MUX bus 44 to the CSP 42. The DSP 84 implements various logic functions that are closely related to the microprocessor/cache subsystem, including the interrupt controller, timers and specific individual processor communication functions.

The host bus 20 includes address, data, and control lines as described above, which are shared by the CPUs 22–28. Only one of the CPUs 22–28 may have control of the host bus 20 at any given time where that CPU having control may drive the address and data signals of the host bus 20, although pipelining and split transactions, described later, modifies this somewhat. It is understood that when a CPU, such as the CPU 22, is referred to as having control of the host bus 20, the controlling logic may be included within its respective cache subsystem. In the preferred embodiment, the cache interface logic 78 comprises the necessary logic to interface with the host bus 20 so that the microprocessor 70 is isolated from the host bus 20.

The interaction between the microprocessor 70 of the CPU 22 and its cache subsystem will now be described, it being understood that each of the other microprocessors in the CPUs 24–28 and their respective cache subsystems operate in precisely the same or in a very similar manner. The cache memory 76 is a small amount of very fast, relatively expensive, zero wait state memory that is used to store a copy of frequently accessed code and data from the main memory 32. The microprocessor 70 can operate out of the cache memory 76 and thereby reduce the number of wait states that must be interposed during memory accesses. When the microprocessor 70 requests data from the main memory 32 and the data resides in the cache memory 76, then a cache read "hit" takes place and the data from the memory access can be returned to the microprocessor 70 from its associated cache memory 76 without incurring wait states. This cycle can take place without the use of the host bus 20.

If a cache "miss" occurs, where the microprocessor 70 requires data that is not within its cache memory 76, the CPU 22 uses the host bus 20 to gain access to the data in the main memory 32. The memory request is forwarded to the main memory 32 through the host bus 20, as would normally be done if the cache memory 76 were not present. When a miss occurs, the data that is retrieved from the main memory 32 is provided to the CPU 22 and is written into the cache memory 76 due to the statistical likelihood that this data will be requested again by the microprocessor 70.

There are several different cache management schemes known to those skilled in the art that could be used in conjunction with the prioritization and arbitration scheme of the present invention. Although only one cache management scheme will now be described, the present invention is not limited to this particular scheme. In the preferred embodiment, the multiprocessor cache system employs a write-back scheme where the multiprocessor system generally utilizes a modified exclusive ownership protocol to maintain cache coherency. Ownership is generally acquired through read and write operations defined in an ownership protocol. The owner of a location's data is generally defined as the cache having the most recent version of the data originating from a corresponding memory location of the main memory 32.

More particularly, the computer system S preferably uses the modified exclusive shared invalid (MESI) protocol, where each of the cache subsystems of the CPUs 22–28 may be the exclusive owner of data which was originally read from the main memory 32. The microprocessor 70 may modify the data within the cache memory 76 so that the new data is not the same as the data in the corresponding memory location in the main memory 32, or in another cache memory of another CPU 24–28. The CPU 22 is then the exclusive owner of the data at that particular memory address and is responsible for maintaining the correctness of the data provided in any future read operations to that address. Also, the owner CPU 22 must inform the other CPUs 24–28 having data from the corresponding data address of the cycle so that the other CPUs 24–28 can determine that their data is now incorrect, or dirty. If one of the CPUs 24–28 attempts to access data from the main memory 32 that is dirty, the owner CPU 22 detects this read request, causes whichever one of the other CPUs 24–28 that is on the host bus 20 to temporarily abort its access and the owner CPU 22 updates or writes-back the owned data to the main memory 32. If the aborted CPU was attempting a read cycle, it "snarfs" or reads the data during the write-back cycle while the CPU 22 is updating main memory 32 rather than waiting until after the write-back cycle. This saves time so that the aborted CPU need not repeat another cycle. If the aborted CPU was attempting a write cycle, it repeats the write cycle after the write-back cycle. This procedure is followed so that the other CPUs 24–28 receive the updated data rather than the obsolete data from the main memory 32. An owner CPU, therefore, snoops the host bus 20 so that when another CPU attempts to read from the owned location within the main memory 32, the snooping owner CPU will interrupt the read and perform the necessary write-back.

Any time the microprocessor 70 attempts to read from its cache memory 76 and a miss occurs such that the CPU 22 needs access to the main memory 32, or when the CPU 22 needs access to the EISA bus 36 through the host bus 20, the CPU 22 requests access to the host bus 20. One of the other CPUs 24–28 or the EHM 66 may currently be the bus master where it has control of the host bus 20, so that the CPU 22 must wait until the host bus 20 is free. In fact, while one CPU or the EHM 66 has control of the host bus 20, other CPUs may request control of the host bus 20. Recall that the EHM 66 provides the necessary logic through which DMA or refresh devices, or EISA and ISA bus masters control the host bus 20, although the EHN will generally be referred to as the bus master in lieu of these other devices when they control the host bus 20. The prioritizer 64 keeps track of each request and uses a prioritization scheme to determine which of the CPUs 22–28 or the EHM 66 has the highest priority to be the next bus master of the host bus 20. When the current bus master is finished using the host bus 20, it initiates a transfer cycle in which the present bus master relinquishes control of the host bus 20 so that the next bus master can take control. The device having the highest priority at the initiation of the transfer cycle is the next bus master. Arbitration thus determines how and when the next bus master takes control from the current bus master, and prioritization determines which one of the CPUs 22–28 or the EHM 66 requesting control of the host bus 20 is the next bus master.

In the preferred embodiment of the present invention, the prioritization scheme is centralized within the prioritizer 64 and monitors the control signals of the host bus 20 in order to determine which of the CPUs 22–28 or the EHM 66 is the next bus master. In a sense, the prioritizer is the "arbiter" between the CPUs 22–28 and the EHM 66 as that term is used in the prior art. The arbitration scheme as referred to herein is a transfer scheme which effectively and efficiently transfers control of the host bus 20 from one bus master to the next.

ARBITRATION

The host bus 20 includes address signals HA<31 . . . 3> and byte enable signals HBE<7 . . . 0>*, which are similar to the address and byte enable signals of the Intel 80386 and 80486 microprocessors as is known to those skilled in the art, except extended to incorporate a 64 bit wide data bus and the resulting 8 single byte wide data lanes. The asterisk at the end of a signal name indicates that the signal is true when asserted low. Several status signals associated with these HA<31 . . . 3> address and HBE<7 . . . 0>* byte enable signals also reside on the host bus 20. For simplification, the HA<31 . . . 3> address signals, the HBE<7 . . . 0>* byte enable signals as well as the miscellaneous associated status signals may generally be referred to as the HA address signals or host address bus. The 64 bit wide data bus includes data signals HD<63 . . . 0>* which may generally be referred to as the HD data signals or the host data bus.

The host bus 20 includes a request signal HBREQ<n>* for each of the CPUs 22–28, where n represents an ID number identifying a particular CPU. In FIG. 1, for example, if only four CPUs 22–28 are connected to the host bus 20 so that there are no CPUs between the CPUs 26 and 28, then the CPUs 22–28 would have the ID numbers 0, 1, 2 and 3, respectively. The host bus 20, therefore, would include the request signals HBREQ<0>* for CPU 22, HBREQ<1>* for CPU 24, HBREQ<2>* for CPU 26 and HBREQ<3>* for CPU 28.

The host bus 20 also includes an acknowledge signal for each of the CPUs 22–28, referred to as HACK<n>* generally, or as HACK<0>*, HACK<1>*, HACK<2>* and HACK<3>* respectively, in the specific embodiment being illustrated. Only one of the HACK<n>* signals is asserted at any given time, so that the HACK<n>* signals determine which of the CPUs 22–28 has the highest priority. When one of the CPUs 22–28 detects its corresponding HACK<n>* signal asserted low, then that CPU has the highest priority among the CPUs 22–28 to be the next bus master of the host bus 20. However, that CPU may not assume control until the current bus master relinquishes control of the host bus 20.

The host bus 20 includes a signal HBUSY* which is tri-stated and resistively pulled high if not asserted. A bus master having control of the host bus 20 asserts the HBUSY* signal low to indicate to all the other potential bus masters that the host bus 20 is busy and unavailable. Generally, the bus master asserts the HBUSY* signal low and maintains control until it is finished using the host bus 20, at which time it negates the HBUSY* signal high.

During the time that the HBUSY* signal is asserted low, the HACK<n>* signals can change so that the highest priority CPU may also change. When the HBUSY* signal is negated high, however, the HACK<n>* signals are preferably frozen and not allowed to change until the HBUSY* signal is subsequently asserted low again. The CPU having its corresponding HACK<n>* signal asserted low when the HBUSY* signal is negated high is the next bus master of the host bus 20.

The prioritizer 64 detects the assertion of the request signals HBREQ<n>* on the host bus 20, uses a prioritization scheme to determine which of the CPUs 22–28 has the highest priority to be the next bus master, and asserts the corresponding HACK<n>* acknowledge signal. The prioritizer 64 includes logic which allows it to modify the HACK<n>* acknowledge signals only while the HBUSY* signal is asserted low. The HACK<n>* signals, therefore, remain unchanged while the HBUSY* signal is negated during a transfer of bus mastership to the device which had its HACK<n>* signal asserted when the HBUSY* signal was negated. The logic implementation of the prioritizer 64 will be discussed in detail below in the section entitled "Prioritization."

The EHM 66 tracks activity on the EISA bus 36 and the host bus 20 to determine when a DMA or RAM refresh cycle needs to be run on the host bus 20 and if an EISA or ISA bus master requires access to the host bus 20. If so, the EHM 66 arbitrates for the DMA, refresh, ISA or EISA bus master in a similar manner as the CPUs 22–28. A signal M_IO on the EISA bus 36 is asserted high by the device in control of the EISA bus 36 if the EISA cycle is to memory, such as the main memory 32, and is asserted low if it is an I/O cycle. A signal HLOCAL* resides on the host bus 20 and is asserted low by the memory controller 30 if an input/output (I/O) or memory address resides in a slave device local to the host bus 20 and not to the EISA bus 36, and is negated high by the memory controller 30 if the cycle is to the EISA bus 36. Two signals EBMODE<1 . . . 0> are asserted by the EBC 38 to the memory controller 30 indicating what type of master currently has control of the EISA bus 36, which is decoded as follows:

00—CPU
01—Refresh
10—ISA master
11—EISA master or DMA

For example, if the EBMODE<1 . . . 0> signals are not equal to 00 indicating the device is not one of the CPUs 22–28, and if the M_IO signal is asserted high and the HLOCAL* signal is asserted low, then a device on the EISA bus 36 requires access to the host bus 20.

When the EHM 66 determines that a device operating a cycle on the EISA bus 36 requires access to the host bus 20 using the signals described above, it asserts a request signal referred to as EBREQ* to the prioritizer 64. The prioritizer 64 receives the EBREQ* signal and provides a signal EBHACK* to the EHM 66 to grant access of the host bus 20 to the device on the EISA bus 36. The memory controller 30 subsequently asserts a signal EBGNT* to inform the EBC 38 that a device on the EISA bus 36 is running the cycle on the host bus 20 so that the EBC 38 will ignore the cycle and not attempt to run it. It is noted that cycles initiated on the host bus 20 to the EISA bus 36 by one of the CPUs 22–28 are run by the EBC 38, whereas cycles initiated on the EISA bus 36 to the host bus 20 by a device on the EISA bus 36 are run by the EHM 66.

The EHM 66 behaves in a similar fashion as the CPUs 22–28 in that when it wants control of the host bus 20, it asserts the EBREQ, signal low, and assumes control of the host bus 20 when it detects the EBHACK* signal asserted low at the negation of the HBUSY* signal. If the prioritizer 64 detects the assertion of the EBREQ* signal, it gives the EHM 66 a higher priority than the CPUs 22–28. As a protective measure, the EHM 66 may also be the default bus master so that if none of the CPU HBREQ<n>* request signals are asserted, the EHM 66 becomes the next bus master. This situation should normally not occur as will be more fully described below in the discussion of the prioritization scheme. The assertion of the EBREQ* signal by the EHM 66 does not affect the relative priorities of the CPUs 22–28 as determined by the prioritization scheme. After the EHM 66 is finished using the host bus 20, the highest priority CPU, as defined by the prioritizer 64 using the prioritization scheme, becomes the next bus master.

Figure 3:
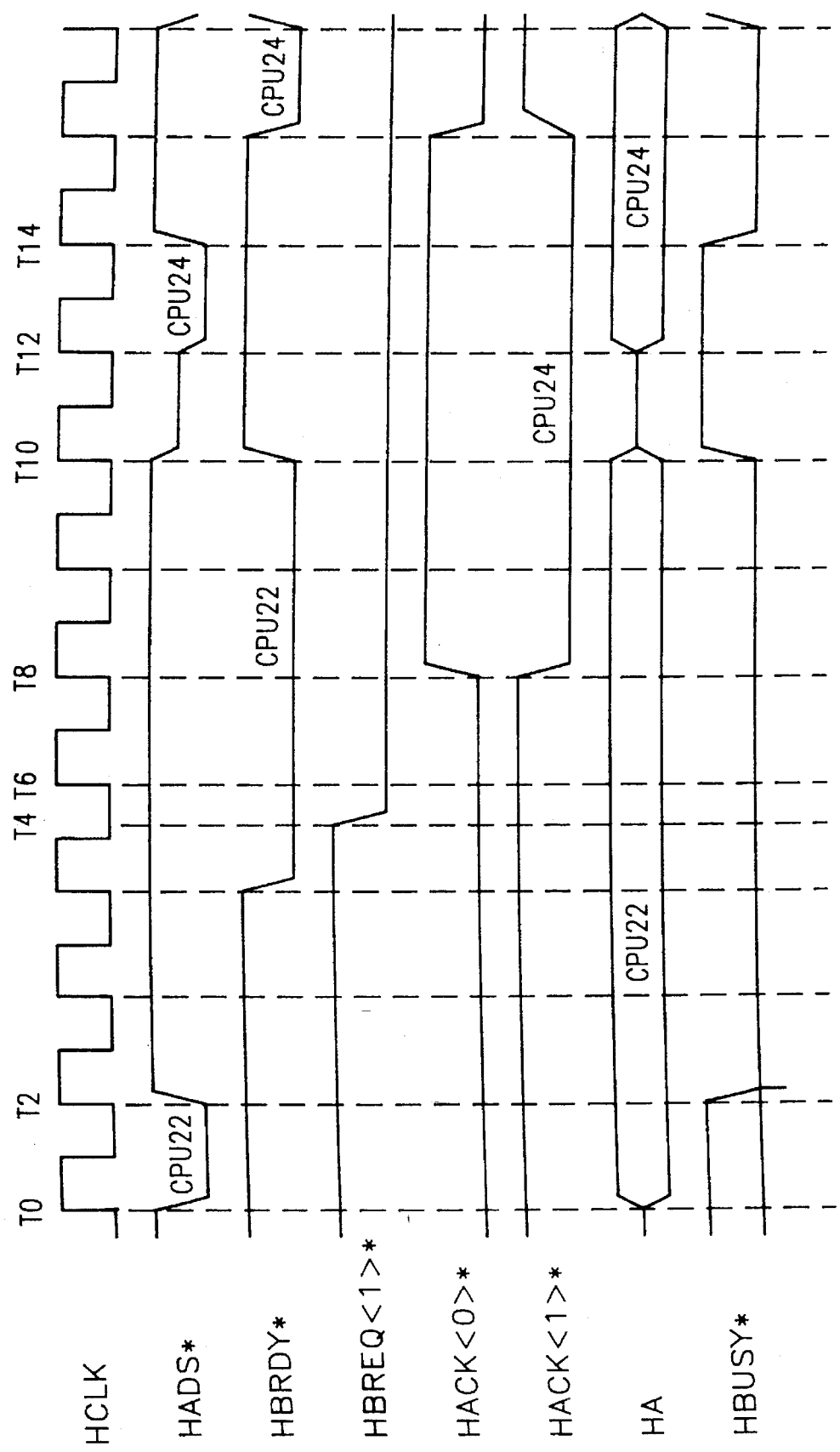
FIG. 3 is a timing diagram illustrating arbitration of the host bus from one bus master to another according to the present invention.

Referring now to FIG. 3, a timing diagram is shown illustrating a transfer of control of the host bus 20 from the current bus master which is CPU 22, to the next permanent bus master, the CPU 24. The host bus 20 is synchronous and includes a clock signal HCLK which synchronizes most of the signal changes on the host bus 20 on the rising edge of the HCLK. At a time T0, the CPU 22 is the permanent bus master and begins asserting the HA address signals for a particular cycle. One HCLK period later, at a time T2, the CPU 22 asserts the HBUSY* signal low, indicating that it has control of the host bus 20. The HBUSY* signal may have been previously asserted.

At a time T4, the CPU 24 asserts its request signal HBREQ<1>* low indicating that it needs control of the host bus 20. The HBREQ<n>* signals are asserted synchronously and they are detected on the next rising edge of the HCLK signal, so that the prioritizer 64 detects the HBREQ<1>* signal at a time T6 which is the next rising edge of the HCLK signal, and determines that the CPU 24 has the highest priority among the CPUs 22–28. Therefore, the prioritizer 64 negates the HACK<0>* acknowledge signal high and asserts the HACK<1>* signal low at a time T8, where the time T8 is one HCLK period after the time T6. The assertion of the HACK<1>* signal low indicates that the CPU 24 has the highest priority and may be the next bus master. The CPU 24 may not assume control of the host bus 20 at time T8, however, since the CPU 22 is still asserting the HBUSY* signal low.

At a time T10, the CPU 22 stops driving the HA address signals and negates the HBUSY* signal high to indicate that the CPU 22 has completed use of the host bus 20 and is ready to arbitrate. The CPU 22 negates the HBUSY* signal high for one HCLK period and then, at a time T12, stops driving the HBUSY* signal so that the HBUSY* signal remains high due to a pullup resistor. Between the time T10 and a time T14 when the HBUSY* signal is negated high, the HACK<n>* signals may not change so that the HACK<n>* signal which is asserted low at the time T10 indicates the next bus master. Since at the time T10 the HACK<1>* signal is asserted low, the CPU 24 is the next bus master.

The CPU 24 detects the negation of the HBUSY* signal high, and asserts the HA address signals at the time T12, which is the next rising edge of the HCLK signal. Therefore, at the time T12, the CPU 24 becomes the new bus master. The CPU 24 does not assert the HBUSY* signal low, however, until the time T14 which is one HCLK period after the time T12. Once the HBUSY* signal is asserted low again, the HACK<n>* signals can change to determine the next bus master after the CPU 24 is finished with the host bus 20.

There essentially is a three level prioritization hierarchy for the ownership of the host bus 20. The normal operation of the CPUs 22–28 have the lowest priority. In general, one of the CPUs 22–28 or the EHM 66 becomes the "permanent" master of the host bus 20, where that CPU or the EHM 66 takes control of the host bus 20 until it is through with it. The current permanent bus master of the host bus 20 determines when the next arbitration occurs, where it controls the timing and transfer of ownership of the host bus 20 to the next permanent bus master. It is understood, however, that a "permanent" bus master may be temporarily interrupted to allow a writeback cycle to be performed by another bus master.

The EHM 66 has intermediate priority. The highest priority is given to the temporary bus masters which temporarily interrupt the permanent bus master to satisfy their write-back protocol. This occurs when the permanent bus master is attempting to read data from or write data to the main memory 32 that is owned by one of the CPUs 22–28. These temporary bus masters interrupt the permanent bus master, therefore, to update the main memory 32 so that the permanent bus master does not attempt to read obsolete data.

As discussed previously, any one of the CPUs 22–28 may own a certain portion of the main memory 32, and that owner or snooping cache snoops the host bus 20 to determine whether the permanent bus master is attempting to read from the location in the main memory 32 that is owned by that cache. The host bus 20 includes a signal HADS* which is the "start cycle" indicator as well as an indicator that a new address has been placed on the host bus 20. The HADS* signal is bi-directional and is driven by the current (permanent or temporary) bus master, and snooped by the caches as well as other bus masters and slaves.

Referring to FIG. 3 again, the HADS* signal is asserted low by the CPU 22 at the time T0 when the HA address signals are also being asserted by the CPU 22, the CPU 22 being the current bus master. The CPU 22 asserts the HADS* signal high one HCLK period later at the time T2, and keeps it high until the time T10 when the CPU 22 stops asserting the particular HA address signals. The HADS* signal is then tri-stated and not asserted for one HCLK period. At the time T12, the CPU 24, which is the new bus master, asserts the HADS* signal low and begins to assert the HA address signals. In general, the current bus master asserts the HADS* signal low for one HCLK period at the time it begins driving the HA address signals to indicate the beginning of a new cycle. This may change if the addresses are pipelined, which will be discussed below. The current bus master stops asserting the HADS* signal at the same time that it stops driving the HA address signals, to allow the next bus master to drive the HADS* signal one HCLK period thereafter to indicate the next cycle.

A snooping CPU detects the assertion of the HADS* signal low and reads the address appearing on the HA address signals. If the snooping CPU owns modified data at the address appearing on the HA address signals, it interrupts the permanent bus master to satisfy the write-back protocol. The CPU seizes control of the host bus 20 from the permanent bus master and becomes a temporary bus master through a mechanism referred to as back-off. The host bus 20 includes an HBOFF* signal which is normally tri-stated and pulled up. The temporary bus master asserts the HBOFF* signal low to inform the permanent bus master to abort its current operation immediately and to stop driving the host bus 20 so that the temporary bus master can take control and perform the necessary write-back. As indicated by the three level prioritization hierarchy, a temporary bus master can also abort the EHM 66.

Figure 4:
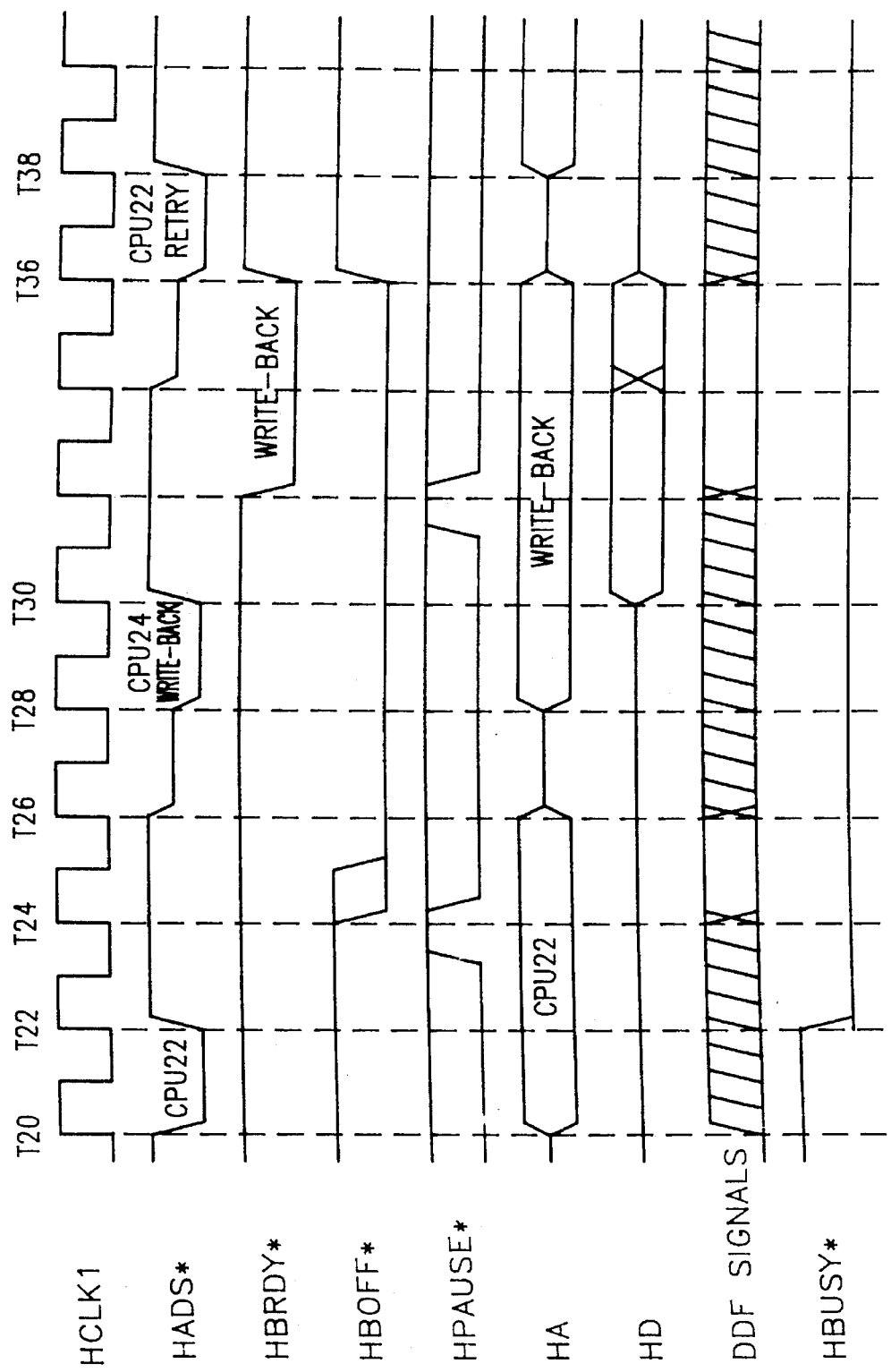
FIG. 4 is a timing diagram illustrating a cache snoop back-off and write-back cycle.

Referring now to FIG. 4, a timing diagram is shown illustrating a cache snoop back-off and write-back cycle. At a time T20, the CPU 22 asserts the HADS* signal low and begins driving the HA address signals. At a time T22, one HCLK period after the time T20, the CPU 22 asserts the HBUSY* signal low and the HADS* signal high. The CPU 22 is the permanent bus master of the host bus 20. For two HCLK periods after the time T20, snooping caches read the HA address signals to determine if a back-off cycle is necessary. The CPU 24 determines that it is the owner of the data appearing at the address HA, and begins asserting the HBOFF* signal low at a time T24.

The signal HBOFF* is sampled asserted only at an HCLK signal rising edge, and so is not sampled asserted low until a time T26. The CPU 22 samples the HBOFF* signal asserted low at the time T26 and stops driving the HA address signals. The CPU 22 also stops driving the HADS* signal so that it is tri-stated at the time T26, although the CPU 22 continues to assert the HBUSY* signal low to allow it to regain permanent bus mastership of the host bus 20 after the back-off cycle is complete, if necessary.

The CPU 24 is now the temporary bus master and asserts the HADS* signal low at a time T28, which is one HCLK period after the time T26 when the HBOFF* signal was detected asserted low. Also at the time T28, the temporary bus master CPU 24 begins asserting the HA address signals to write the entire modified line of memory back to the main memory 32. In the preferred embodiment a cache line is 32 bytes long. At time T30, one HCLK period after the time T28, the CPU 24 negates the HADS* signal high, and begins asserting data on the HD data signals. If the cycle which was aborted was a read cycle, the CPU 22 snarfs the data while asserted on the HD data signals rather than waiting until after the write-back cycle to retrieve the data. Note that the CPU 22 is continually asserting the HBUSY* signal throughout the write-back cycle of the CPU 24.

At a subsequent time T36, the CPU 24 is finished with the back-off cycle and asserts the HBOFF* signal high, and stops driving the HADS* and the HA address signals. The CPU 22 detects the HBOFF* signal pulled high and one HCLK period after the time T36, at a time T38, the CPU 22 asserts the HADS* signal low and begins reasserting the HA address signals to repeat the interrupted write cycle. If the interrupted cycle was a read cycle, it need not be repeated since the aborted CPU 22 snarfs the data during the backoff cycle. Again, the CPU 22 continually asserts the HBUSY* signal low after the time T22 to regain permanent bus mastership of the host bus 20 after the temporary backoff cycle.

Figure 5:
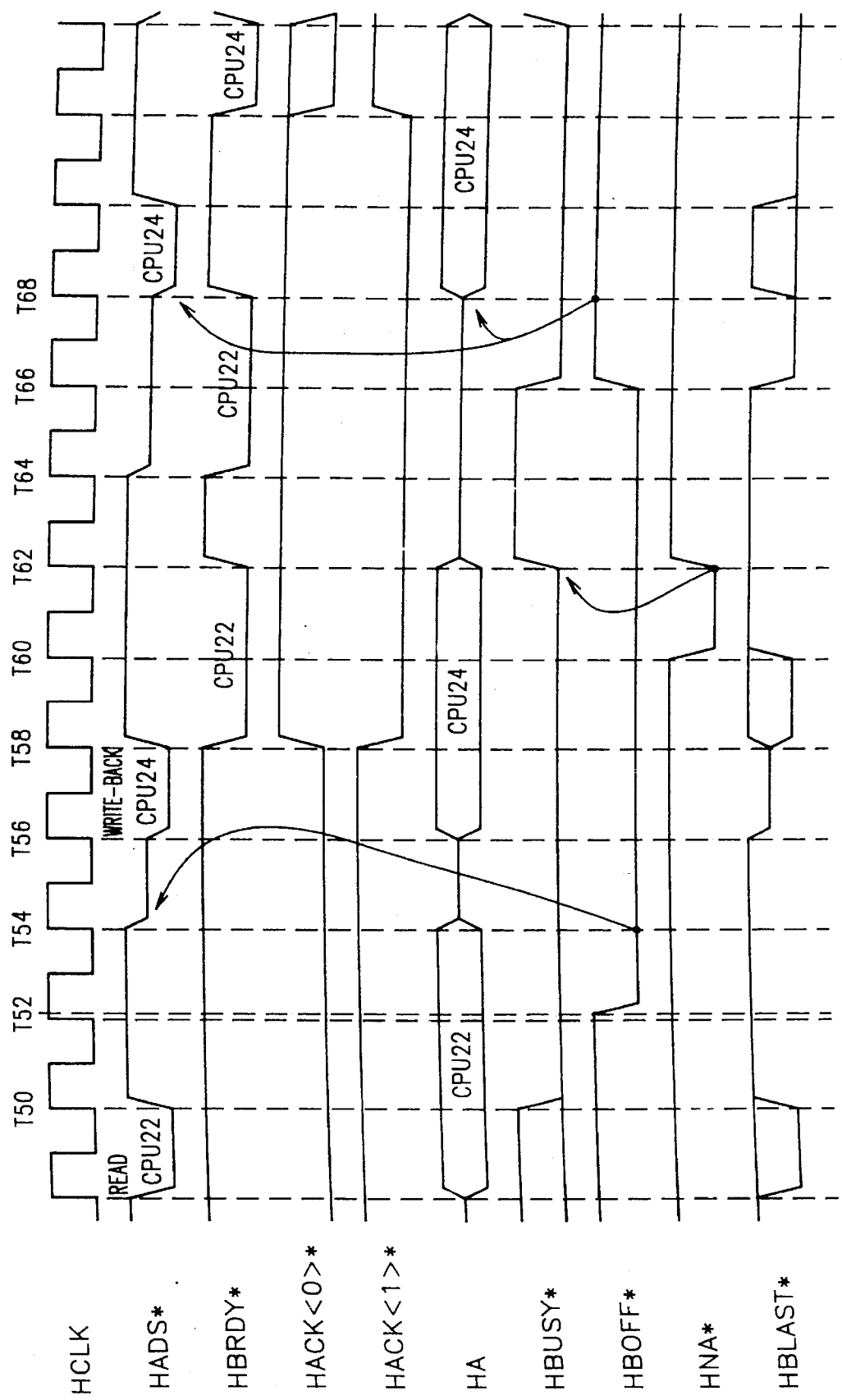
FIG. 5 is a timing diagram illustrating arbitration of the host bus of FIG. 1 during a write-back cycle.

Arbitration of the host bus 20 may occur during a back-off cycle. Referring now to FIG. 5, a timing diagram is shown illustrating arbitration during a back-off cycle. At a time T50, the CPU 22 is driving the HA address signals and asserts the HBUSY* signal low indicating that it is the current bus master. The CPU 24 asserts the HBOFF* signal at a time T52, but the HBOFF* signal is not detected until the next rising edge of the HCLK signal, which occurs at a time T54. The CPU 22 immediately stops driving the HA address signals and the HADS* signal at the time T54 in response to the detection of the HBOFF* signal asserted low. One HCLK period after the time T54, at a time T56, the CPU 24 begins its write-back cycle by asserting the HADS* signal low and the HA address signals. Meanwhile, the CPU 24 determines that it needs to have permanent bus mastership of the host bus 20, so it asserts it HBREQ<1>* signal low (not shown in FIG. 5). The prioritizer 64 detects the HBREQ<1>* signal, awards the CPU 24 highest priority, and negates the HACK<0>* signal high at a time T58. The prioritizer 64 also begins asserting the HACK<1>* signal low at the time T58. The HACK<1>* signal needs to be low by a time T62 when the HBUSY* signal is negated high.

The host bus 20 supports address and status signal pipelining. The purpose of address pipelining is to make the HA address signals of the next host bus 20 access available before the start of the next data transfer phase of the cycle. Pipelining is useful for bus slaves to efficiently transfer data and to reduce the snoop latency induced by bus masters. The host bus 20 also allows arbitration to take place while the data transfer cycles are in progress. Pipelined arbitration is a way to more efficiently transfer control of the host bus 20 from one permanent bus master to the next without any idle data transfer states. The new bus master can pipeline its HA address signals while the transfer of the data on the HD data signals for the last bus master is still in the process of completing. The host bus 20 includes a signal HNA* which is an address and status pipelining mechanism similar to the NA* signal for the i386 microprocessor by Intel. Address pipelining can be determined to be in progress if the HADS* signal is sampled low by a bus slave during an active transfer cycle.

The pipelining mechanism HNA* signal causes a CPU to start to pipeline the host bus 20 as soon as it is able to do so. If an arbitration is requested and HNA* has been asserted low, then pipelined arbitration may occur. Pipelined arbitration allows a new bus master to drive the HA address signals while a previous bus master is waiting for the end of its bus read or write data transfer. The bus master is allowed to pipeline the HA address signals on any HCLK signal rising edge when or after the HNA* signal is sampled asserted low. Several bus slaves may drive the HNA* signal, so normally the HNA* signal is tri-stated and pulled-up. When a device wants to initiate pipelining, it asserts the HNA* signal low for one HCLK period, and then negates the HNA* signal high.

In FIG. 5, the bus slave device asserts the HNA* signal low at a time T60, and asserts the HNA* signal high at a time T62, one HCLK period later. The CPU 22 detects the assertion of the HNA* signal at the time T62, and determines whether it needs the host bus 20 any longer. If the CPU 22 no longer requires control of the host bus 20, as is the case illustrated in FIG. 5, it negates the HBUSY* signal high at the time T62 in response to the detection of the HNA* signal being asserted low. The CPU 24 stops driving the HA address signals at the time T62, but is not through with the host bus 20 until two HCLK periods later, at a time T66, when it negates the HBOFF* signal high. The HACK<1>* signal is not detected low until the time T64 which is the next rising edge of the HCLK signal. Therefore, since the HACK<1>* signal is detected low and the HBUSY* signal is detected negated high, the CPU 24 is the next bus master of the host bus 20 after the completion of the write-back cycle.

A new bus master behaves, however, like the previous permanent bus master would behave if it was attempting to restart its interrupted cycle, by waiting for the HBOFF* signal to be negated high before taking control of the host bus 20 and asserting the HA address signals. No permanent bus master may drive the HA address signals while the HBOFF* signal is asserted low. At the time T66, the CPU 24 begins asserting the HBUSY* signal low. One HCLK period later, at a time T68, the CPU 24 detects the HBOFF* signal negated high and asserts the HADS* signal low and begins driving the HA address signals.

Referring now to FIGS. 6A and 6B, two timing diagrams are shown illustrating non-pipelined cycles with and without arbitration occurring. In FIGS. 6A and 6B at a time T80, the CPU 22 becomes bus master of the host bus 20 and asserts the HADS* signal low and begins driving the HA address signals. One HCLK period later at a time T82, the CPU 22 negates the HADS* signal high. Also at the time T82, the CPU 22 begins asserting the HD data signals. In FIG. 6A at a time T86, arbitration of the host bus 20 does not occur so that the CPU 22 retains control of the host bus 20. Therefore, at the time T86, the CPU 22 asserts the HADS* signal low to indicate the start of the next cycle. The CPU 22 also changes the HA address signals and stops driving the HD data signals for one HCLK period. At a time T88, the CPU 22 negates the HADS* signal high and begins asserting new data on the HD data signals.

On the other hand, in FIG. 6B, at the time T86 the CPU 22 is finished and thus stops driving the HA address signals, the HD data signals, and the HADS* signal. The HADS* signal is triostated for one HCLK period. At the time T88, the CPU 24 assumes control of the host bus 20 and begins driving the HA address signals and asserts the HADS* signal low. One HCLK period later, at a time T90, the CPU 24 negates the HADS* signal high and begins driving the HD data signals. Notice that the HNA* signal remains inactive and pulled-up since pipelining is not used.

A host bus "burst" ready signal, referred to as HBRDY*, may be used to tell the bus master that a particular burst data transfer is complete. This signal is typically asserted by the EBC 38 or memory controller 30 when valid read data has been presented or when write data has been accepted. During cycles initiated by one of the CPUs 22–28, the HBRDY* signal is used to track the cycles. The HBRDY* signal may be driven by multiple sources including slave devices. Normally, the HBRDY* signal is tri-stated and pulled-up. When a source asserting the HBRDY* signal low is done, it must assert the HBRDY* signal high for one-half HCLK period before tri-stating it. This allows safe sharing of the HBRDY* signal with a minimum of two HCLK periods between two different sources driving the HBRDY* signal. The HBRDY* signal is used in conjunction with another signal HBLAST* or host bus burst last cycle, in that when both signals are detected asserted low, the data transfer is complete.

In FIG. 6A, a signal referred to as HBRDY*+HBLAST* is shown. The "+" symbol as used in FIGS. 6A, 6B, 7A and 7B is the logical "OR" operation so that the HBRDY* and the HBLAST* signals are logically ORed together. The signal HBRDY*+HBLAST* in FIGS. 6A, 6B, 7A and 7B is for illustrative purposes only and shows the combined effect of the HBRDY* and HBLAST* signals. At the time T86 when both HBRDY* and HBLAST* are asserted low, the end of the current data transfer is complete so that the bus master can stop driving the HD data signals and can begin asserting a new address on the HA address lines. In FIG. 6B, the detection of the HBRDY* and HBLAST* signals asserted low at the time T86 allows the CPU 22 to stop driving the HA address and HD data signals so that the CPU 24 can begin asserting a new address one HCLK period later.

Figure 7A:
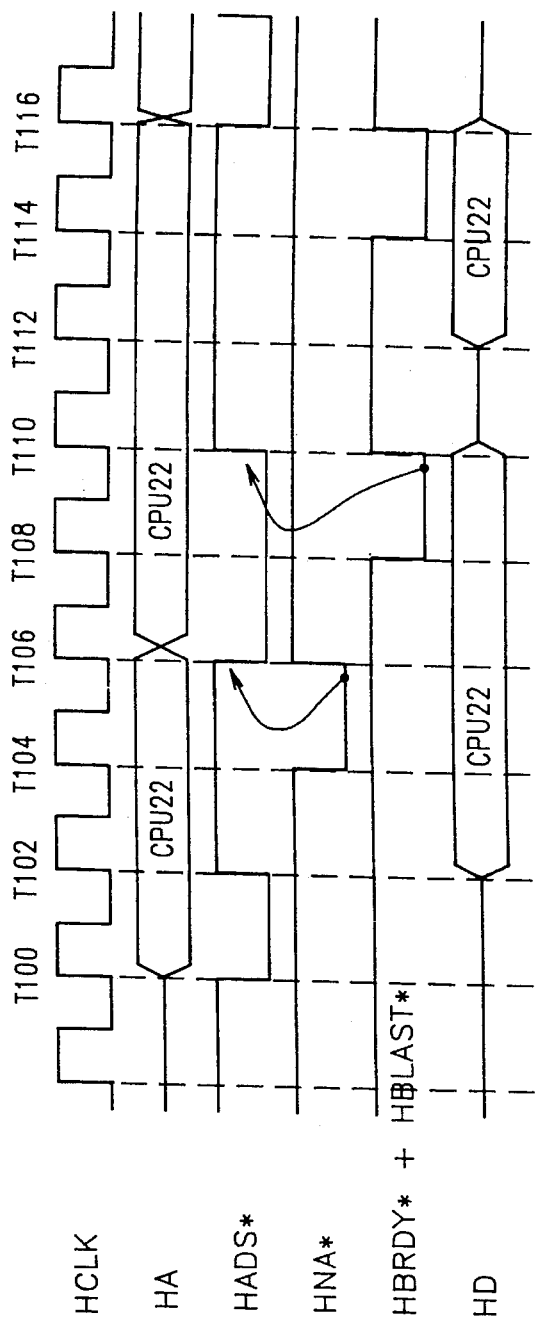
FIG. 7A is a timing diagram illustrating a pipelined cycle of the host bus of FIG. 1.
Figure 7B:
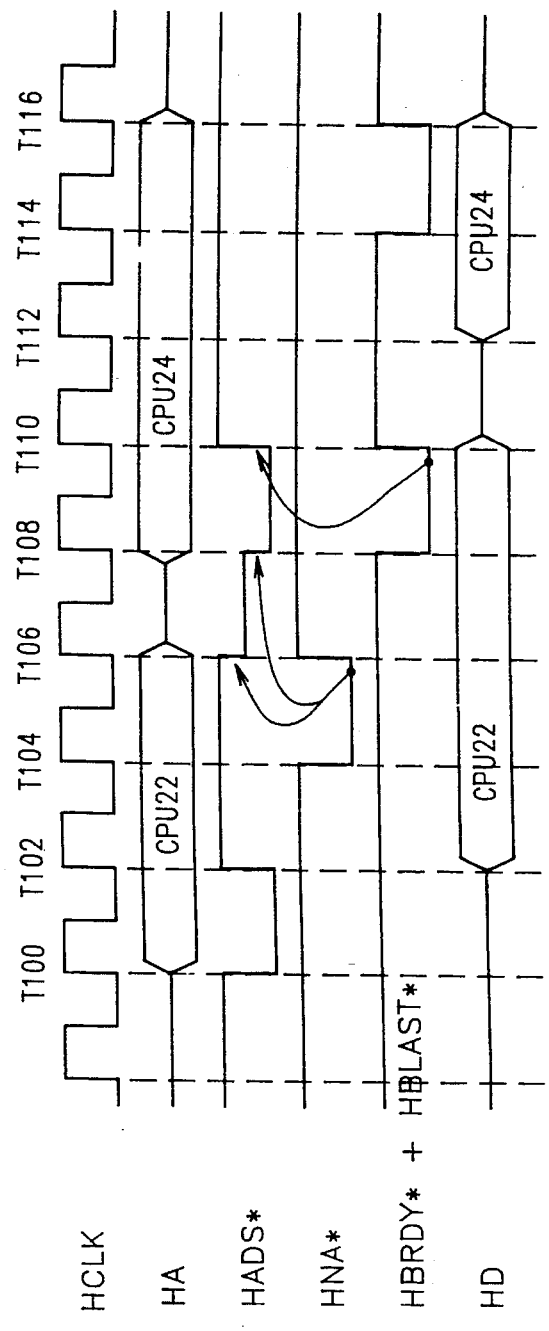
FIG. 7B is a timing diagram illustrating a pipelined cycle during arbitration of the host bus of FIG. 1.

Referring now to FIGS. 7A and 7B, two timing diagrams are shown illustrating pipelined cycles with and without arbitration occurring. In FIG. 7A, the CPU 22 is pipelining its addresses and there is no arbitration to another bus master. At a time T100, the CPU 22 asserts the HADS* signal low and begins driving the HA address signals as usual. The CPU 22 asserts the HD data signals one HCLK period later at a time T102. The HNA* pipelining signal is asserted low at a time T104, although it is not detected until one HCLK period later at a time T106. At the time T106, the CPU 22 detects the HNA* signal asserted low and places a new address on the HA address signals and again asserts the HADS* signal low. The HD data signals remain asserted until the HBRDY* and HBLAST* signals are detected asserted low to indicate the end of the data cycle, which occurs at a time T110. Also, the HADS* signal remains asserted low until the time T110 when the HBRDY* and HBLAST* signals are detected asserted low. The first cycle is complete at the time T110, although the second cycle has already started at the time T106 when the new address appears on the HA address signals. Note that the HA address signals during the time period from T100 to T106 corresponds to the data appearing on the HD data signals during the time period from T102 to T110. The new data is asserted on the HD data signals at a time T112, which is one HCLK period after the time T110, when the old data is no longer asserted. The HNA* signal is not asserted again so that the next address is not pipelined. Therefore, at a time T116 when the HBRDY* and HBLAST* signals are detected asserted low, the HA address signals change to the next address and the HD data signals are de-asserted.

FIG. 7B illustrates that pipelining may occur during arbitration where the next bus master can assert its address before the completion of the current bus master's cycle. Again, the CPU 22 asserts the first address on the HA address signals at the time T100. The HNA* signal is asserted low at the time T104 and detected at the time T106. The CPU 22 immediately releases the HA address lines at the time T106 so that the next bus master, the CPU 24, can assert its address on the HA address lines one HCLK period later at the time T108. As usual, the CPU 22 releases the HADS* signal at the time T106 so that the CPU 24 can assert the HADS* signal low and the new address on the HA address signal lines at the time T108. The data transfer of the CPU 22 is complete at the time T110 when the HBRDY* and HBLAST* signals are detected asserted low. The old data is no longer asserted on the HD data signals after the time T110, so that new data can be asserted on the HD data signals one HCLK period later at the time T112. The HA address signals asserted during the time period from T100 to T106 corresponds to the data asserted on the HD data signals during the time period from T102 to the time T110. Since the HA address signals are pipelined by the CPU 24, they are asserted at the time T108, which is before the completion of the previous data cycle by the CPU 22 which occurs at the time T110. Also, when the HADS* signal is asserted high at the time T110, the new data can be asserted one HCLK later at the time T112. The second cycle ends at the time T116 when the HBRDY* and HBLAST* signals are detected asserted low. Note that arbitration does not slow down the host bus 20 during pipelined cycles.

The host bus 20 also supports bursting of both memory reads and writes. In a burstable sequence in the preferred embodiment, the most data that can be transferred is 32 bytes, aligned to 32 byte boundaries which also corresponds to the size of a cache line. Burst sequences are initiated by the HADS* signal being asserted low to select the initial address to be accessed. The HBLAST* and HBRDY* signals are used to control bursting of any memory access cycle, provided that the source and slave involved in that cycle support bursting. The signal HBLAST* is asserted by the permanent or temporary bus masters during non-burstable signal accesses. If the HBLAST* signal is low during the first data cycle, then bursting does not occur. If the HBLAST* signal is high, bursting will occur as controlled by the HBRDY* signal. An external system, such as the slave, indicates its preparedness for a burst by asserting the HBRDY* signal low indicating that it has presented valid readable data or that it has accepted written data from the bus master. Once the HBRDY* signal is asserted low, the next data transfer in the burst cycle begins. By asserting the HBRDY* signal low at the end of each data transfer of a bursted sequence, the master and slave burst the next transfer as long as neither the HBOFF* nor the HBLAST* signals are asserted low, and the HLOCAL, signal is asserted low. The end of the bursted sequence is indicated when the HBRDY* and HBLAST* signals are both asserted low. Since the back-off and other abort mechanisms only interrupt the first transfer of a burst, there are no cases of restarting a burst in the middle of a burst sequence.

Figure 8A:
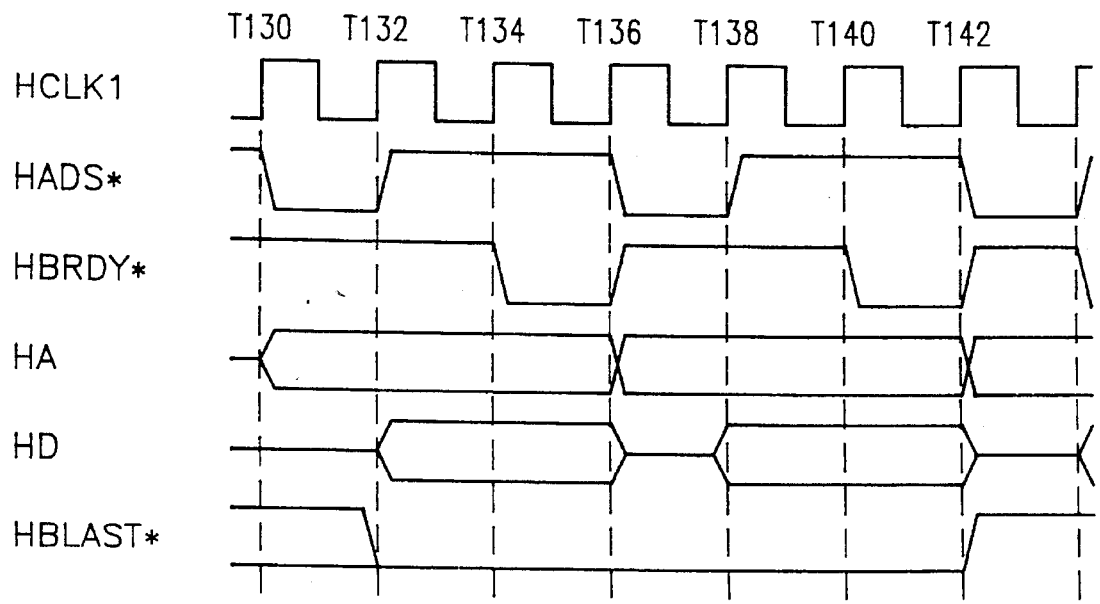
FIG. 8A is a timing diagram illustrating multiple writes in a non-bursted sequence.
Figure 8B:
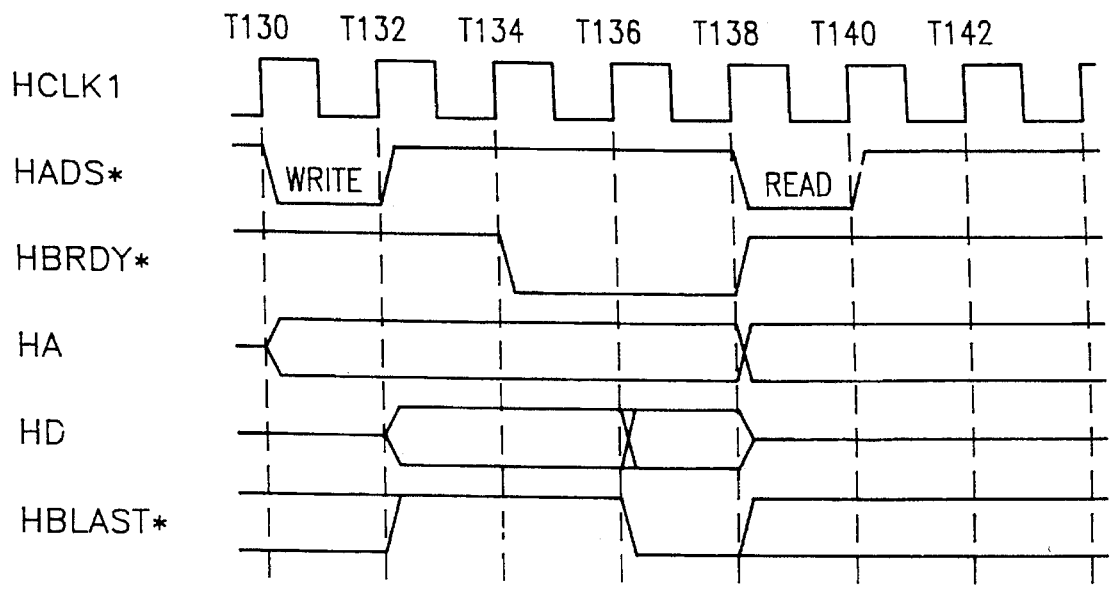
FIG. 8B is a timing diagram illustrating multiple writes in a bursted sequence.

Referring now to FIGS. 8A and 8B, two timing diagrams are shown illustrating multiple writes in nonbursted and bursted sequences. In FIG. 8A at a time T130, the HADS* signal and the HA address signals are asserted at the beginning of the cycle as usual. The HD data signals are asserted and the HBLAST* signal is low at a time T132. The first data cycle ends and a new data cycle begins at a time T136, when the HBRDY* signal is detected asserted low, the HADS* signal is asserted low, a new address appears on the HA address signals and the old data is no longer asserted on the HD data signals. New data is asserted on the HD data signals at a time T138. The last data cycle ends at a subsequent time T142. Note that a new address is asserted on the HA address signals for each new data asserted on the HD data signals. Also, note that the HD data signals are asserted for at least two HCLK periods each.

In FIG. 8B, multiple writes are shown using a bursted sequence. The cycle begins the same as a non-bursted sequence at the time T130 where the HADS* signal is asserted low and an address is asserted on the HA address signals. Also, at the time T132, data is asserted on the HD data signals and the HBLAST* signal is asserted high to indicate the beginning of a bursted sequence. At the time T134, the HBRDY* signal is asserted low to indicate the next data transfer of the bursted sequence. At the time T136, one HCLK period after the time T134, new data is asserted on the HD data signals. The HBLAST* signal is asserted low at the time T136 so that the bursted sequence ends one HCLK period later at a time T138 since the HBRDY* signal is also asserted low. However, the bursted sequence could continue for four or even eight HCLK periods so that a total of 32 bytes or 64 bytes could be transferred, 8 bytes on each 64 data bit transfer. At the time T138, the HBRDY* and HBLAST* signals are detected asserted low, thereby ending the bursted sequence. Note that although during the first cycle the data is asserted on the HD data signals for two HCLK periods, the data is only asserted for one HCLK period during the second data transfer. In fact, during each of the subsequent data cycles of a bursted sequence, the data is asserted for only one HCLK period until the end of the bursted sequence. Also note that HA address signals remain the same throughout the bursted sequence. The address asserted on the HA address signals identifies only the first address location in the sequence where the remaining data fills in subsequent address locations according to a predefined sequence.

Recall that the HLOCAL, is asserted low when an input/ output (I/O) or memory address resides in a device local to the host bus 20, and is negated high if the address is on the EISA bus 36. The HLOCAL* signal can be driven by several sources. The HLOCAL* signal is sharable since it is tri-stated and pulled high through an external resistor (not shown), and any device driving the HLOCAL* signal must never drive the signal while the HA address signals are not valid. The device driving the HLOCAL* signal must assert it low and keep it low until the HNA* signal is asserted or until the HBRDY* and HBLAST* signals are both asserted. The HLOCAL* signal is then driven high for the first half of each HCLK period and then tri-stated.

Reads and writes to the EISA bus 36 from one of the CPUs 22–28 controlling the host bus 20 are posted. This allows split transactions on the host bus 20 where other host bus masters may access the host bus 20 and complete local cycles while the EISA bus 36 is busy performing the posted read or write. As described below, the CPU waiting for the data need not rearbitrate for the host bus 20 when the data is returned from the EISA bus 36. For write cycles, the HBRDY* signal is asserted by the EBC 38 as soon as the write data is latched into the data buffers of the SDB 40 and the CPU in control of the host bus 20 may proceed with its cycles. For read cycles, the cycle is split into a read request and a read response transaction. The EBC 38 asserts the HBRDY* signal as soon as it determines that the cycle is to the EISA bus 36 and there are no other unfinished cycles. The request portion of the read cycle is finished at this point and the requesting CPU must wait for the read data before continuing and may arbitrate the host bus 20 if another device is requesting it. If the CPU detects the HLOCAL* signal negated and the HBRDY* signal asserted, and if its HACK<n>* signal is negated indicating another CPU wants the host bus 20, then the requesting CPU will release control of the host bus 20.

An EISA cycle is then initiated on the EISA bus 36 to write data to or read data from the appropriate device. The EBC 38 also asserts a signal E_RTRY* low to indicate that the address and status posting buffers within the SDB 40 are full and that all other CPU to EISA cycles must be aborted and retried later. The EBC 38 negates the E_RTRY* signal when it is ready to post another cycle to the EISA bus 36. The E_RTRY* signal resides on the host bus 20. A signal START, residing on the EISA bus 36 is asserted low to indicate the beginning of a cycle on the EISA bus 36. An EISA bus controller asserts the START* signal after the address becomes valid and negates it after one nominal period of a clock signal referred to as the BCLK signal which resides on the EISA bus 36. The BCLK signal is the EISA bus clock and is essentially generated by dividing the HCLK signal by four on a 33 MHz host bus 20 or by three on a 25 MHz host bus 20 so that the frequency is preferably approximately 8.25 or 8.333 MHz with a normal duty cycle of approximately 50%. The START* signal is provided by the EBC 38 when the CPU on the host bus 20 is addressing an EISA bus slave during DMA, refresh or ISA bus master cycles. Another signal residing on the EISA bus 36, referred to as CMD*, provides timing control on the EISA bus 36 and is asserted by the EBC 38 when the START* signal is negated and remains asserted until the end of a nominal EISA cycle. Thus, a nominal EISA cycle is indicated by the assertion of the START* signal and the subsequent negation of the CMD* signal. The START* and CMD* signals reside on the EISA bus 36. Another signal, referred to as E_BUSY*, is asserted by the EBC 38 on the next rising edge of the HCLK after the START* signal is asserted and is negated at the end of the entire EISA cycle initiated by a CPU. The E_BUSY* signal resides on the host bus 20. One or more nominal EISA cycles may occur during one EISA cycle.

The EBC 38 asserts a signal referred to as HDREQ* low to request the data portion of the host bus 20 when it has the read data valid for the CPU that requested it. The HDREQ* signal is asserted for at least one HCLK period and the host data bus must be idle before the EBC 38 drives the read data on it. Once the host data bus is idle, the HDREQ* signal is negated high and the read data is driven on the HD data signals for approximately one HCLK cycle. Thus, the assertion of the HDREQ* signal indicates when posted read data is valid and latched into the SDB 40. The negation of the HDREQ* signal indicates that the EBC 38 has determined that the host data bus is idle and thus available for the EBC 38 to drive the read data onto the host data bus from the SDB 40. The CPU that is waiting for the posted read data detects the HDREQ* signal asserted low and samples or retrieves the data when the HDREQ* signal is subsequently negated high. It is significant to note that the requesting CPU need not, and generally does not need to be in control of the host bus 20 to retrieve the data. The requesting CPU need not request control of the entire host bus 20, but only needs to retrieve the data when the HDREQ* is negated high regardless of which bus master is in control of the host bus 20 at that time.

To implement split transactions, the EBC 38 monitors the host data bus to determine when it is idle. If the host data bus is not idle, the EBC 38 waits for the current cycle to finish before it negates the HDREQ* signal. In case the current cycle is backed off by the HBOFF* signal, the EBC 38 waits for the temporary bus master to finish its cycle before the data is driven onto the host data bus. The host data bus is idle if no cycles are running or if a cycle has just started as indicated by the HADS* signal being asserted low at the same time that the HDREQ* signal is also asserted low. The HDREQ* signal has priority in the latter case so that the current cycle must wait for the posted read data to be driven on the HD data signals before the current cycle can continue.

Figure 9B:
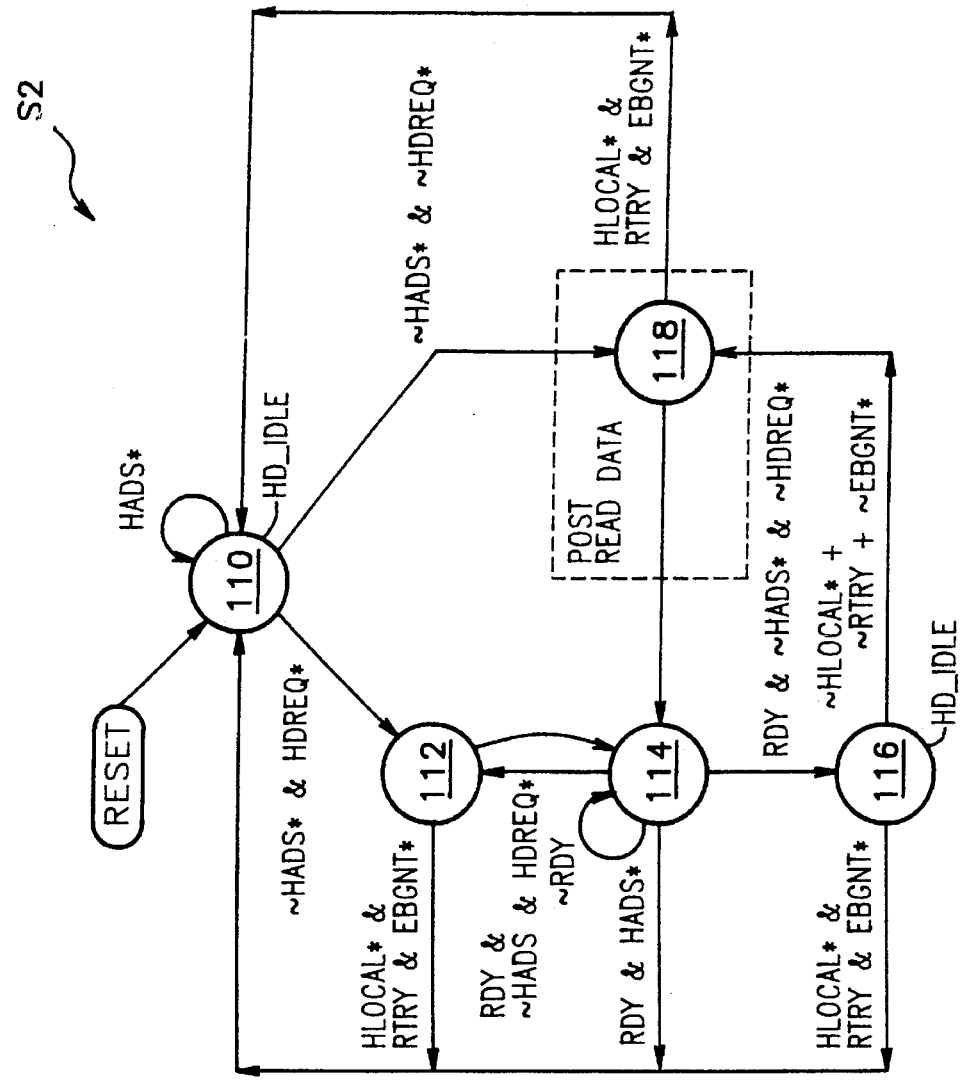
FIGS. 9A and 9B show state diagrams illustrating the operation of state machines in the EISA bus controller of FIG. 1 which tracks the host data bus to perform a split transaction.
Figure 9A:
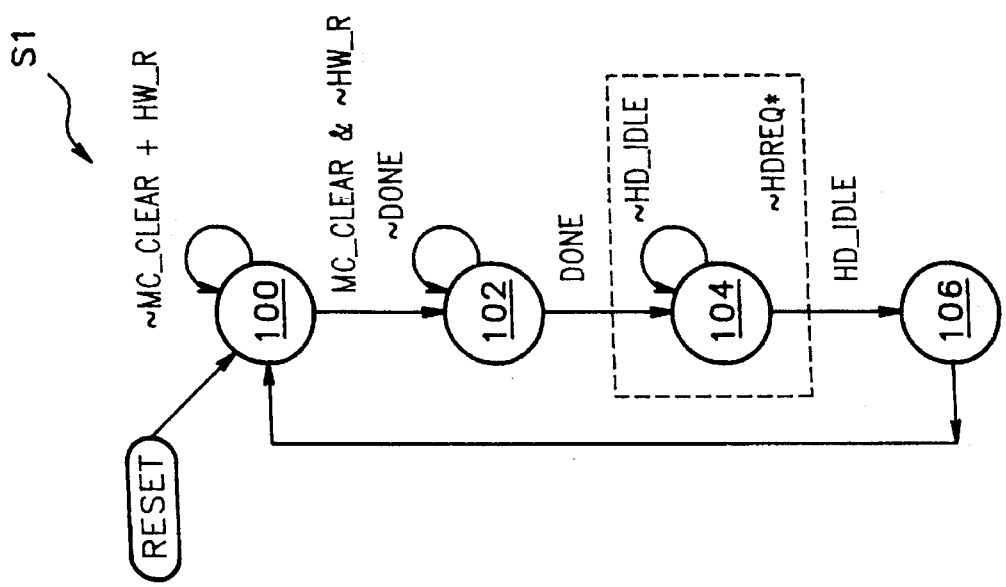

Referring now to FIG. 9A, a state diagram is shown illustrating the operation of a state machine within the EBC 38, referred to as S1, which tracks the read response operation of a posted read to the EISA bus 36 and generates the HDREQ* signal. The state machine S1 has four states where the states are advanced or changed based on the rising edge of the HCLK signal. A signal MC_CLEAR is an internal signal similar to the START* signal, although the MC_CLEAR signal is synchronized to the HCLK signal and thus is asserted high at the first rising edge of the HCLK signal after the START* signal is sampled asserted low. At reset of the computer system S, the state machine S1 starts at a state 100, and remains in state 100 while the MC_CLEAR signal is negated low or while the HW_R signal is asserted high indicating a write cycle. When the MC_CLEAR signal is detected asserted high and the HW_R signal is asserted low at the rising edge of the HCLK signal, the state machine S1 advances to a state 102 indicating a posted read cycle has been initiated from a CPU to the EISA bus 36.

A signal referred to as DONE is asserted during the last HCLK period of the last CMD* signal of the read assembly sequence indicating the completion of the EISA posted read cycle. Thus, the state machine S1 remains in state 102 while the DONE signal is negated low, and advances to a state 104 when the DONE signal is asserted. In state 104, the read data is available for the CPU waiting for it, so the EBC 38 asserts the HDREQ* signal low to request the host data bus. A signal HD_IDLE is generated by another state machine S2 in the EBC 38 (FIG. 9B) which indicates when the host data bus is idle and available for the read data to be asserted. The state machine S1 remains in state 104 while the HD_IDLE signal is negated low, and advances to a state 106 when the HD_IDLE signal is asserted high. The EBC 38 negates the HDREQ* signal in state 106 and also drives the read data on the HD data signals of the host bus 20. The state machine S1 remains in state 106 only for one HCLK period, and then returns back to state 100.

Referring now to FIG. 9B, a state diagram is shown illustrating another state machine in the EBC 38, referred to as S2, which tracks the host data bus and generates the HD_IDLE signal when the host data bus is idle. The state machine S2 has five states, again advanced by the HCLK signal. At reset of the computer system S, the state machine S2 enters a state 110 and remains in state 110 while the HADS* signal is negated. The host data bus is considered idle in state 110 since the HADS* signal has not yet been asserted low, so that the HD_IDLE signal is asserted in state 110. If the HADS* signal is asserted and the HDREQ* signal remains negated, the state machine S2 advances to a state 112, indicating that a cycle is beginning on the host bus 20 by another CPU or another device. The host data bus is not idle in state 112 so that the HD_IDLE signal is negated and not asserted in state 112. A signal RTRY is true if the E_RTRY* signal is asserted low, or if a signal referred to as LE_RTRY* and a signal referred to as HLOCK* are both asserted low. The LE_RTRY* and HLOCK* signals will be described more fully below. For now, the LE_RTRY* and HLOCK* signals indicate to the CPU running the cycle that it must abort the cycle and try again later if both are asserted low, which is similar to the effect of the E_RTRY* signal. If the HLOCAL* and EBGNT* signal are both negated high, and if the RTRY signal is true in state 112, the CPU running the current cycle aborts the cycle and the state machine S2 returns back to state 110. Otherwise, the state machine S2 advances to a state 114 on the next rising edge of the HCLK signal.

The HD_IDLE signal is asserted in state 114 if the HLOCAL* signal is negated high and if the HW_R signal is asserted low indicating a read cycle to the EISA bus 36. Otherwise, the HD_IDLE signal is negated in state 114. The state machine S2 remains in state 114 while a signal RDY is false, where the RDY signal is defined by the following equation:

$$RDY = \sim HBRDY^* \text{ \& } ((HLOCAL^* + (\sim HBLAST^* \text{ \& } HBOFF^*))$$

Thus, the RDY signal become true at the end of the current cycle on the host bus 20. If the HADS* signal is asserted low and the HDREQ* signal is negated high when RDY becomes true, the state machine S2 returns to state 112. If the HADS* signal is negated high when the RDY signal becomes true in state 114, the state machine S2 returns to state 110. Otherwise, if the HADS* and HDREQ* signals are both asserted low when the RDY signal is true in state 114, the state machine S2 advances to a state 116 where the HD_IDLE signal is asserted high.

In state 116, it is determined if the current cycle needs to be retried or continued and control of the host data bus is being transferred to the EBC 38. Thus, if the HLOCAL* and EBGNT* signals are negated high and the RTRY signal is true, the current cycle is aborted and the state machine S2 returns to state 110. Otherwise, the state machine S2 advances to a state 118 where the read data is driven onto the idle host data bus. In state 118, a new cycle is in progress, but the read data for the previous read cycle is being driven on the HD data signals by the EBC 38. In state 118, if the RTRY signal is true and if the HLOCAL* and EBGNT* signals are negated, the new cycle is retried and the state machine S2 returns to state 110. Otherwise, if the RTRY signal is false, or if either the HLOCAL* or the EBGNT* signals are asserted in state 118, the cycle can continue and the state machine S2 advances to state 114. Referring back to state 110, if the HADS* and HDREQ* signals are both asserted low in state 110, the state machine S2 advances directly to state 118 since the EISA read response transaction takes precedence over the new cycle if both begin at the same time.

Figure 10A:
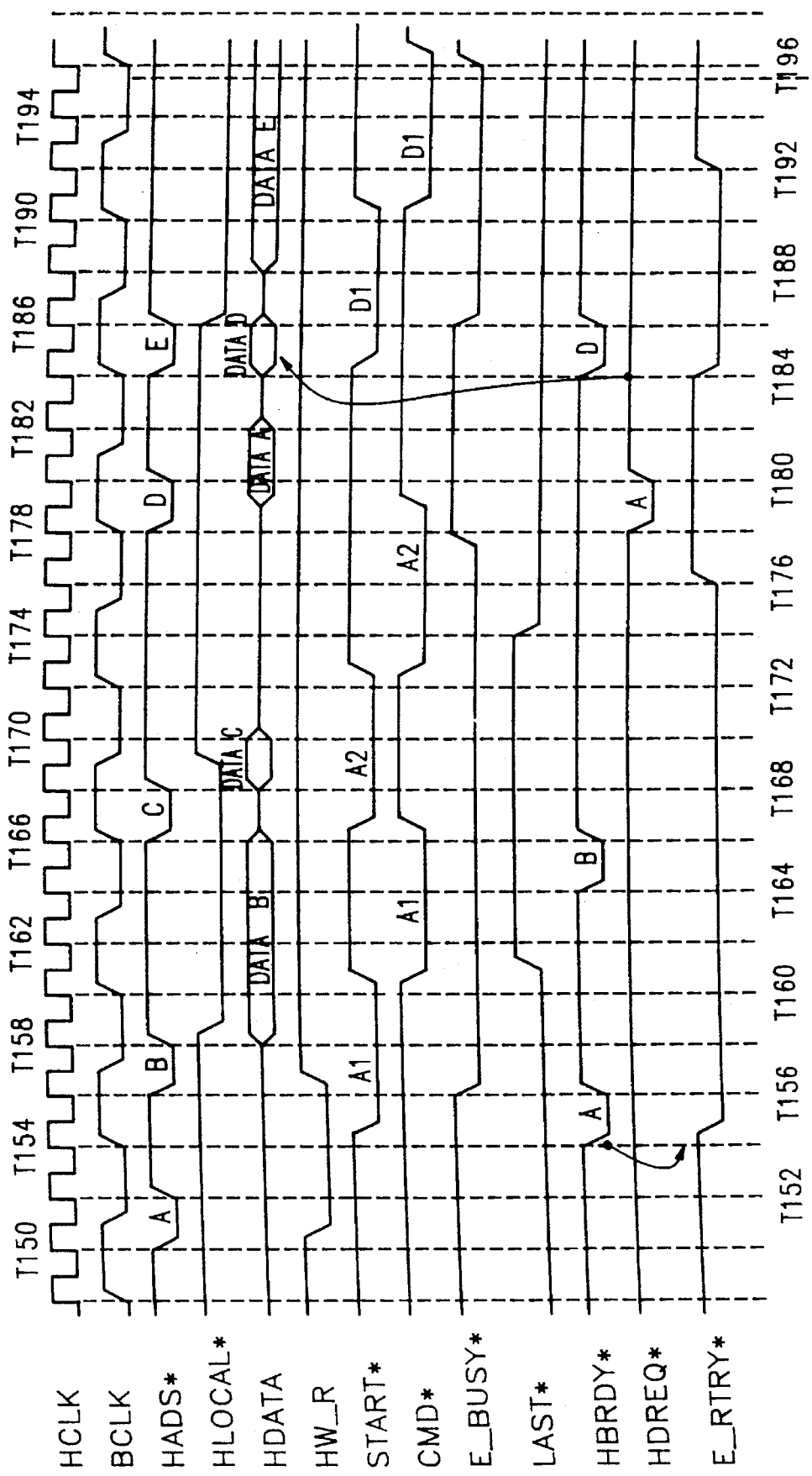
FIGS. 10A—10D show timing diagrams which illustrate CPUs forced off the host bus of FIG. 1 due to posted operations of the EISA bus and locked cycles.

Referring now to FIG. 10A, a timing diagram is shown illustrating posted read and write operations and the split transaction technique. The BCLK signal can be asserted high for an extended period of time as required by the system for synchronization to the CPU in control of the host bus 20. The EBC 38 posts the cycle to the EISA bus 36 if the HLOCAL* signal is sampled negated on the second rising edge of the HCLK signal after the HADS* signal is asserted low. A signal HW_R is provided to the EBC 38 and indicates whether the cycle is a read or write cycle and is asserted high during a write cycle and low during a read cycle. The HW_R signal is valid from the leading edge of the HADS* signal until the end of the cycle when the HBRDY* and HBLAST* signals are both asserted low or if the HNA* signal is asserted low.

In FIG. 10A an EISA posted read cycle, referred to by the letter A, is initiated by the CPU 22 at a time T150 where the HADS* signal is asserted low. The time designators are incremented by two to indicate one HCLK period unless otherwise indicated. The HW_R signal is also asserted low during the HCLK period between the time T150 and a time T152 to indicate a read cycle. The HADS* signal is negated high at the time T152 and the HLOCAL* signal is sampled high at a time T154 on the second rising edge of the HCLK signal after the HADS* signal was asserted low indicating a read cycle to the EISA bus 36. The address signals are asserted during this cycle as described previously and are not shown for purposes of simplification. The cycle is terminated during the following HCLK period between the time T154 and a time T156 where the HBRDY* signal is asserted low indicating that the EBC 38 is finished with the address or read request phase of the cycle, so that the CPU 22 releases control of the host bus 20 for use by another host bus master. Meanwhile, the E_RTRY* signal is asserted low after the time T154 indicating that the SDB 40 posted buffers are full to prevent another posted cycle to the EISA bus 36. The EISA cycle is initiated at the time T154 where the START* signal is asserted low by the EISA bus controller.

The EISA posted read cycle a comprises two nominal cycles referred to as A1 and A2 where the nominal cycle A1 is completed at a time T166 when the CMD* signal is asserted high and the START* signal is again asserted low indicating the start of the second nominal cycle A2 which is terminated at a time T178 when the CMD* signal is negated high. The entire EISA cycle is indicated by the E_BUSY* signal which is asserted low by the EBC 38 at the time T156 to indicate the beginning and is negated high at the time T178 to indicate the completion of the EISA cycle. Meanwhile, at the time T156 another cycle referred to by the letter B is initiated by the CPU 24 which takes control of the host bus 20 and asserts the HADS* signal low at a time T156 for one HCLK period. The HLOCAL* signal is asserted low between the time T158 and a time T160 and the HW_R signal is asserted high at the time T156 indicating that cycle B is a local memory write cycle. Data is placed on the HD data signals at the time T158 and the HBRDY* signal is asserted low at a time T164 and asserted high again one HCLK period later at a time T166 indicating the completion of the local memory write cycle B.

A new cycle C is initiated at the time T166 where the CPU 26 takes control of the host bus 20 and asserts the HADS* signal low and negates it high at a time T168. The data for the C cycle is asserted on the HD data signals at the time T168 and the HW_R signal remains asserted high indicating a write cycle. The HLOCAL* signal is negated high during the HCLK cycle between the times T168 and T170 indicating that cycle C is an EISA posted write cycle to the EISA bus 36. At the time T170, however, the E_RTRY* signal is detected low indicating that the EBC 38 is unavailable to post cycle C. Thus, the CPU 26 is forced to abort its access to the EISA bus 36 and stops asserting the data on the HD data signals at the time T170.

Data from the posted read cycle is retrieved at a time T176 and latched into the SDB 40 so that the E_RTRY* signal is negated high at the time T176. The EISA cycle is completed one HCLK period later at a time T178 when the CMD* signal is negated high and the HDREQ* signal is asserted low indicating that the EISA posted read data is retrieved. A new cycle referred to by the letter D is initiated on the host bus 20 by the CPU 28 which asserts the HADS* signal low at the time T178 and negates the HADS* signal at a time T180. Since the HADS* and HDREQ* signals are asserted at the same time, the HDREQ* signal has priority so that the CPU 28 running the D cycle does not assert its data on the HD data signals until after the posted read data of cycle A is asserted. Thus, the HDREQ* signal is negated high at the time T180 and the data for the EISA posted read cycle A is placed on the host bus 20 by the EBC 38 during the HCLK period between the times T180 and T182. This data must be sampled by the waiting CPU 28 during this HCLK period.

Meanwhile, the HLOCAL* signal remains negated high at the time T182 and the HW_R signal is also asserted high indicating that cycle D is an EISA posted write cycle. One HCLK period after the time T182, at a time T184, the CPU 28 asserts its data on the HD data signals and keeps this data asserted for approximately one HCLK cycle until a time T186. The EBC 38 also asserts the HBRDY* signal low at the time T184 and negates it high at a time T186, thus completing the EISA posted write cycle D on the host bus 20. The corresponding EISA cycle on the EISA bus 36 is initiated when the START* signal is asserted low at the time T184 and the EISA cycle is completed at a time T196 when the CMD* signal is again negated high. Meanwhile, a new cycle referred to by the letter E is initiated on the host data bus 20 at a time T184 where the CPU 24 takes control of the host bus 20 and asserts the HADS* signal low and negates it high at the time T186. The HLOCAL* signal is asserted low at the time T186 while the HW_R signal remains asserted high, indicating that cycle E is a local memory write cycle. The CPU 24 running cycle E does not assert its data on the HD data signals until a time T188 which is one HCLK period after the data for cycle D is no longer asserted on the HD data signals.

Figure 10B:
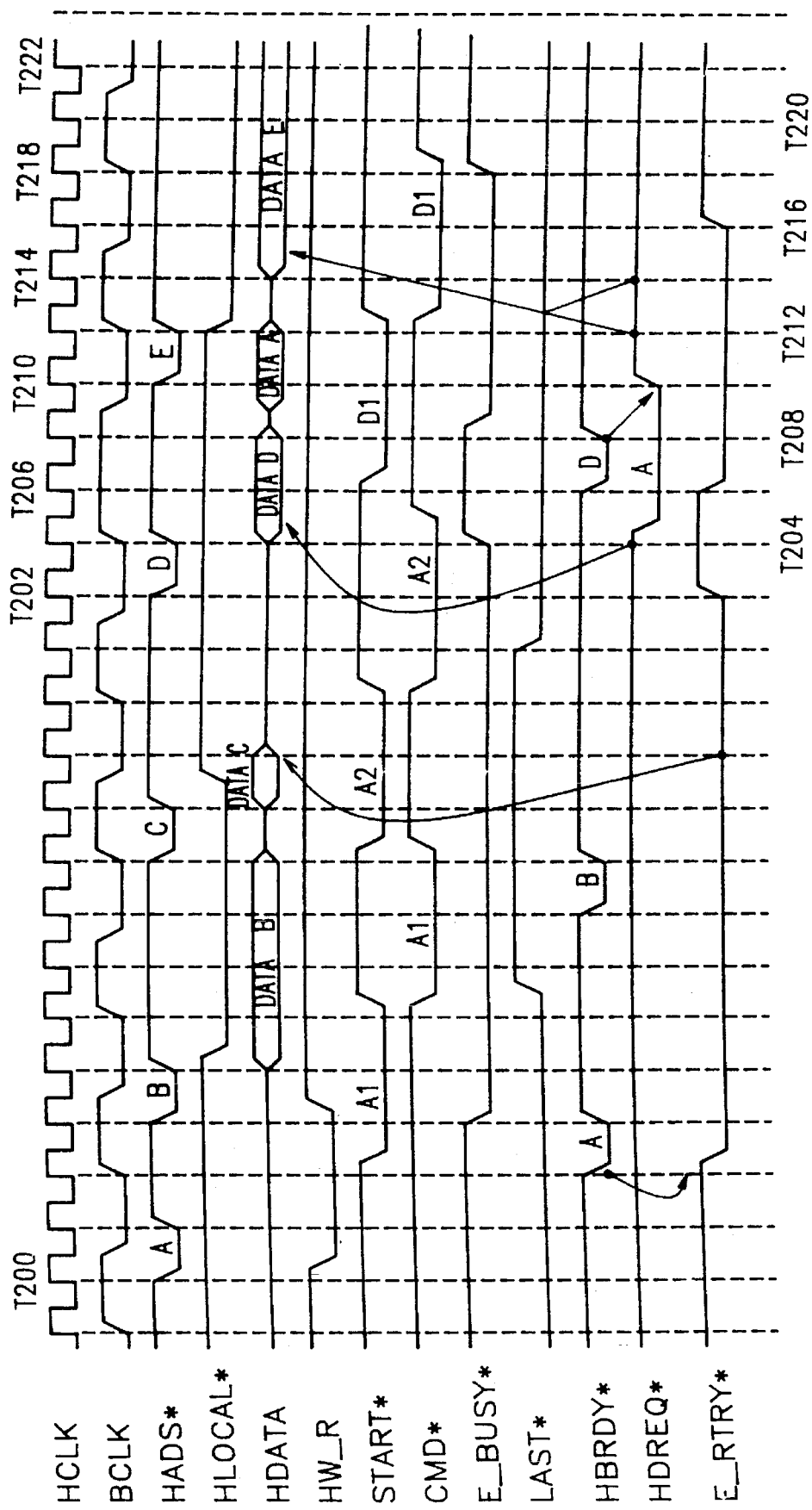

Referring now to FIG. 10B, a similar diagram as FIG. 10A is shown which begins at a time T200 and is essentially identical up to a time T202 which is approximately 13 HCLK periods later. In this case, however, cycle D starts one HCLK period earlier so that the CPU 28 asserts the HADS* signal low at the time T202 and negates it high at a time T204. Cycle D is again an EISA posted write cycle which is initiated on the host bus 20 one HCLK period before the HDREQ* signal is asserted low. Thus, the host data bus is not idle and the CPU 28 operating cycle D asserts its data on the HD data signals at the time T204. The EISA posted write cycle D completes when the EBC 38 asserts the HBRDY* signal high at a time T208, at which time the CPU 28 stops driving its data on the HD data signals. The HDREQ* signal remains asserted low by the EBC 38 until one HCLK period after the HBRDY* signal is negated high, and then is negated high at a time T210 when the SDB 40 asserts the data from the EISA posted read cycle A on the HD data signals.

Meanwhile, the START* signal is asserted low at the time T206 initiating the EISA posted write cycle D on the EISA bus 36 which completes at a time T218 when the CMD* signal is again negated high. Note also that the BCLK signal is stretched while high between the times T204 and T210. Meanwhile, a new cycle referred to by the letter E is initiated on the host bus 20 at a time T210 by the CPU 24. Cycle E is a local memory write cycle as indicated by the HLOCAL* signal asserted low at the time T212 while the HW_R signal remains asserted high. The CPU 24 may not assert its data on the HD data signals until one HCLK period after the time T212, or at a time T214, since the data from the posted read cycle A is still being asserted up to the time T212. The data for the local memory write cycle E is asserted at the time T214.

Figure 10C:
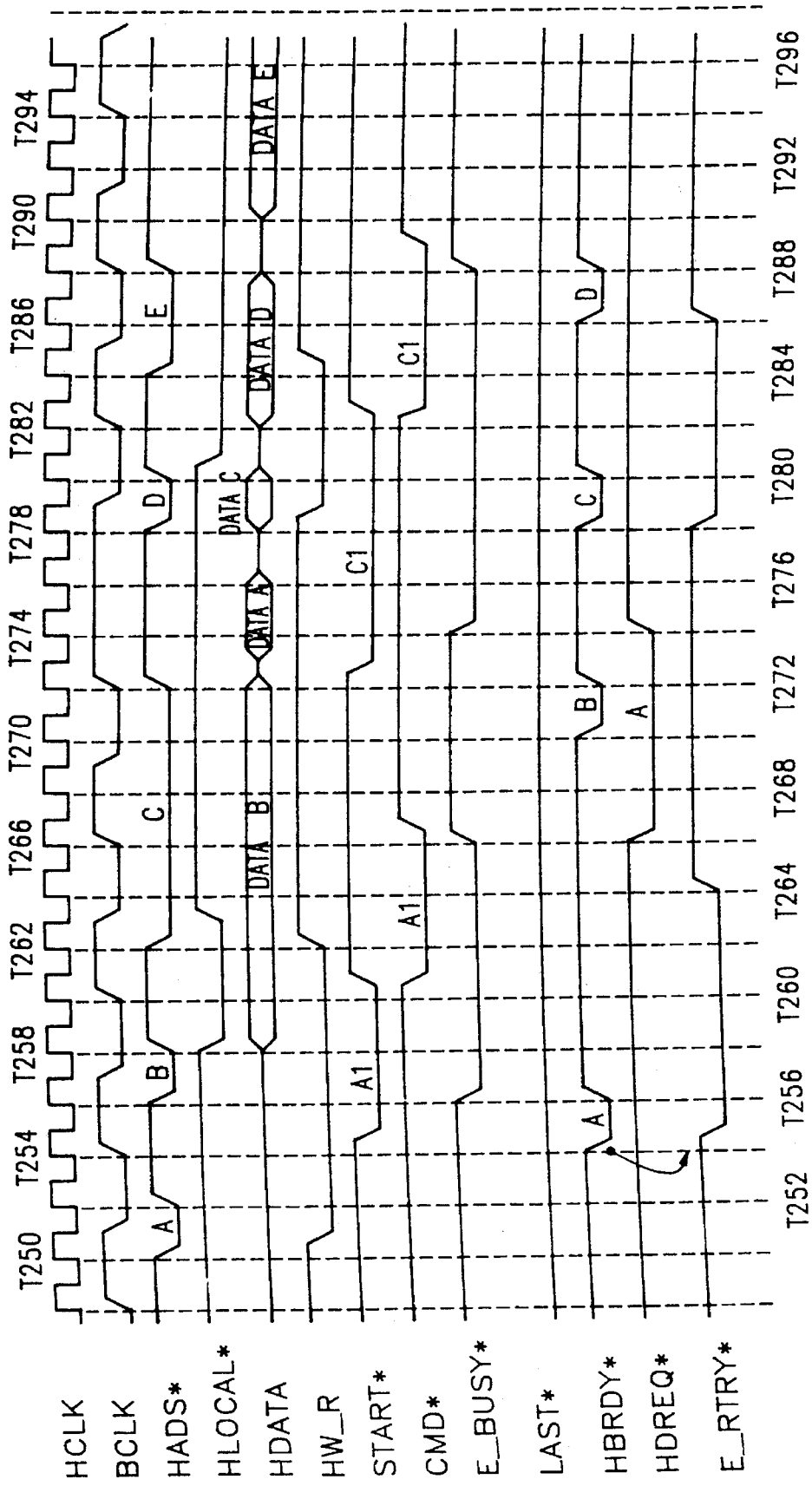

Referring now to FIG. 10C, another timing diagram is shown demonstrating when the HD data signals of the host bus 20 are available. Also, FIG. 10C illustrates pipelined operation. An EISA posted read cycle A by the CPU 22 begins at a time T250 and the read request portion completes on the host bus 20 at a time T256 when the HBRDY* signal is negated high. The EISA bus 36 is busy from the time T254 and completes its cycle at a time T266 when the E_BUSY* and CMD* signals are asserted high. The E_RTRY* signal is asserted low from the time T254 to the time T264. The HDREQ* signal is asserted low at the time T266 to initiate the read response portion of the EISA posted read cycle A. Meanwhile, a local memory read cycle B is initiated by the CPU 24 at the time T256 but it does not complete until a time T272 when the HBRDY* signal is negated high. Also, pursuant to pipelined operation, another host bus master CPU 26 asserts the HADS* signal low to begin a new cycle referred to by the letter C at a time T262, which is an EISA posted write cycle as indicated by the HLOCAL* signal negated high and the HW_R signal asserted high.

The EISA posted write cycle C is stalled until the local memory read cycle B is completed which is 5 HCLK periods after the time T262. Note that since the HADS* signal remains asserted low from the time T262 to a time T272, the CPU 26 is not aborted by the E_RTRY* signal which was negated high at the time T264. Since the local memory read cycle B was initiated before the HDREQ* signal was asserted low, the HD data bus is considered busy so that the CPU 22 running the EISA posted read cycle A must wait until the local memory cycle B completes. At the time T272, the local memory read cycle B completes when the HBRDY* signal is negated high so that the HDREQ* signal is negated high one HCLK period later at a time T274, and the data from the posted read cycle A is asserted on the HD data signals from the time T274 to a time T276. The CPU 22 detects the HDREQ* signal asserted high and reads the data. The CPU 26 running the EISA posted write cycle C, however, must wait one HCLK period after the time T276 before asserting the write data for the EISA posted write cycle C which occurs at a time T278. The HBRDY* signal is asserted low by the EBC 38 between the time T278 and a time T280 which is one HCLK period later. During this HCLK period, a new cycle referred to by the letter D is also initiated by the CPU 28 gaining control of the host bus 20 which asserts the HADS* signal low at the time T278 and negates it high at the time T280.

Meanwhile, the EISA cycle completing the EISA posted write cycle C begins at the time T272 and ends approximately at the time T288 when the CMD* and E_BUSY* signals are negated high. The data for the local memory read cycle D is not asserted until a time T282, which is one HCLK cycle after the time T280 when the CPU 26 stops asserting the HD data signals on the host data bus. The local memory read cycle D completes at the time T288 when the HBRDY* signal is negated high and the data is no longer being asserted on the HD data signals. Note also that the E_RTRY* signal is asserted low during the time period between the times T278 to T286 to prevent a subsequent posted cycle to the EISA bus 36 until the EISA posted write cycle C completes its access of the EISA bus 36.

To briefly summarize split transactions, a CPU posting a read to the EISA bus 36 may arbitrate the host bus 20 to another device and need not rearbitrate for the host bus 20 when the read data is available. Once the data is retrieved, the EBC 38 asserts the HDREQ* signal to request the host data bus and monitors the host data bus to determine when it is idle. When the host data bus is idle, the EBC 38 asserts the data onto the host data bus and negates the HDREQ* signal. The waiting CPU monitors the HDREQ* signal and retrieves the read data when the HDREQ* signal is negated high after it was asserted low.

The E_RTRY* signal indicates that the EISA bus 36 may not accept another posted read or write cycle. When one of the CPUs 22–28 is the bus master while the E_RTRY* signal is sampled asserted low, that CPU aborts its cycle, usually negates its HBREQ<n>* signal high, and arbitrates the host bus 20. After the cycle is aborted in this manner, it waits for the E_RTRY* signal to be negated high so that it can re-assert its HBREQ<n>* signal low and re-try its EISA bus 36 access. The aborted CPU, however, does not negate its HBREQ<n>* signal high when the E_RTRY* signal aborts its access when its HACK<n>* signal is still asserted low. If the aborted CPU's HACK<n>* signal is still asserted low, it signifies that no other CPU wants the host bus 20 or that the other CPUs are not connected or available. When an arbitration gives the host bus 20 back to the CPU aborted by the E_RTRY* signal, that CPU remains idle until it either arbitrates again or until the E_RTRY* signal goes high and allows it to retry its host bus 20 and EISA bus 36 access.

A CPU in control of the host bus 20 may perform locked cycles to the main memory 42 or to other memory locations coupled through the EISA bus 36. A locked cycle allows a CPU to complete multiple cycles to a memory location without interruption which is required in situations such as a read-modify-write where the read and the write operations must occur consecutively without interruption. The HLOCK* signal is asserted by a CPU in control of the host bus 20 when a locked bus cycle is started.

When the CSP 42 determines that an EISA or ISA bus master wants control of the EISA bus 36 or that a DMA or refresh cycle is pending, it asserts a signal DHOLD high on the rising edge of BCLK. An acknowledge signal DHLDA is asserted high by the EBC 38 which grants control of the EISA bus 49 to the CSP 42 on the HCLK signal rising edge after the falling edge of the BCLK signal if the EBC 38 is currently idle. If the EBC 38 is not idle, it must terminate or complete the current cycle before asserting the DHLDA signal.

The EBC 38 does not post CPU locked cycles to the EISA bus 49 if a master other than a CPU has control of the EISA bus 49. A deadlock would otherwise occur if the EBC 38 is allowed to post a locked cycle while an EISA bus master has control of the EISA bus 36 since the EISA bus master may need to access the main memory 32 through the host bus 20 which could not complete because the host bus 20 is locked waiting for the EISA bus 36 to be free. For example, if the EBC 38 is currently running a DMA cycle and a CPU begins a locked cycle on the host bus 20, the CPU 22 will not relinquish the host bus 20 to the EBC 38 and the EBC 38 needs to finish the DMA cycle before it can start on the CPU 22 EISA cycle. The LE_RTRY* signal is used to prevent this deadlock situation. The EBC 38 asserts the LE_RTRY* signal after the DHOLD signal is asserted but before the DHLDA signal is asserted, which prevents a CPU locked cycle from being posted while an ISA or EISA bus master has control of the EISA bus 36. After the LE_RTRY* signal is asserted low, the EBC 38 asserts the DHLDA signal acknowledging the request from the CSP 42 and indicates that the EISA bus 36 is available to run a DMAREFRESH, EISA or ISA bus master cycle.

Once the EISA bus master no longer requires the EISA bus 36, it negates its request signal and the CSP 42 correspondingly negates the DHOLD signal low. The EBC 38 detects the DHOLD signal negated and subsequently negates the LE_RTRY* signal high and then negates the DHLDA signal low. A CPU which gains control of the host bus 20 first looks at the E_RTRY* and HLOCAL* signals if it is attempting a posted read or write access to the EISA bus 36, whether locked or not. If a locked cycle is required to the EISA bus 36 as determined by the HLOCK* signal asserted low, then the CPU must also look at the LE_RTRY* signal if the E_RTRY* signal is not asserted low to determine whether it can gain access of the EISA bus 36 and perform a locked cycle. If LE_RTRY* is also negated, the CPU may perform its locked cycle. However, if the LE_RTRY* and HLOCK* signals are asserted, the CPU must abort its cycle and try again later.

Figure 10D:
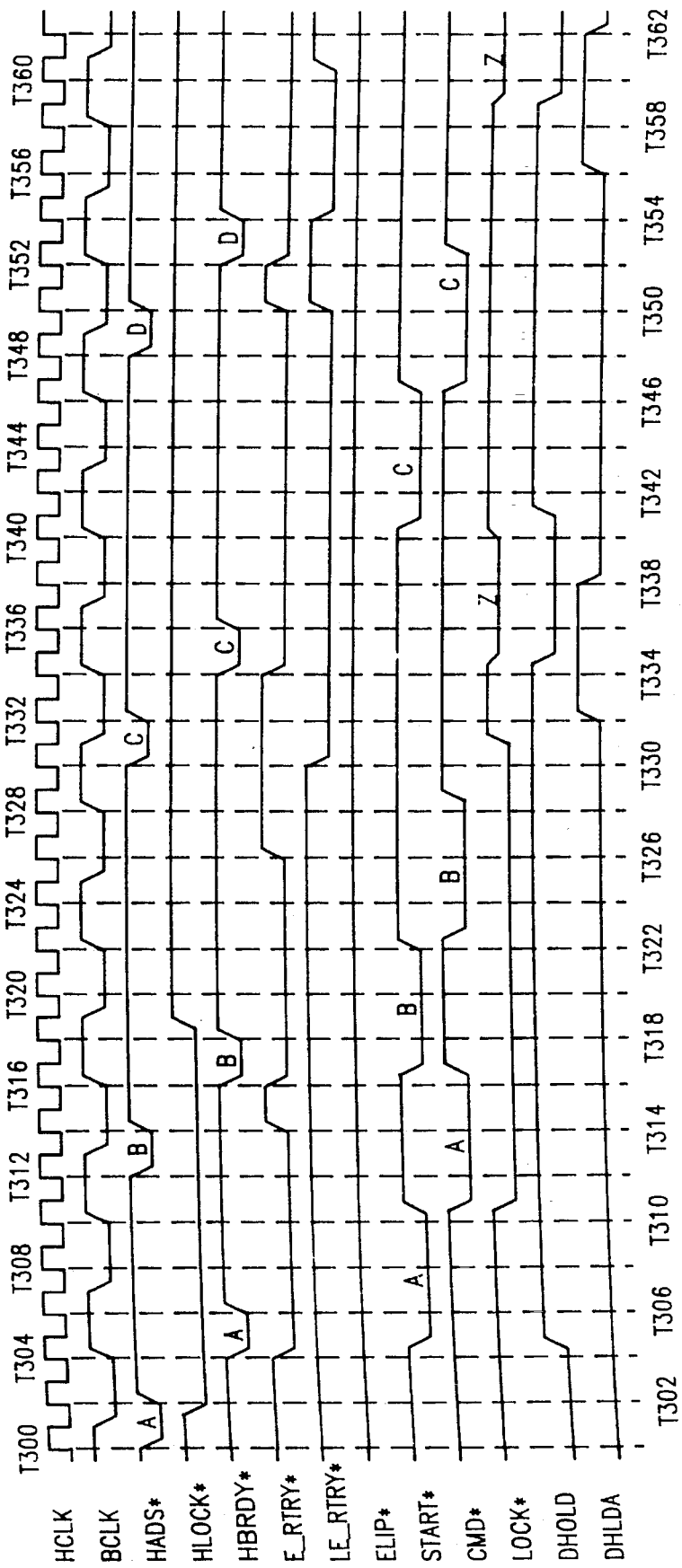

Referring now to FIG. 10D, the interaction between a locked cycle and the LE_RTRY* signal is shown. At a time T300, the CPU 22 is in control of the host bus 20 and initiates a cycle referred to by the letter A by asserting the HADS* signal low and asserting it high again one HCLK period later at a time T302. At the time T302, the CPU 22 asserts the HLOCK* signal low indicating that cycle A is the first nominal cycle in a locked cycle. The EBC 38 asserts the HBRDY* signal low at a time T304 and high again at a time T306 indicating the end of cycle A, and the E_RTRY* signal is asserted low by the EBC 38 at the time T304 indicating that cycle A is a posted read or write operation to the EISA bus 36. The locked cycle begins on the EISA bus 36 at the time T304 where the START* signal is asserted low. Meanwhile, the DHOLD signal is asserted high at the time T304 indicating that the CSP 42 is requesting the EBC 38 to run a cycle on the EISA bus 36. Since the EISA bus 36 is being used to perform the EISA locked cycle A, the LE_RTRY* and the DHLDA signals remain negated until after the locked cycle is completed. At a time T312, the next nominal cycle in the locked cycle referred to by the letter B, is initiated on the host bus 20 and is completed when the HBRDY* signal is asserted low at a time T316 and negated high at a time T318. The HLOCK* signal remains asserted low until the time T318. The E_RTRY* signal is negated high at a time T314 because the address posting buffers are again available, and then negated low at the time T316 because cycle B is going to be accepted and posted. Meanwhile, the first nominal cycle A of the locked cycle completes at the time T316 on the EISA bus 36 as indicated by the CMD* signal negated high while the second nominal cycle B is initiated simultaneously. Cycle B eventually terminates at a time T328 as indicated by the CMD* signal negated high. Also, the HLOCK* signal is negated high at a time T318 indicating that the locked cycle is complete on the host bus 20. The E_RTRY* signal remains asserted until the time T326, after which time the EBC 38 is available to post reads and writes to the EISA bus 36.

After the locked cycles A and B are completed at the time T328, the LE_RTRY* signal is asserted low at a time T330 and another CPU 24 has control of the host bus 20 beginning a new cycle C. At a time T332, the HADS* signal is negated high and the HLOCK* signal remains negated high indicating that cycle C is not a locked cycle. Note that the E_RTRY* signal is high at the time T334 so the EISA cycle C is not aborted. The LE_RTRY* signal is asserted low at the time T334, although cycle C is not aborted since it is not a locked cycle. Meanwhile, the DHLDA signal is asserted high at the time T332 after the LE_RTRY* signal is asserted low. The DHLDA signal asserted high indicates that the EISA bus 36 is available to run a DMA cycle, refresh, EISA or ISA bus master cycle on the EISA bus 36 which occurs between the times T332 and T334. Although only shown as one HCLK period between the times T332 and T334, this time period could be longer on the EISA bus 36 and is however long it takes to complete the DMA, refresh, EISA or ISA cycle and would normally be much longer than one HCLK period. The CPU 24 completes cycle C on the host bus 20 at a time T336 where the HBRDY* signal is negated high.

Eventually, the EISA bus master no longer requires the EISA bus 36 and negates its request signal, so that the CSP 42 negates the DHOLD signal low at a time T334 and the EBC 38 negates the DHLDA signal low at the time T338. Cycle C subsequently begins on the EISA bus 36 at a time T340 and ends at a time T352 when the CMD* signal is negated. Also at the time T340, the DHOLD signal is asserted high indicating that an EISA or ISA bus master is requesting the EISA bus 36 again. Meanwhile, a cycle referred to by the letter D is initiated on the host bus 20 by the CPU 26 at a time T336 which is also a posted cycle to the EISA bus since the E_RTRY* signal is negated high at the time T352 and then asserted low at this time to indicate a posted EISA cycle. Nonetheless, the EISA bus master is granted the EISA bus 36 when the DHLDA signal is asserted high at a time T356 which is allowed to complete before cycle D is started on the EISA bus 36.

PRIORITIZATION

Three separate prioritization schemes which could be used by the prioritizer 64 of FIG. 1 will now be described. Each of the prioritization schemes are generalized and could be used in systems other than the computer S using the arbitration scheme of the present invention. For instance, the schemes could be used to determine the next cache "way" or block of data to be replaced within that cache. The first two schemes define a least recently used (LRU) scheme which could be implemented by the prioritizer 64 to determine which of the CPUs 22–28 should become the next bus master of the host bus 20. The EHM 66 also requests control of the host bus 20, but it has a higher priority than the CPUs 22–28 and is not part of the prioritization scheme. The prioritization methods concern priority between otherwise equal elements, such as the CPUs 22–28. The implemented logic must be supplemented to allow the EHM 66 to override the prioritization and take control of the host bus 20, without disturbing the priorities among the CPUs 22–28.

The first scheme is a true-LRU which might be implemented but would not be practical in the computer S, although it is ideally suited to replace cache ways within a cache. The second scheme is a modified true-LRU scheme, very similar to the first, although more practical for use in the computer S. As long as one or more of the installed CPUs 22–28 are requesting priority in the modified true-LRU scheme, then an uninstalled CPU would not be awarded priority. The third prioritization scheme is a first-in-first-out (FIFO) scheme.

In general, the prioritization scheme determines which of a set of n elements takes priority over all of the other elements. If used in the prioritizer 64 of the computer S, the elements are the CPUs 22–28, and the prioritization scheme implemented in the prioritizer 64 determines which of the CPUs 22–28 is the next bus master of the host bus 20. The first variation includes a true-LRU prioritizer where that element which was least recently used gains the highest priority. The least number of bits required for a true-LRU scheme is $\log_2(n!)$ bits, although the present invention uses $(n/2)\times(n-1)$ bits. Each bit is a priority bit which keeps track of the relative priority between a unique pair of elements. Each element is paired with every other element to create the set of unique pairs. Since there are n elements, there are $(n/2)\times(n-1)$ unique pairs of the n elements. For instance, if the number of elements is four, then the least possible number of bits required for a true-LRU is five, although the true-LRU of the present invention uses $(4/2)\times(4-1)=6$ priority bits, which is only one more bit than the least possible. If the number of elements is eight, then the least possible number of bits to implement a true-LRU is sixteen, although the present invention uses 28 bits. Since the number of priority bits grows rapidly with the number of elements using the present invention, it is preferable that n be no greater than 16, which would use 120 priority bits.

The first scheme is a true-LRU structure which could be used on any cache design that requires a true-LRU to prioritize its cache ways. As described above, if there are n elements, the true-LRU uses $(n/2)\times(n-1)$ priority bits to keep track of the relative priority each unique pair of elements. Using the method of the present invention, each element is associated with $n-1$ priority bits since there are $n-1$ other elements that an element can be paired with. The true-LRU decodes $(n/2)\times(n-1)$ priority bits to determine which one of the n elements has the highest priority. Any time that all $n-1$ priority bits associated with a particular element point to that element, then that element has the highest priority, whether priority means that a CPU is the highest in priority to assume control of a host bus, or that a cache way is next to be replaced. Also, each time that an element uses the bus or a cache way gets used, then each priority bit associated with that element is updated to point away from that element. All priority bits not associated with the element are unaffected when the element gets used.

Each element is assigned an ID number from 0 to $n-1$, where 0 is the ID number of the first element and $n-1$ is the ID number of the last element. Each priority bit represents the relative priority between a unique pair of elements and includes a subscript which comprises two ID numbers such that when the priority bit equals 0, the element referred to by the first ID number of the subscript has a higher relative priority between those two elements, and when the priority bit equals 1, the element referred to by the second ID number of the subscript has a higher relative priority. For example, if $P_{01}$ equals 0, then element 0 has a higher priority than element 1. The priority bits for an n-element true-LRU are defined as follows:

$$P_{01} \quad P_{02} \quad P_{03} \quad \ldots \quad P_{0(n-1)}$$
$$P_{12} \quad P_{13} \quad \ldots \quad P_{1(n-1)}$$
$$P_{23} \quad \ldots \quad P_{2(n-1)}$$
$$\vdots$$
$$\ldots \quad P_{(n-2)(n-1)}$$

To determine which of the n elements has priority, n priority equations are used where each equation involves $n-1$ priority bits. The equations are as follows:

$$\text{LRU\_WAY0} = \sim P_{01} \ \& \ \sim P_{02} \ \& \ \sim P_{03} \ \& \ \ldots \sim P_{0(n-1)}$$

$$\text{LRU\_WAY1} = P_{01} \ \& \ \sim P_{12} \ \& \ \sim P_{13} \ \& \ \ldots \sim P_{1(n-1)}$$

$$\text{LRU\_WAY2} = P_{02} \ \& \ P_{12} \ \& \ \sim P_{23} \ \& \ \ldots \sim P_{2(n-1)}$$

$$\text{LRU\_WAYn} = P_{0(n-1)} \ \& \ P_{1(n-1)} \ \& \ P_{2(n-1)} \ \& \ \ldots P_{(n-2)(n-1)}$$

where LRU_AYn is the priority term which is true if then the nth element has the highest priority, n represents the ID number of the element, the "~" symbol represents logical negation of that signal and the "&" symbol is the logical "AND" operation. Only one of the priority terms is true at any given time such that only one of the elements has the highest priority. For example, if the term $\text{LRU}_{13}\text{WAY0}$ is true, then element 0 will have the highest priority.

For simplification, the priority bits for a 4-element true-LRU are defined as follows:

$$P_{01} \quad P_{02} \quad P_{03}$$
$$P_{12} \quad P_{13}$$
$$P_{23}$$

The corresponding priority equations and terms for the 4-element true-LRU are:

$$\text{LRU\_WAY0} = \sim P_{01} \ \& \ \sim P_{02} \ \& \ \sim P_{03}$$

$$\text{LRU\_WAY1} = P_{01} \ \& \ \sim P_{12} \ \& \ \sim P_{13}$$

$$\text{LRU\_WAY2} = P_{02} \ \& \ P_{12} \ \& \ \sim P_{23}$$

$$\text{LRU\_WAY3} = P_{03} \ \& \ P_{13} \ \& \ P_{23}$$

Figure 11:
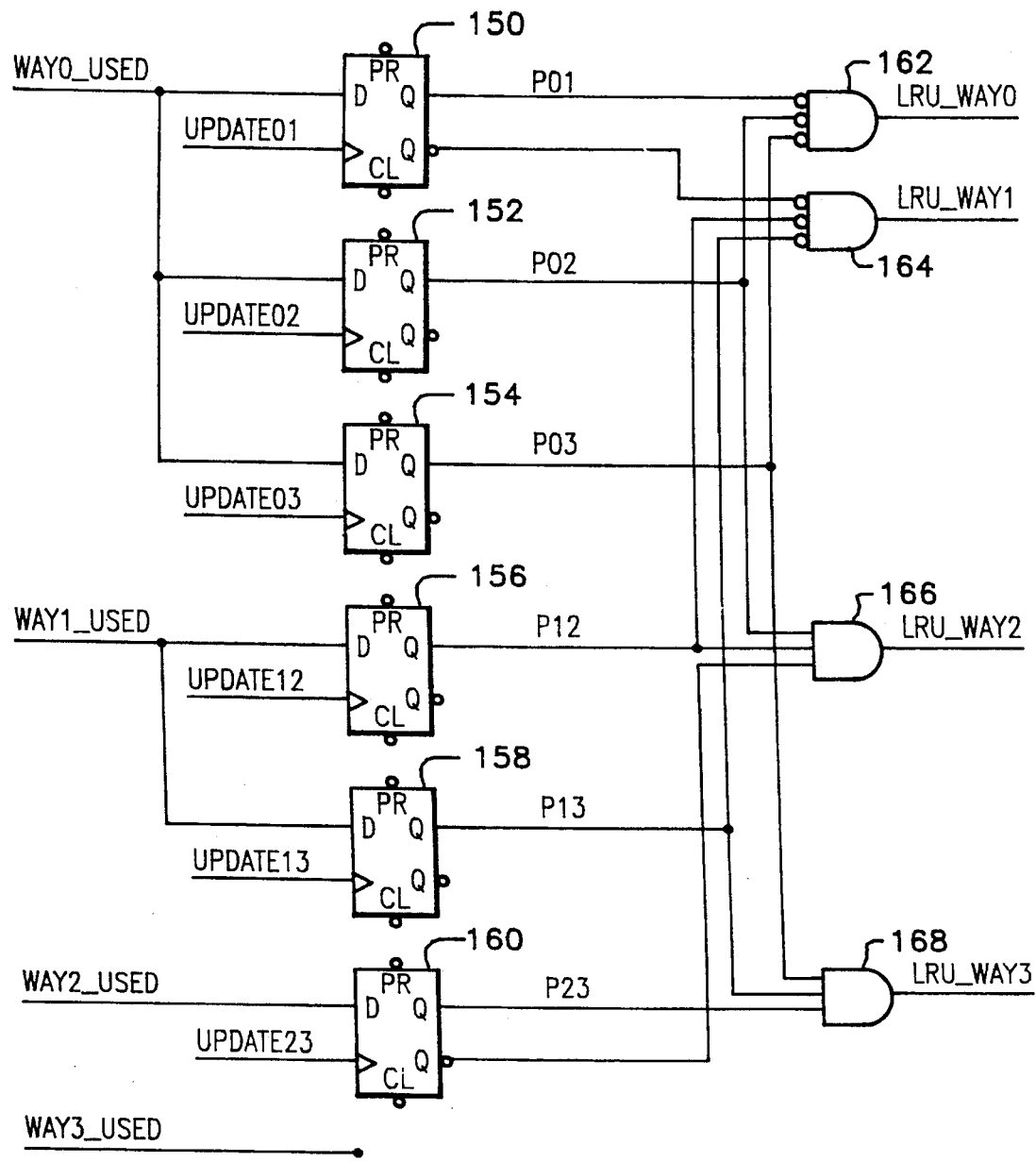
FIG. 11 is a schematic diagram illustrating a true least recently used prioritization scheme according to the present invention.

FIG. 11 shows an implementation of a true-LRU prioritizer according to the present invention using four elements. Each of the six priority bits $P_{01}$–$P_{23}$ representing the relative priority of the six possible unique pairs of the four elements, are determined by six D-type flip-flops 150, 152, 154, 156, 158 and 160. The Q outputs of the flip-flops 150–160 are the signals $P_{01}$, $P_{02}$, $P_{03}$, $P_{12}$, $P_{13}$, and $P_{23}$, respectively, which represent the priority bits $P_{01}$–$P_{23}$. A signal WAY0_USED is connected to the D inputs of the flip-flops 150, 152 and 154. A signal WAY1_USED is connected to the D inputs of the flip-flops 156 and 158, and a signal WAY2_USED is connected to the D input of the flip-flop 160. A signal WAY3_USED is used to derive signals UPDATE03, UPDATE13, and UPDATE23, described below.

A clock signal UPDATE01 is connected to the clock input of the flip-flop 150. The UPDATE01 signal is defined by the equation:

$$UPDATE01 = CLK \ \& \ (WAY0\_USED + WAY1\_USED)$$

where a clock signal CLK is used to clock the flipflops 150–160 depending upon the values of WAY0_USED- –WAY1_USED. The CLK signal could be the HCLK signal residing on the host bus 20, or derived therefrom if the true-LRU scheme is used to implement the prioritizer 64. The "+" symbol indicates the logic "OR" operation. In general, if x represents the ID number of the first element, and y represents the ID number of the second element, then UPDATExy is defined by the equation:

*UPDATExy=CLK & (WAYx_USED+WAYy_USED)*

Six signals are thus defined as UPDATE01, UPDATE02, UPDATE03, UPDATE12, UPDATE13 and UPDATE23 which are connected the respective clock inputs of the flip-flops 150, 152, 154, 156, 158 and 160.

The $P_{01}$–$P_{03}$ signals are connected to the three inputs of a three input NOR gate 162. The output of the NOR gate 162 is the LRU_WAY0 signal which represents the LRU_WAY0 priority term introduced previously. The inverted-output of the flip-flop 150 is connected to the first input of another three input NOR gate 164, and the second and third inputs are connected to the $P_{12}$ and $P_{13}$ signals respectively. The output of the NOR gate 164 is the LRU_WAY1 signal which represents the $LRU_{13}WAY1$ term which is true when element 1 has the highest priority. The $P_{02}$ and $P_{12}$ signals and the inverted output of the flip-flop 160 are connected to the three inputs of a three input AND gate 166, respectively. The output of the AND gate 166 is the LRU_WAY2 signal which represents the $LRU_{13}WAY2$ term which is true when element 2 has the highest priority. $P_{03}$, $P_{13}$ and $P_{23}$ are connected the three inputs of another three input AND gate 168, respectively. The output of the AND gate 168 is the LRU-WAY3 signal which represents the $LRU_{13}WAY3$ term which is true when element 3 has the highest priority.

The WAY0_USED signal is true when the element 0 is used. Likewise, the WAY1_USED, WAY2_USED, and the WAY3_USED signals are true when the elements 1, 2, and 3 are used, respectively. The specific logic implementation to derive the WAYn_USED signals depends upon the system in which the true-LRU scheme is being used, although in general, they should be derived from the LRU_WAYn signals as further detailed below. The UPDATE01 signal will clock the flip-flop 150 when CLK goes high and either element 0 or 1 is used. Any time the elements x or y are used, the UPDATExy clock signals associated with the elements x or y become true when the CLK signal becomes true. For instance, if element 0 is used, then WAY0_USED becomes true and UPDATE01, UPDATE02 and UPDATE03 also become true such that the flip-flops 150, 152 and 154 are clocked and the $P_{01}$, $P_{02}$ and $P_{03}$ signals become true. Note that the $P_{01}$, $P_{02}$ and $P_{03}$ priority bits are all of the priority bits associated with the element 0, and that each one points away from the element 0 when it is used. Likewise, if element 1 is used such that WAY1_USED becomes true and WAY0_USED is false, then the flip-flops 156 and 158 are clocked such that $P_{12}$ and $P_{13}$ become true, and UPDATE01 clocks the flip-flop 150 such that the $P_{01}$ signal becomes false. Again, the relative priority of element 1 with respect to each other element points away from the element 1 when it is used.

The $P_{01}$–$P_{23}$ signals represent the priority bits described above. As each of the elements 0–3 are used, the flip-flops 150–160 are updated thereby updating the corresponding priority bit signals $P_{01}$–$P_{23}$. Finally, the LRU_WAY0-LRU_WAY3 signals are updated to point to the next element having the highest priority. Recall that only one of the LRU_Yn signals is true at any given time, so that only the corresponding element has the highest priority at that same given time.

The true-LRU prioritizer of FIG. 11 operates as follows. When the element 0 gets used, the WAY0_USED signal becomes true. Also, the UPDATE01, UPDATE02 and UPDATE03 signals, associated with the element 0, clock the corresponding flip-flops 150, 152 and 154 thereby updating the priority bit signals $P_{01}$, $P_{02}$ and $P_{03}$ to become true and point away from the element 0. Finally, the $LRU_{13}WAY0$, $LRU_{13}WAY1$, $LRU_{13}WAY2$ and LRU-WAY3 signals are updated to determine which of the other elements 1–3 has next priority. If the LRU_WAY2 signal then becomes true, for example, then when element 0 is no longer being used, the element 2 is used next, causing the WAY2_USED signal to become true. The WAY0_USED and WAY1_USED signals are both false. The UPDATE02, UPDATE12 and UPDATE23 clock signals are clocked, such that the $P_{02}$ and $P_{12}$ signals become false, and the $P_{23}$ signal becomes true. The operation continues such that only one of the $LRU_{13}WAY0$–$LRU_{13}WAY3$ signals is true at any given time, and the corresponding element is the least recently used element.

The implementation of the prioritizer 64 using the true-LRU described above is not desirable in certain instances such as a multiprocessor environment, however, because it does not include the HBREQ<n>* signals which are necessary for smooth and efficient operation. For example, when fewer than the maximum number of elements supported by the true-LRU are either installed, requesting or available, the true-LRU prioritizer of FIG. 11 is inadequate and requires modification. For instance, if the prioritizer 64 assumes that the four CPUs 22–28 are installed, but the CPU 26 is, in fact, not installed, then the true-LRU would eventually point to the CPU 26 and give it priority even though it is not connected to the host bus 20. This situation is undesirable since the computer system S would lock-up. Also, even if all of the CPUs 22–28 are present, the true-LRU scheme would be the equivalent of a round-robin scheme. The next two prioritization schemes described below modify the true-LRU scheme such that only those elements requesting priority will be awarded the highest priority. It is noted that the prioritization scheme of FIG. 10 would be acceptable for use in a cache memory allocation system where all the elements would be present and available.

Figure 12:
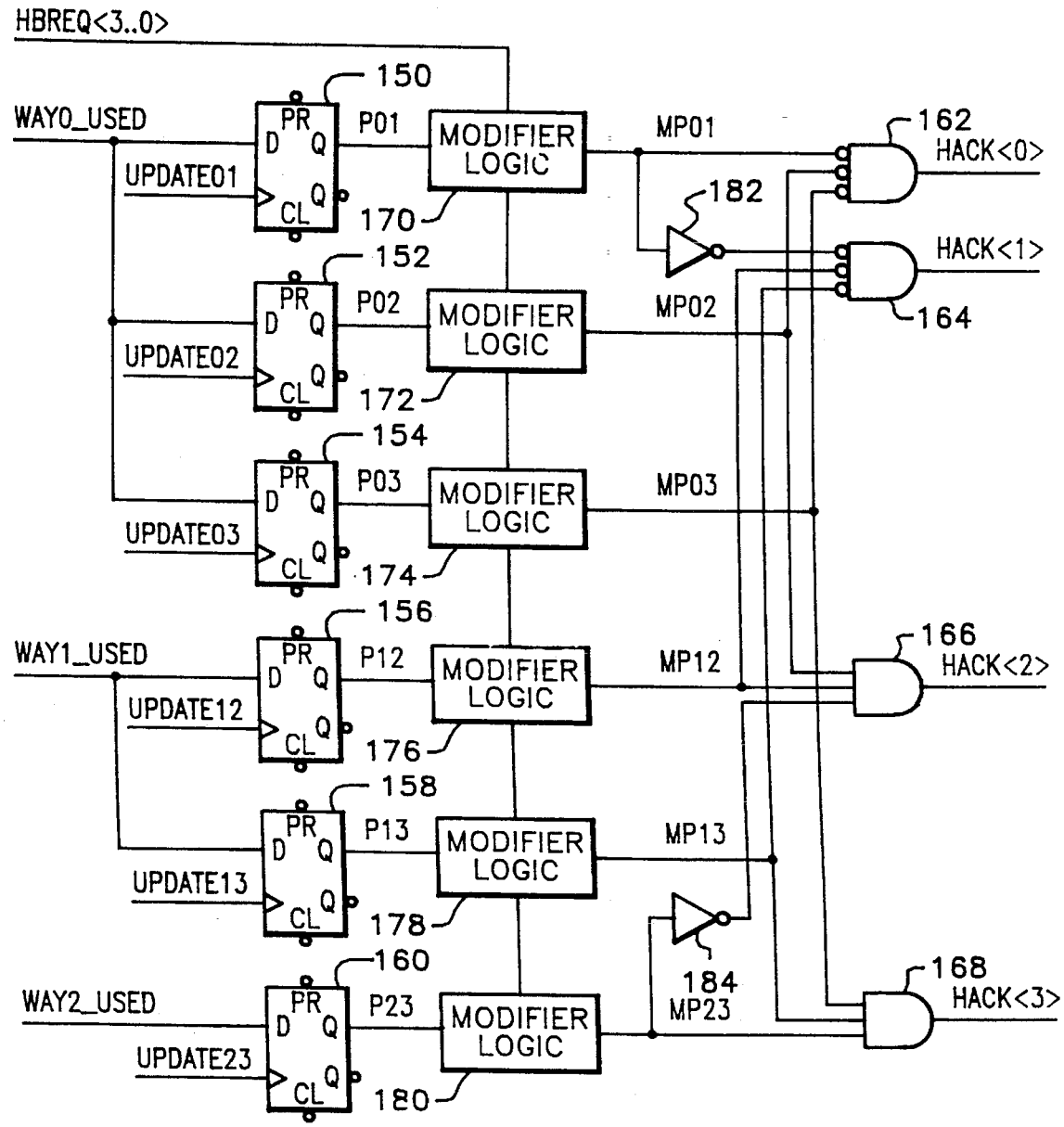
FIG. 12 is a schematic diagram illustrating a modified true least recently used prioritization scheme according to the present invention.

Referring now to FIG. 12, the modified true-LRU prioritizer of the present invention using the four elements 0–3 is shown. It is understood that more than four elements could be implemented, with only four elements being used in this example for clarity and simplicity. The same six priority bit signals $P_{01}$–$P_{23}$ are defined for the four elements 0–3 as were defined above. In FIG. 12, identical elements will retain identical reference numerals. The flip-flops 150, 152, 154, 156, 158 and 160 have the same inputs WAY0_USED, WAY1_USED, WAY2_USED and UPDATE01, UPDATE02, UPDATE03, UPDATE12, UPDATE13 and UPDATE23 as was described previously in FIG. 11. Likewise, the outputs of the flip-flops 150–160 are the $P_{01}$, $P_{02}$, $P_{03}$, $P_{12}$, $P_{13}$, $P_{23}$ priority bit signals, respectively. In FIG. 12, however, only those elements that are available and that request priority eventually achieve the highest priority, as long as one of the other installed elements are requesting priority at any given time. If none of the installed elements request priority, it is possible that an uninstalled device will gain priority. This can be cured by one of several modifications, described in more detail below.

Each of the elements 0–3 is assigned a separate request signal HBREQ<n> where n represents the ID number of the element. These HBREQ<n> request signals are, for example, the inverses of the HBREQ<n>* request signals residing on the host bus 20.

The modified true-LRU illustrated in FIG. 12 includes six modifier logic blocks 170, 172, 174, 176, 178 and 180 which are connected to the priority bit signals $P_{01}$–$P_{23}$, respectively. Each of the modifier logic blocks 170–180 are identical and are connected to a corresponding two of the HBREQ<n> request signals from each of the elements 0–3. Specifically, the modifier block 170 is connected to the HBREQ<0> and HBREQ<1> request signals. Likewise, the modifier block 172 is connected to the HBREQ<0> and HBREQ<2> request signals, the modifier block 174 is connected to the HBREQ<0> and HBREQ<3> request signals, the modifier block 176 is connected to the HBREQ<1> and HBREQ<2>request signals, the modifier block 178 is connected to the HBREQ<1> and HBREQ<3> request signals, and the modifier block 180 is connected to the HBREQ<2> and HBREQ<3> request signals. Each modifier logic block 170–180 performs the following logic equation:

$$MP_{xy}=P_{xy}\ \&\ \sim HBREQ\!<\!x\!>+P_{xy}\ \&\ HBREQ\!<\!y\!>+\sim P_{xy}\ \&\ \sim HBREQ\!<\!x\!>\&\ HBREQ\!<\!y\!>$$

where, x is the ID number of a first element and y is the ID number of a second element. For example, $MP_{01}$ is equal to $P_{01}$ & ~HBREQ<0> +$P_{01}$ & HBREQ<1>+~$P_{01}$ & ~HBREQ<0>& HBREQ<1>. Therefore, the outputs of the modifier logic blocks 170–180 are the signals $MP_{01}$, $MP_{02}$, $MP_{03}$, $MP_{12}$, $MP_{13}$, $MP_{23}$ respectively.

The modified priority signals $MP_{01}$–$MP_{23}$ are similar to the priority signals $P_{01}$–$P_{23}$ except that the modified priority signals $MP_{01}$–$MP_{23}$ change the relative priority to the other element in each unique pair when the element normally having priority is not requesting and the other element is requesting priority. For example, if the signal $P_{01}$ is true, such that element 1 has a higher relative priority than element 0, and element 1 is not requesting (HBREQ<1>=0) and element 0 is requesting (HBREQ<0>=1), then $MP_{01}$ will be false, changing the relative priority to point to the element 0.

The inputs of the three input NOR gate 162 are connected to the signals $MP_{01}$, $MP_{02}$ and $MP_{03}$ respectively. The input of an inverter 182 is connected to the signal $MP_{01}$ and the output is connected to the first input of the three input NOR gate 164. The second and third inputs of the input NOR gate 164 are connected to the $MP_{12}$ and $MP_{13}$ signals, respectively. Two inputs of the three input AND gate 166 are connected to the $MP_{02}$ and $MP_{01}$ signals. The input of an inverter 184 is connected to the signal $MP_{23}$ and its output is connected to the third input of the AND gate 166. The three inputs of the AND gate 168 are connected to the $MP_{03}$, $MP_{13}$, and $MP_{23}$ signals, respectively. The outputs of the gates 162, 164, 166 and 168 are referred to as HACK<0>* HACK<1>* HACK<2> and HACK<3>* respectively, which are acknowledge signals similar to the LRU_WAY0-LRU_WAY3 signals of FIG. 11. Also, these HACK<n> acknowledge signals are similar to the HACK<n>* acknowledge signals residing on the host bus 20, the only difference being that the HACK<n> signals are inverses of the HACK<n>* signals. Whenever the signal HACK<n> is true, then the element n has the highest priority. For instance, if HACK<0> is true, then element 0 has the highest priority. Only one of the HACK<n> signals is true at any time.

In systems where some of the devices may not be physically present in the system, it is important that these uninstalled devices do not become bus masters. Without certain constraints, the modified true-LRU method described above would not prevent an uninstalled element from gaining the highest priority and possibly locking up the system. For example, assume one of the four elements is not installed, the modified priority bits $MP_{01}$–$MP_{23}$ will eventually point to the uninstalled element if during a period of time, none of the installed elements are requesting priority.

To prevent this undesirable situation, every installed element must assert its HBREQ<n> signal low and keep it low to maintain priority at least until that element detects the negation of its corresponding HACK<n> signal, which is an indication that another element m has activated its HBREQ<m> signal and has gained the highest priority. In FIG. 12, for example, assume element 0 asserts its HBREQ<0> request signal and HACK<0> is asserted indicating that element 0 has gained highest priority. If element 0 maintains its HBREQ<0> signal asserted while no other element is asserting their HBREQ<n> request signals, then the modified priority bits $MP_{01}$–$MP_{03}$ associated with element 0 will all point to element 0 such that the HACK<0> signal remains asserted. Element 0 must keep its HBREQ<0> request signal asserted until the HACK<0> signal is negated high. The HACK<0> signal will be negated high in response to another element asserting its HBREQ<n> request signal since the other element gains priority over element 0. By doing this, priority will be guaranteed to always go to an installed device, preventing the computer system S from locking up. If the modified true-LRU method is used to map around bad cache ways, then only the good ways keep their requests asserted at all times and the ways with errors never get allocated.

The 4-element modified true-LRU circuit shown in FIG. 12 could be used in the prioritizer 64 of FIG. 1, if the CPU 28 were the fourth, and last CPU of the computer system S. The HBREQ<n> request signals and the HACK<n> acknowledge signals are preferably converted to negative logic, as described previously, and reside on the host bus 20 as the HBREQ<n>* request and HACK<n>* acknowledge signals. Also, the WAYn_USED signals are derived from the HACK<n> signals (or the HACK<n>* signals) and the HBUSY* signal through separate logic (not shown).

A more specific example of a modified true-LRU is shown in FIGS. 13A–13E which could be implemented in the prioritizer 64 of FIG. 1. Several modifications of the modified true LRU of FIG. 12 are deemed desirable. The HBREQ<n>* and HACK<n>* signals are asserted low and negated high. The modifier bits are preferably defined by the following equation:

$$MPxy=\sim Pxy\ \&\ HBREQ\!<\!x\!>+Pxy\ \&\ \sim HBREQ\!<\!y\!>*$$

which allows for a more efficient circuit, among other advantages. If the computer system S has four CPUs 22–28 as shown in FIG. 1, the modifier equations using the equation above would be as follows:

$$MP01=(\sim P01\ \&\ HBREQ\!<\!0\!>\!*)+(P01\ \&\ \sim HBREQ\!<\!1\!>\!*)$$

$$MP02=(\sim P02\ \&\ HBREQ\!<\!0\!>\!*)+(P02\ \&\ \sim HBREQ\!<\!2\!>\!*)$$

$$MP03=(\sim P03\ \&\ HBREQ\!<\!0\!>\!*)+(P03\ \&\ \sim HBREQ\!<\!3\!>\!*)$$

$$MP12=(\sim P12\ \&\ HBREQ\!<\!1\!>\!*)+(P12\ \&\ \sim HBREQ\!<\!2\!>\!*)$$

$$MP13=(\sim P13\ \&\ HBREQ\!<\!1\!>\!*)+(P13\ \&\ \sim HBREQ\!<\!3\!>\!*)$$

$$MP23=(\sim P23\ \&\ HBREQ\!<\!2\!>\!*)+(P12\ \&\ \sim HBREQ\!<\!3\!>\!*)$$

The modified priority bits MP01–MP23 defined above change the relative priority if the element normally having priority is not requesting. The modified priority equations defined above are further preferable to the modifier equations described previously when implemented in the computer system S of FIG. 1 since the CPU gaining bus mastership need not maintain its HBREQ<n>* request signal asserted until it sees its corresponding HACK<n>* signal negated high. The modified priority bits defined above allow a CPU to negate its HBREQ<n>* request signal high as soon as it detects its HACK<n>* signal asserted low when the HBUSY* signal is asserted high.

To understand this more clearly, consider the operation of the modified priority bits described previously for FIG. 12. As soon as the CPU 22 is designated as the next bus master when the HBUSY* signal is negated high, the MPO1–MP23 modified priority bits will change to point away from the CPU 22 even though none of the other CPUs 24–28 are requesting access to the host bus 20. This causes the CPU 22 HACK<0>* signal to be negated once the HBUSY* signal is asserted low by the CPU 22. The assertion of the HBREQ<0>* is necessary to force the CPU 22 HACK<0>* signal low again since no other device is requesting. The modified priority bits defined immediately above, however, flip back to give priority to the CPU 22 which is the next bus master of the host bus 20 when the HBUSY* signal goes high and none of the other CPUs 24–28 are asserting their request signals low. In this manner, the corresponding HACK<n>* signal of the new CPU bus master remains asserted low as long as no other CPUs are requesting access to the host bus 20. The CPU bus master must still, however, maintain control of the host bus 20 while its HACK<n>* signal is asserted low.

The inclusion of the EHM 66 requires modification of the HACK<n>* signals in order for the EHM 66 to have a higher priority than the CPUs 22–28. A signal EISM is true when asserted high if the EHM 66 is the current bus master of the host bus 20. As usual, the HACK<n>* and the EBHACK* signals are all true when asserted low. The HACK<n>* and EBHACK* signals will not change when the HBUSY* signal is asserted high, and are only allowed to change when the HBUSY* signal is asserted low. The HACK<n>* and EBHACK* acknowledge signals are defined as follows:

HACK<0>* =~(~MP01 & ~MP02 & ~MP03 & ((EBREQ* & ~EISM)+(~HBREQ<0>* & EISM)))

HACK<1>* =~(~MP12 & ~MP12 & ~MP13 & ((EBREQ* & ~EISM)+(~HBREQ<1>* & EISM)))

HACK<2>* =~(~MP02 & ~MP12 & ~MP23 & ((EBREQ* & ~EISM)+(~HBREQ<2>* & EISM)))

HACK<3>* =~(~MP03 & ~MP13 & ~MP23 & ((EBREQ* & ~EISM)+(~HBREQ<3>* & EISM)))

EBHACK*=~((~EBREQ* & —EISM)+(EISM & HBREQ<0>* & HBREQ<1>* & HBREQ<2>* & HBREQ<3>*))

Thus, the highest priority CPU will be acknowledged synchronously with the HCLK signal when the HBUSY* signal is asserted low and the EHM 66 is not requesting the host bus 20, or when the EHM 66 is currently the bus master of the host bus 20. The acknowledge equations above indicate that the EHM 66 does not disturb the prioritization of the CPUs 22–28 although it has a higher priority than the CPUs 22–28 unless the EHM 66 arbitrates while it owns the host bus 20. In the latter case, the EBREQ* signal is ignored and the highest priority CPU takes control of the host bus 20. The EBHACK* equation defined above assures that if none of the CPUs 22–28 are requesting, the EHM 66 will assume control of the host bus 20 as a default. Under normal operation, however, this default condition should not occur since each of the CPUs 22–28 and the EHM 66 should maintain control of the bus as long as its corresponding HACK<n>* acknowledge signal is asserted low.

The E_RTRY* signal is asserted low to indicate to a CPU attempting to access the EISA bus 36 that the EISA bus 36 is unavailable. The aborted CPU typically releases control of the host bus 20 and loses the highest priority.

When the prioritizer 64 detects the LE_RTRY* signal asserted low by the EBC 38 thereby aborting a CPU attempting a locked EISA bus 36 cycle, the prioritizer 64 sets a reservation bit identifying the aborted CPU. More particularly, the following condition determines when a reservation is set or latched while the HBUSY* signal is asserted low:

LE_RTRY* & EBGNT* & —HADS* a HADS*_1, a E_RTRY* a HLOCAL* & —HLOCK* where HADS*_i* is the HADS* signal clocked with the HCLK signal. The EBGNT* signal is asserted low by the prioritizer 64 when it grants control of the host bus 20 to the EHM 66. The above condition indicates that if the LE_RTRY* signal is asserted, an EISA or ISA bus master or DMA is not granted the EISA bus 36, the HADS* signal is asserted low and then is negated high on the following HCLK rising edge, the E_RTRY* signal is negated high and a locked EISA cycle is being attempted, the CPU attempting the locked EISA cycle is aborted and a reservation is set. A reservation signal ELIP0 corresponds to the CPU 22, a signal ELIP1 corresponds to the CPU 24, a signal ELIP2 corresponds to the CPU 26, a signal ELIP3 corresponds to the CPU 28 and a signal ELIP* resides on the host bus 20 and is asserted low by the EHM 66 when a reservation has been set. When these above conditions are met, the ELIPn signals and the ELIP* signal are latched on the next rising edge of the HCLK signal according to the following equations:

ELIP*=0

ELIP0=P01 & P02 & P03

ELIP1=~P01 & P12 & P13

ELIP2=~P02 & —P12 & P23

ELIP3=~P03 & —P13 & —P23

Only one of the ELIPn signals is asserted high at a time, and the ELIPn signal that is asserted high indicates a reservation for the aborted CPU. Note that the aborted CPU has control of the host bus 20 so that the priority bits $P_{01}$–$P_{23}$ point away from the aborted CPU so that only the ELIPn signal corresponding to the aborted CPU is set high.

The prioritizer 64 sets one of the reservation bits ELIPn high and asserts the ELIP* signal low, which is detected by the EBC 38. When the EBC 38 detects the ELIP* signal asserted low, it asserts the E_RTRY* signal low to prevent a subsequent cycle from being posted. A second CPU attempting an EISA cycle will be aborted by the E_RTRY* signal and not the LE_RTRY* signal, so that a new reservation is not set. Therefore, only one reservation is set at a time and does not change until the first aborted CPU attempting a locked cycle is serviced when the EBC 38 is available to perform the locked cycle. The aborted CPU arbitrates the host bus 20 if another device is requesting the host bus 20. The CPU waits until the LE_RTRY* signal is negated high before it asserts its HBREQ<n>* signal low. In this manner, the aborted CPU will not regain control of the host bus 20 after arbitration until the EBC 38 and EISA bus 36 are available to perform the locked cycle.

Note that while one of the ELIPn signals is set high, operation continues as usual where several other of the CPUs may become bus masters while the EBC 38 is unavailable. Eventually, the prioritizer 64 detects the LE_RTRY* signal negated high by the EBC 38 when it is available. When the LE_RTRY* signal is negated high while the ELIP* and the HBUSY* signals are asserted low, the prioritizer 64 asserts a signal ELIPRST high. The ELIPRST signal is asserted high only during another CPUs access, or if the aborted CPU retains the host bus 20 if no other CPU requested access, since the HBUSY* signal is still asserted low. The aborted CPU monitors the LE_RTRY* signal and when the LE_RTRY* is negated high, the CPU responds by asserting its HBREQ<n>* signal low to request the host bus 20. When the ELIPRST signal is asserted high and a reservation bit has been set, and when the corresponding aborted CPU requests access by asserting its HBREQ<n>* signal, the modified priority bits are updated by the prioritizer 64 according to the following alternate equations:

MP01=ELIP1

MP02=ELIP2

MP03=ELIP3

MP12=ELIP2

MP13=ELIP3

MP23=ELIP3

The above equations are used instead of the normal modifier equations defined previously in order to override the normal prioritization when a reservation has been set. On the next rising edge of the HCLK signal, the HACK<n>* signals are updated so that the aborted CPU's HACK<n>* signal is asserted low to reflect the reservation. The HACK<n>* signals will subsequently not change even if new HBREQ<n>* signals are asserted during the current bus masters access. The aborted CPU, therefore, will be the next bus master so that it can perform its locked EISA cycle. Note that the aborted CPU must still wait for the cycle of the current bus master to complete before gaining control of the host bus 20.

When the HBUSY* signal is subsequently negated high and the ELIPRST signal is high indicating a reservation, the ELIPRST and ELIP* signals are defined by the following equations:

ELIP* = ELIP0 & ~HACK<0>* +
ELIP1 & ~HACK<1>* +
ELIP2 & ~HACK<2>* +
ELIP3 & ~HACK<3>*

ELIPRST = ~ (ELIP0 * ~HACK<0>* +
ELIP1 * ~HACK<1>* +
ELIP2 * ~HACK<2>* +
ELIP3 * ~HACK<3>*)

The above equations show that the reservation is cleared only if the aborted CPU is the next bus master of the host bus 20. This is necessary since otherwise the reservation would be cleared in the interim while other CPU's access the host bus 20 and the EBC 38 is still unavailable. For example, if the CPU 22 attempted a locked cycle and was aborted by the LE_RTRY* signal, the ELIP0 signal is asserted high to reserve the host bus 20 for the CPU 22 when the EBC 38 and EISA bus 36 are available. The CPU 22 arbitrates while the ELIP0 signal is high and the HACK<O>* signal is high so that the ELIP* signal remains asserted low and the ELIPRST signal remains asserted high. When the LE_RTRY* signal is finally negated high and the host bus 20 is arbitrated with the CPU 22 being the next bus master, the ELIP0 signal is high and the HACK<0>* signal is low so that the ELIP* signal is negated high (reset) and the ELIPRST signal is negated low (reset). This clears the reservation.

Figure 13A:
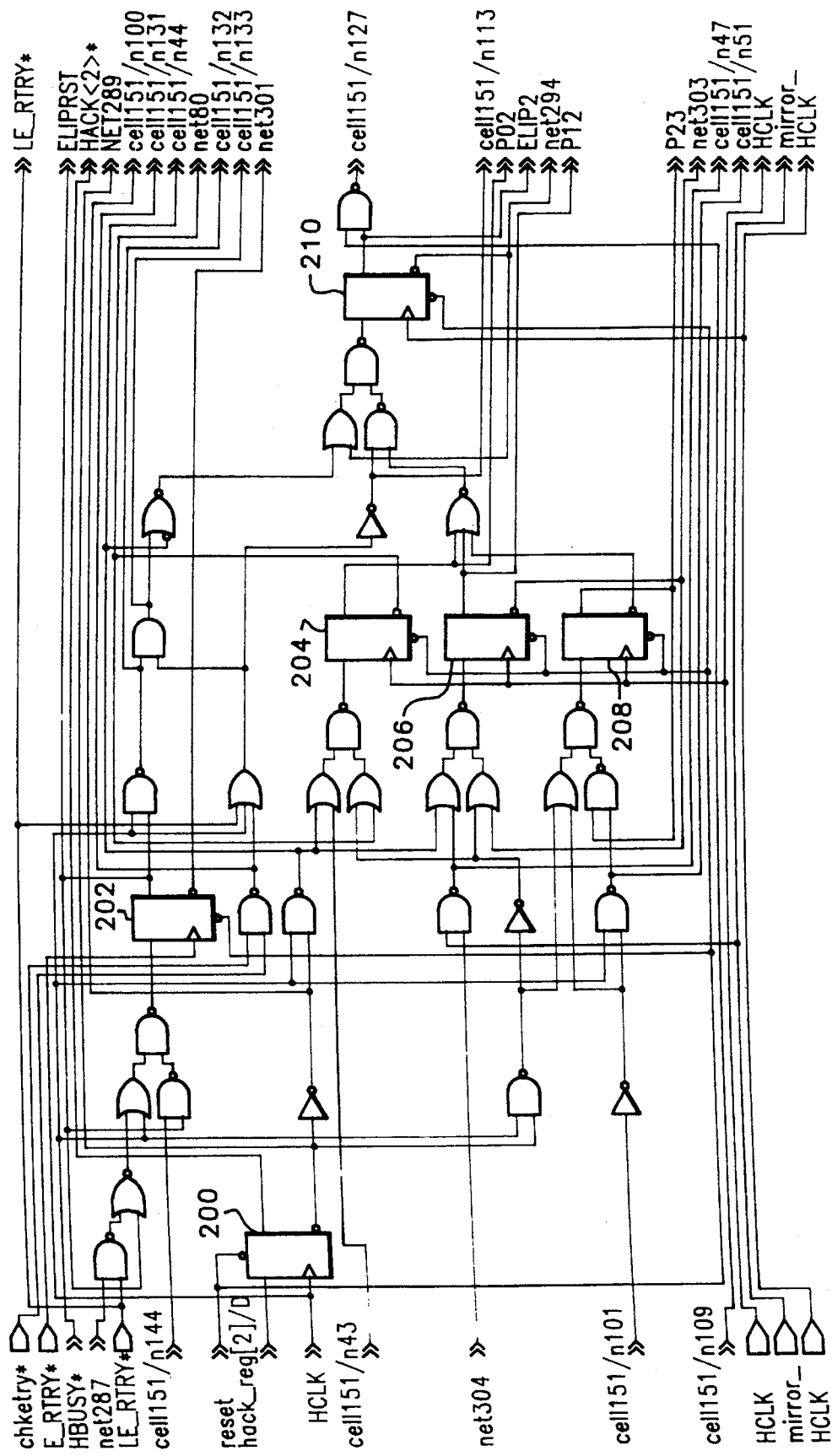
FIGS. 13A, 13B, 13C, 13D and 13E are schematic diagrams illustrating a logic implementation of a modified true least recently used prioritization scheme according to the present invention.
Figure 13B:
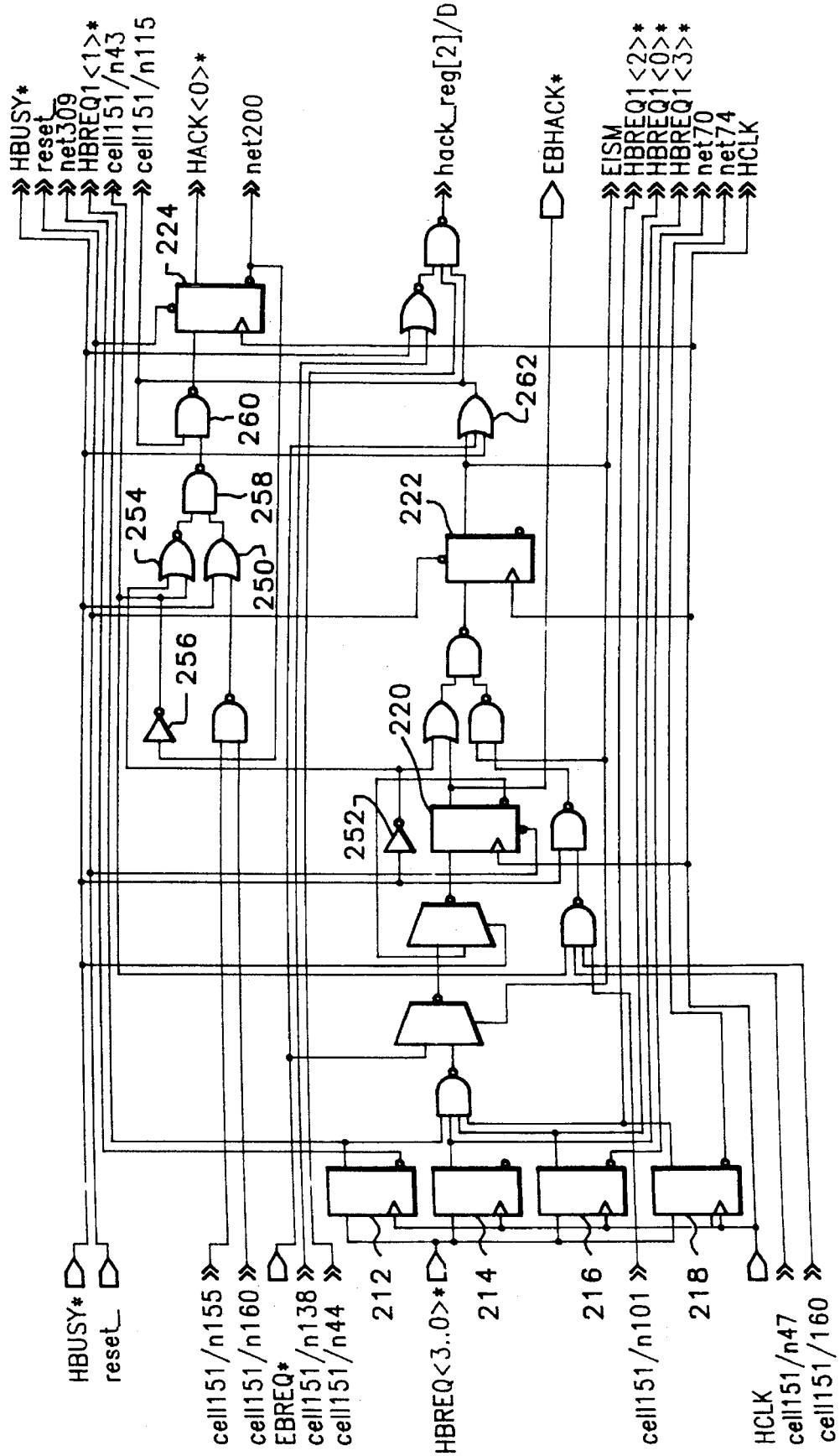
Figures 1, 13C:
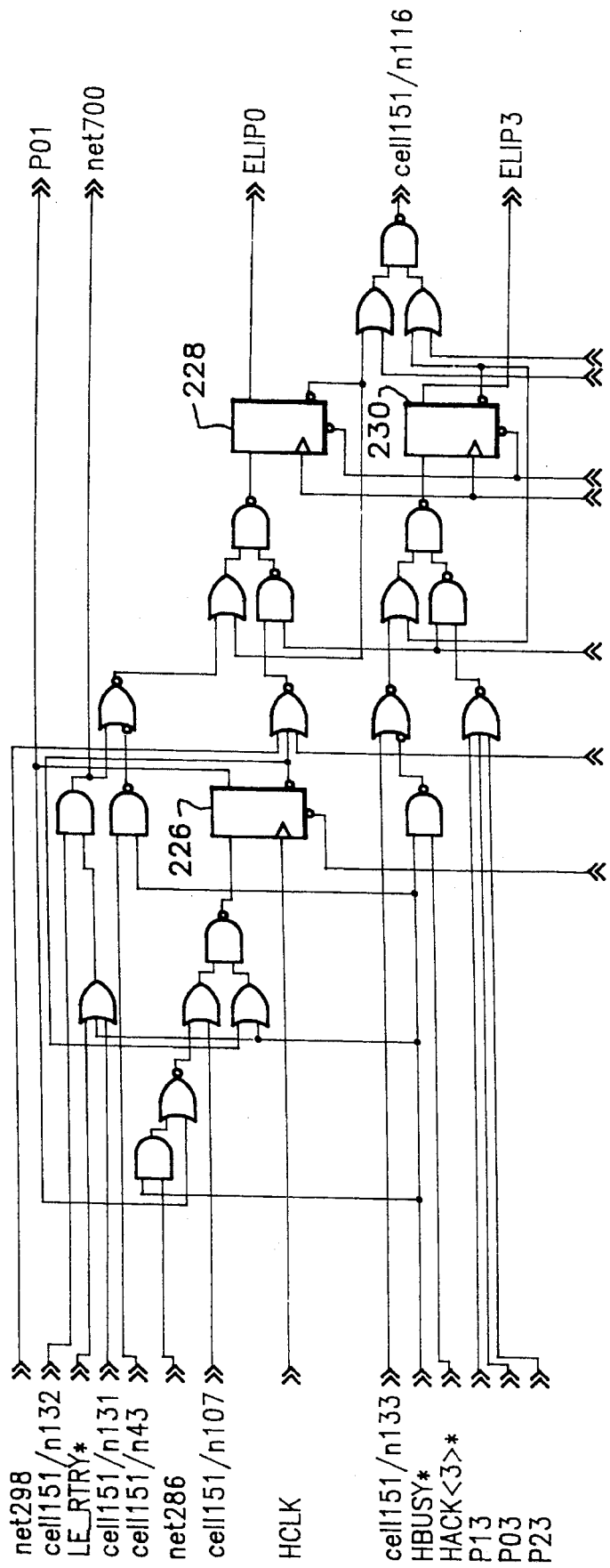
Figures 2, 13C:
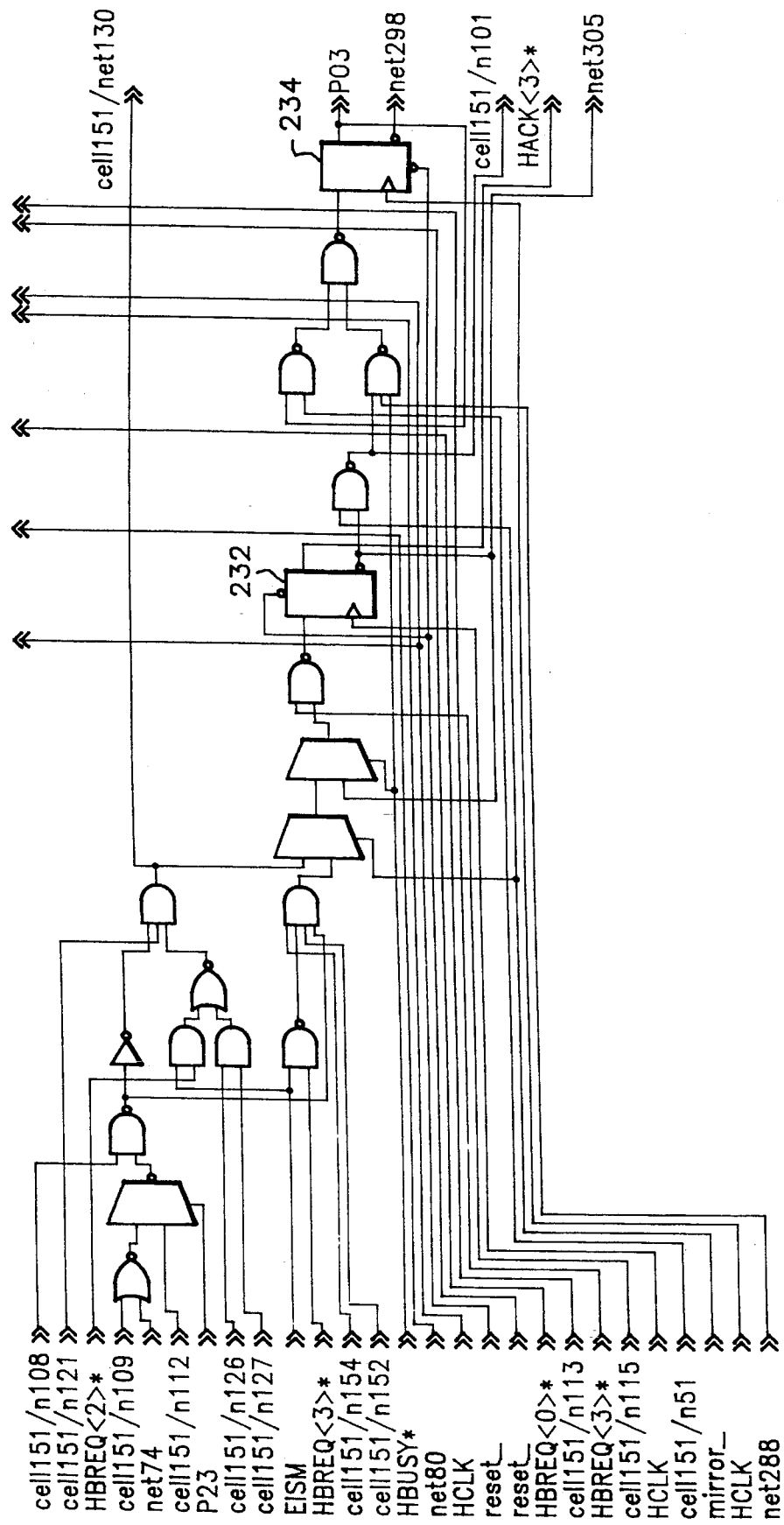
Figure 13D:
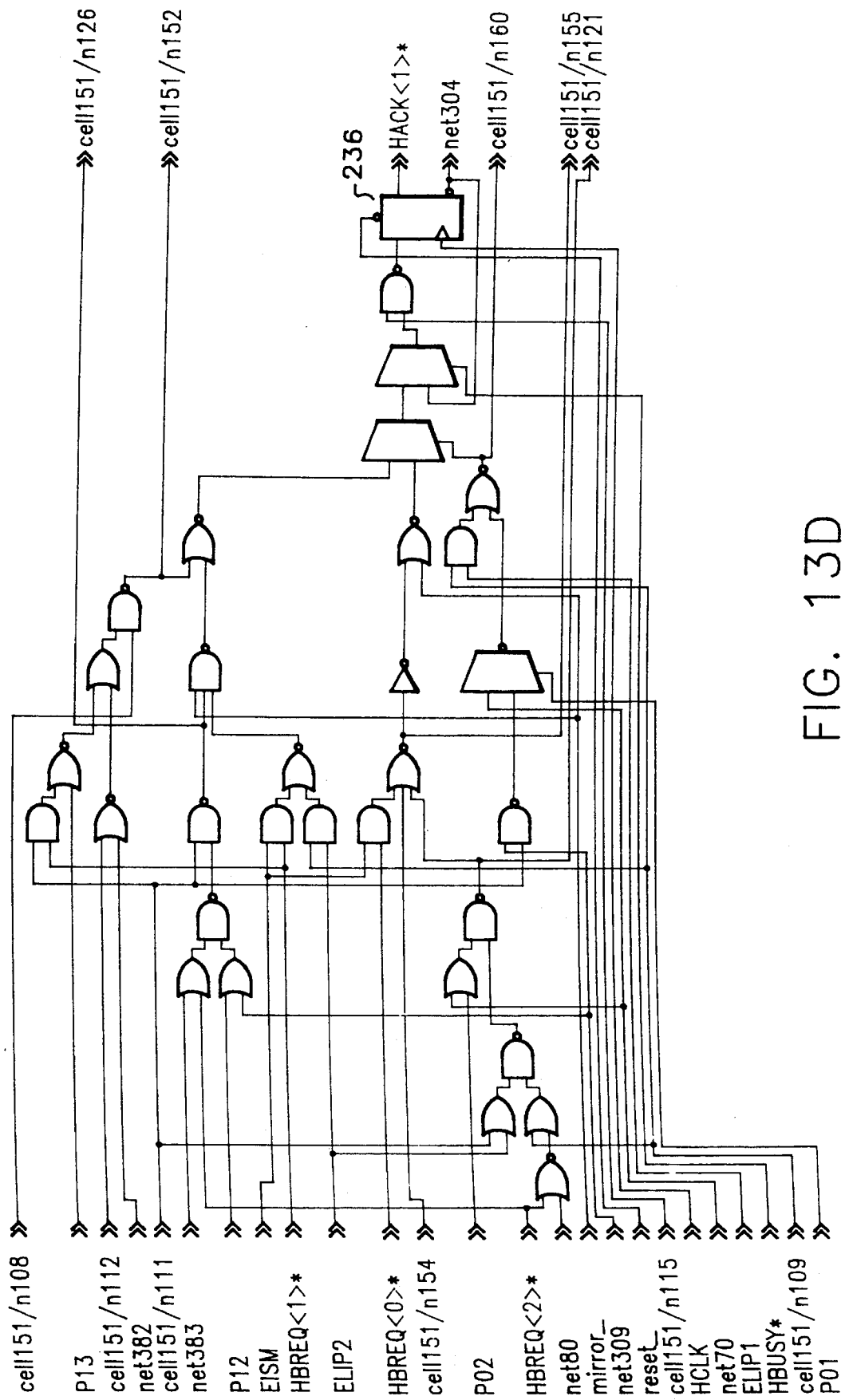
Figure 13E:
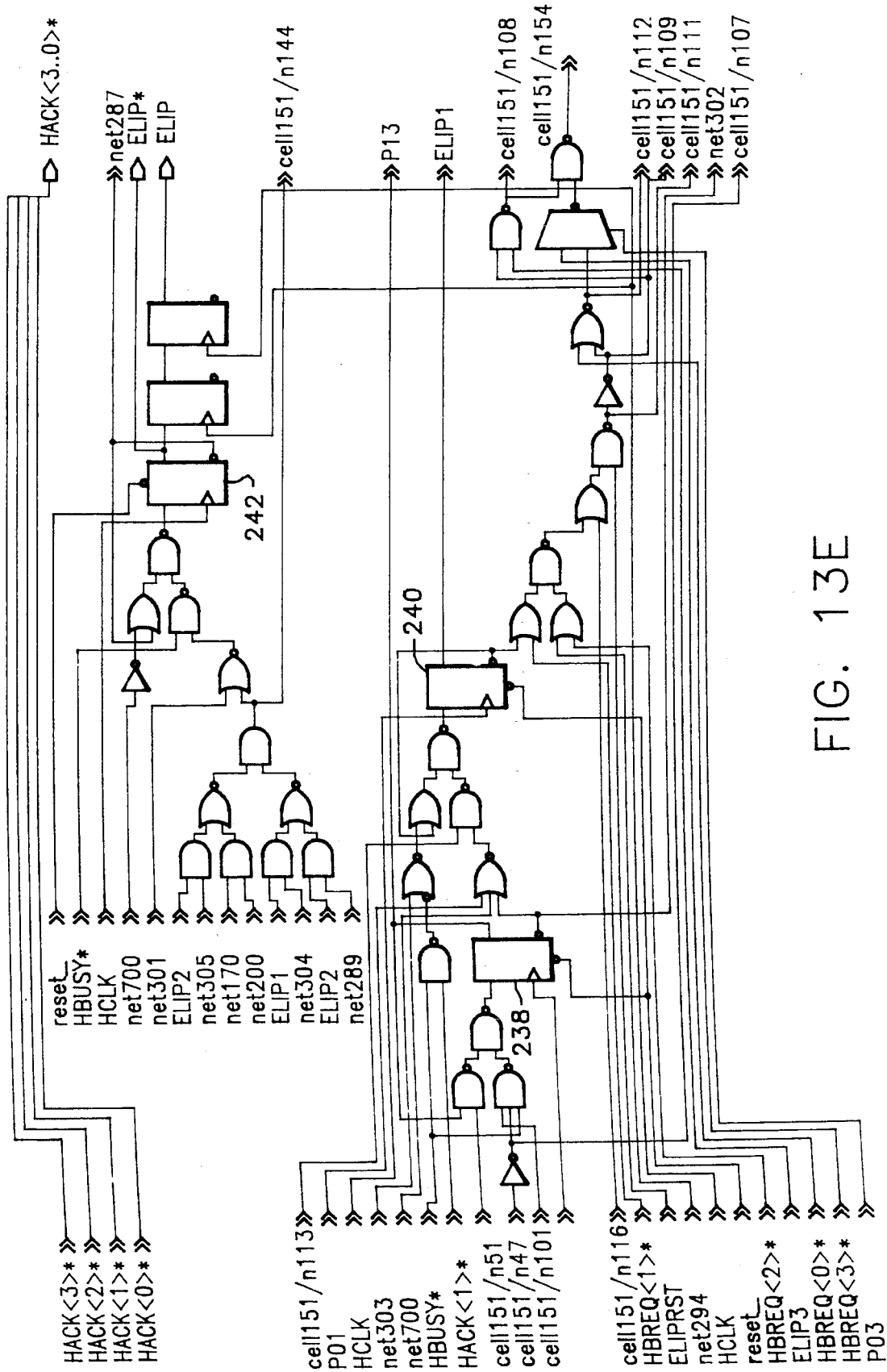

Referring now to FIGS. 13A, 13B, 13C, 13D and 13E, a modified true-LRU prioritization scheme implementing the reservation bits as described above is shown. Most of the signals defined above are updated at the rising edge of the HCLK signal and are preferably defined as the Q outputs of D-type flipflops. In FIG. 13A, the HACK<2>*, ELIPRST, P02, P12, P23 and ELIP2 signals are defined by the Q outputs of flip-flops 200, 202, 204, 206, 208 and 210, respectively. In FIG. 13B, the HBREQ<3 ... 0>* signals are the D inputs of flip-flops 214, 218, 212, and 216, respectively. The Q outputs of the flip-flops 214, 218, 212 and 216 are signals referred to as HBREQ1<3>*, HBREQ1<2>*, HBREQ1<1>* and HBREQ1<0>*, respectively. The HBREQ1<n>* signals are latched and synchronized versions of the asynchronous HBREQ<n>* signals. The EBHACK*, EISM, and HACK<0>* signals are defined by the Q outputs of flip-flops 220, 222 and 224, respectively. In FIG. 13C, the P01, ELIP0, ELIP3, HACK<3>* and P03 signals are defined by the Q outputs of flip-flops 226, 228, 230, 232 and 234, respectively. In FIG. 13D, the HACK<1>* signal is defined as the Q output of a flip-flop 236. In FIG. 13E, the P13, ELIP1, and ELIP* signals are defined by the Q outputs of flipflops 238, 240, and 242, respectively. A signal RESET_ is also shown which is true when asserted low and negated high during normal operation. When the RESET_ signal is asserted low, the circuit is reset and the EBC 38 is given control of the host bus 20. Other signal names appearing on the schematics of FIGS. 13A–13E are either intermediate nodes or are not of concern for the purposes of this disclosure.

It has been previously stated that the HACK<n>* signals will not change when the HBUSY* signal is negated high. Referring again to FIG. 13B, an example of how this is achieved for the HACK<0>* signal will now be described. The HBUSY* signal is connected to one input of a two input OR gate 250. Since the HBUSY* signal is high, the output of the OR gate 250 is also high regardless of the status of the other input of the OR gate 250. The HBUSY* signal is also connected to the input of an inverter 252, and the output of the inverter 252 is connected to one input of a two input OR gate 254. The inverted output of the flip-flop 224 is connected to the input of an inverter 256, and the output of the inverter 256 is connected to the other input of the OR gate 254. The output of the OR gate 254, therefore, is the same as the HACK<0>* signal ignoring negligible delay through the inverter 256 and the OR gate 254. The outputs of the OR gate 250 and 254 are each connected to the inputs of a two input NAND gate 258. The output of the NAND gate 258 is connected to one input of a two input NAND gate 260. The output of a three input OR gate 262 is connected to the other input of the NAND gate 260. One input of the OR gate 262 is connected to the HBUSY* signal, which is high, such that the output of the OR gate 262 is high regardless of its other two inputs. Since the NAND gates 258 and 260 operate as inverters, the output of the NAND gate 260 is also the same as the HACK<0>* signal ignoring negligible delay. The output of the NAND gate 260 is connected to the D-input of the flip-flop 224, so that the HACK<0>* signal at the Q output of the flip-flop 224 remains unchanged while the HBUSY* signal is high. While the HBUSY* signal is asserted low, the HACK<n>* signals behave according to the above stated equations. Similar logic controls the Q outputs of the flip-flops 220, 236, 200, and 232 such that while the HBUSY* signal is negated high, the EBHACK*, HACK<1>*, HACK<2>* and HACK<3>* signals remain unchanged.

Figure 14A:
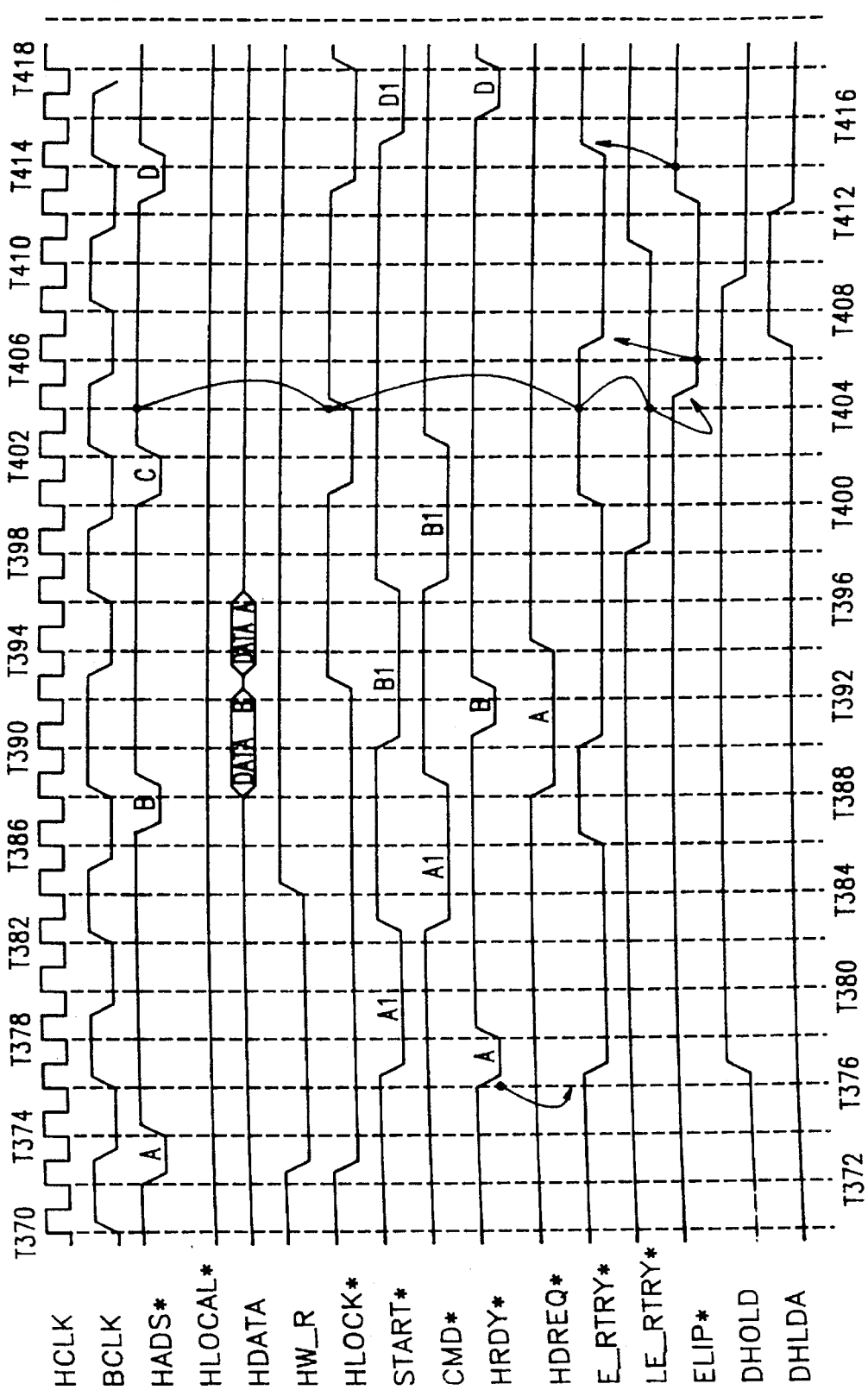
FIGS. 14A and 14B show timing diagrams of CPUs attempting locked cycles being forced off the host bus of FIG. 1, illustrating reservations being set overriding normal priority.

Referring now to FIG. 14A, a timing diagram is shown illustrating a reservation being set. At a time T372, a cycle referred to by the letter A is initiated by the CPU 22 which is an EISA locked posted read cycle as indicated by the HLOCAL* signal negated high, the HW_R signal asserted low and the HLOCK* asserted low after the time T372. The E_RTRY* signal is asserted a couple of HCLK periods later at a time T376. The EISA locked read cycle A completes and a corresponding EISA locked write cycle referred to by the letter B begins approximately at the time T386 when the HADS* signal is asserted low by the CPU 22. The HLOCK* signal remains asserted until the end of cycle B on the host bus 20 and is negated high at a time T392, while the HD data signals are asserted with cycle B's write data and then cycle A's read data as previously described in a similar manner.

Meanwhile, the DHOLD signal is asserted high at a time T376 indicating that an EISA or ISA bus master or DMA requires control of the EISA bus 36. Since the EISA bus 36 is currently busy running the locked cycles A and B, the DHLDA signal remains negated low until completion of the locked cycles. Eventually the locked cycles A and B complete on the host bus 20 at approximately the time T396 and the LE_RTRY* signal is subsequently asserted low at a time T398 to allow the EISA bus master to assume control of the EISA bus 36 and prevent a new locked cycle from being posted.

At a time T400, a new EISA locked read cycle referred to by the letter C is initiated by the CPU 24. The E_RTRY* signal is negated high at the time T400 so that the CPU 24 is not aborted by the E_RTRY* signal at the time T404. However, since the HLOCK* signal is still low at the time T404 and since cycle C is a locked cycle, the CPU 24 also samples the LE_RTRY* signal. Since the LE_RTRY* signal is asserted low at the time T404, the CPU 24 is aborted to prevent the EISA locked read cycle C from being posted while the EISA bus 36 is busy. Since the EISA lock read cycle C is aborted by the LE_RTRY* signal, a reservation is set by the prioritizer 64, and the prioritizer 64 asserts the ELIP* signal low at the time T404 which is subsequently detected by the EBC 38. Approximately one HCLK period later, the EBC 38 asserts the E_RTRY* signal low at a time T406 to prevent further posted cycles to the EISA bus 36. Meanwhile, the DHLDA signal is asserted high after the time T406 to grant control of the EISA bus 36 to the EISA bus master. The DHOLD signal is negated low at the time T408, the LE_RTRY* signal is negated high at a time T410 and the DHLDA signal is subsequently negated low at a time T412. Once the LE_RTRY* signal is detected negated high at the time T412, the CPU 24 which was aborted by the LE_RTRY* signal regains the highest priority to take control of the host bus 20 due to the reservation described previously, so that it asserts the HADS* signal low at the time T412. The ELIP* signal is also negated high to cancel out the reservation. At a time T414, which is one HCLK period after the time T412, the E_RTRY* signal is negated high in response to the ELIP* signal being detected negated high.

Figure 14B:
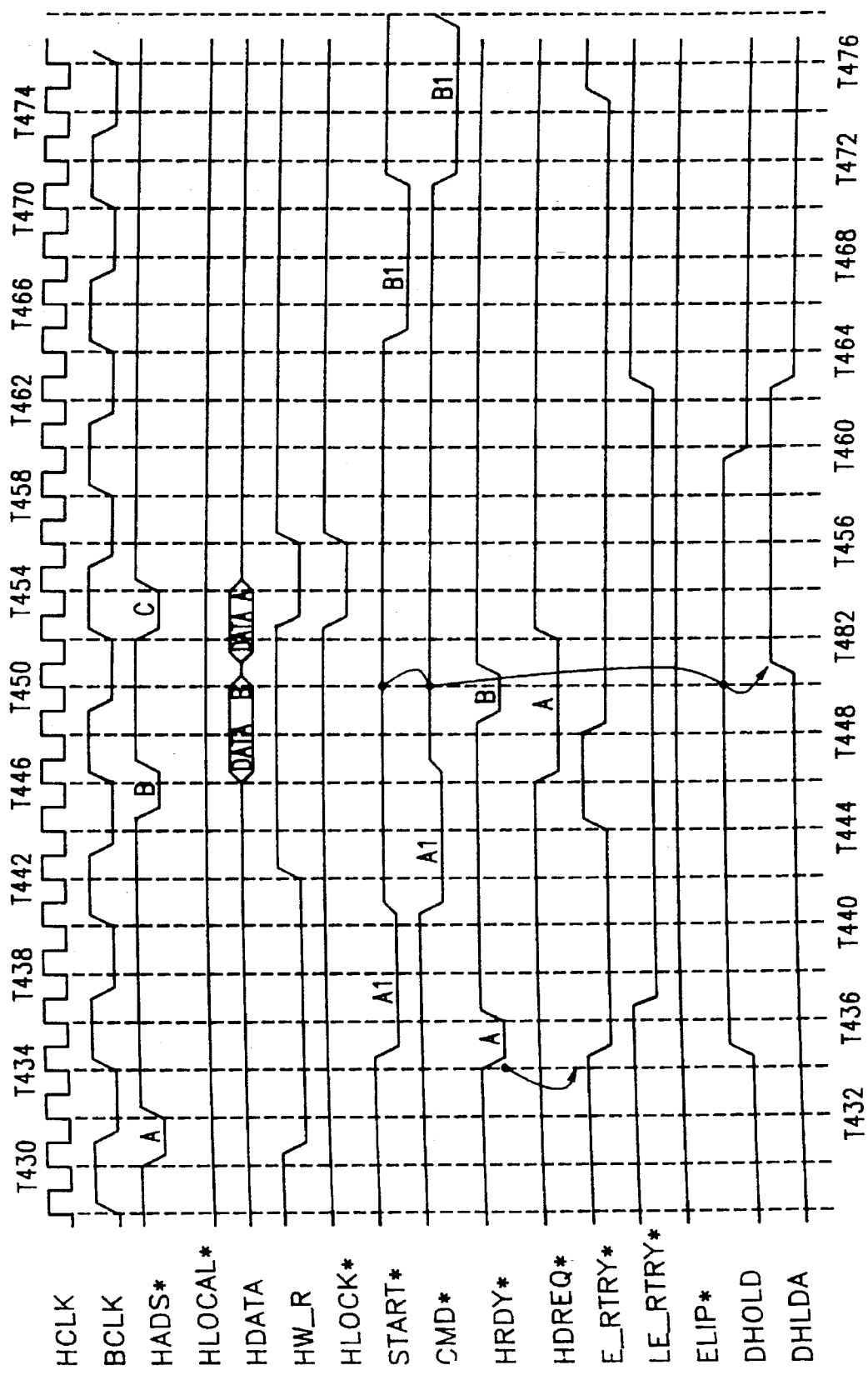

Referring now to FIG. 14B another diagram is shown illustrating the CPU 26 aborted by the E_RTRY* signal while the LE_RTRY* signal is also asserted. Beginning at a time T430, a posted EISA read cycle referred to by the letter A is initiated by the CPU 22 and is subsequently terminated at a time T436 two HCLK periods later when the HBRDY* signal is negated high. The E_RTRY* signal is asserted low at a time T434 while a request for the EISA bus 36 is made by an EISA bus master when the CSP 42 asserts the DHOLD signal high at the same time. After the time T436, the LE_RTRY* signal is asserted low by the EBC 38 to prevent a locked cycle from being initiated after the EISA bus master gains control of the EISA bus 36. Meanwhile, the posted read cycle A completes at the time T446 so that the EISA bus acknowledge signal DHLDA is subsequently asserted high at a time T450 to grant control of the EISA bus 36 to the requesting EISA bus master.

Meanwhile, a cycle B is initiated on the host bus 20 by the CPU 24 at a time T444. Once the EISA posted write cycle B is completed on the host bus 20, the CPU 26 gains control of the host bus 20 and asserts the HADS* signal low at a time T452 which is an EISA locked read cycle referred to by the letter C. At a time T456, the CPU 26 detects the E_RTRY* signal asserted low and aborts its cycle. The ELIP* signal is not asserted since the E_RTRY* signal has priority over the LE-RTRY* signal. The EISA bus master completes its EISA cycle approximately by a time T460 and the DHLDA signal is negated low at a time T462 while the LE_RTRY* signal is negated high. One HCLK period later at a time T464, the START* signal is asserted low to complete the EISA write cycle B which was previously posted to the EISA bus 36, and cycle B completes at approximately the time T478 when the CMD* signal is negated high.

Figure 15:
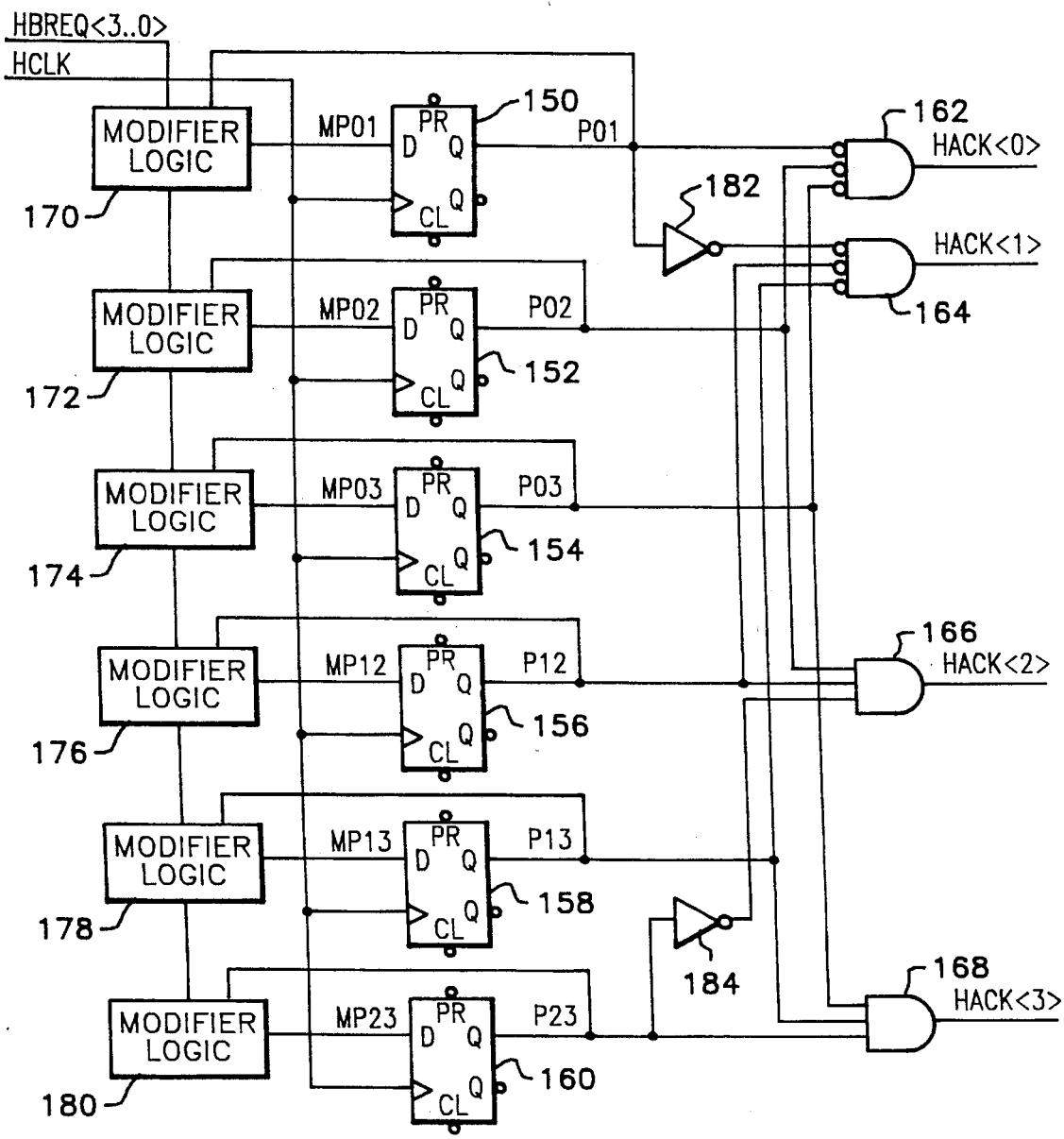
FIG. 15 is a schematic diagram illustrating a first-in-first-out prioritization scheme according to the present invention.

Another prioritizer is shown in FIG. 15 which is a first-in-first-out (FIFO) prioritizer. Again, in FIG. 15, identical elements retain the identical reference numerals. The modifier logic blocks 170–180 are connected in a similar manner as shown in FIG. 12 to the two corresponding HBREQ<n> signals, and also to the corresponding priority bit signals $P_{01}$–$P_{23}$. The output signals $MP_{01}$–$MP_{23}$ of the modifier blocks 170–180, however, are connected directly to the D inputs of the flip-flops 150–160, respectively. The outputs of the D flip-flops 150–160 are, again, the priority bit signals $P_{01}$–$P_{23}$ as shown in FIGS. 10 and 11. The clock inputs of the flip-flops 150–160 are connected to the HCLK signal. The input of the inverter 182 is connected to the $P_{01}$ signal and its output is connected to one input of the three input NOR gate 164. The input of the inverter 184 is connected to the $P_{23}$ signal and its output is connected to one input of the three-input AND gate 166. The three inputs of the three input NOR gate 162 are connected to the $P_{01}$, $P_{02}$ and $P_{03}$ signals, respectively, and its output is the HACK<0> signal. The other two inputs of the NOR gate 164 are connected to the $P_{12}$ and $P_{13}$ signals, respectively, and its output is the HACK<1> signal. The other two inputs of AND gate 166 are connected to the $P_{02}$ and $P_{12}$ signals, and its output is the HACK<2> signal. The three inputs of the three input AND gate 168 are connected to the $P_{03}$, $P_{13}$ and $P_{23}$ signals, and its output is the HACK<3> signal.

The modifier blocks 170–180 are preferably the same as the logic blocks shown in FIG. 12. Either of the modifier equations defined previously could be used to implement the logic within the logic blocks 170–180. The second modifier equation is preferable since it allows for a more efficient electronic circuit implementation. The FIFO prioritizer shown in FIG. 15 works as a regular FIFO such that any time a given element is used, its priority changes to the lowest priority. Also, any time that an element does not request priority, it will not gain priority. For instance, if element 0 never requests priority by asserting the HBREQ<0> signal true, then the HACK<0> signal will never become true.

If the FIFO scheme of FIG. 15 were used as the prioritizer 64 of FIG. 1, it would work similarly as the modified true-LRU scheme of FIG. 12, although additional logic would not be required to define the WAYn_USED signals and the UPDATExy clock signals. Only the HCLK signal and the HBREQ<n>* request signals residing on the host bus 20 would be required. When arbitration occurs, the new bus master would have to be forced to the bottom of the stack for at least one HCLK period to allow other masters to get to the top of the stack if they are also requesting. In other words, the new bus master may not assert its HBREQ<n>* signal for at least one HCLK period after it loses bus mastership since otherwise it would remain on top of the FIFO and never lose bus mastership. If only the current master is requesting, due to the first come-first-served nature of the prioritizer, the highest priority would again be given to the current bus master. When this master does not need the host bus 20 and another bus master is requesting, then the current master must negate its HBREQ<n>* signal high to allow lower priority devices to be raised to the highest priority. This requirement keeps masters from being granted control of the host bus 20 more than their fair share of the time.

A brief summary of the preferred embodiment of the present invention will now be presented. Referring again to the preferred embodiment of the present invention as shown in FIG. 1, the computer system S includes multiple CPUs 22–28 which are coupled to the host bus 20. The host bus 20 includes an HBREQ<n>* request signal and an HACK<n>* acknowledge signal for each of the CPUs 22–28, as well as the HBUSY* bus busy signal. A CPU requiring control of the host bus 20 asserts its request signal and assumes control of the host bus 20 when its HACK<n>* acknowledge signal is asserted and the HBUSY* signal is negated. The CPU then asserts the HBUSY* signal and retains control until it is through using the host bus 20, at which time it de-asserts the HBUSY* signal so that another CPU can take control of the host bus 20.

The prioritizer 64 monitors the request signals and the HBUSY* signal, and provides the HACK<n>* acknowledge signals. The prioritizer 64 is implemented with one of the prioritization schemes according to the present invention. It receives the HBREQ<n>* request signals and the HBUSY* signal, prioritizes according to one of the LRU schemes or the FIFO scheme disclosed herein, and asserts one of the HACK<n>* acknowledge signals indicating which one of the CPUs 22–28 is the next bus master of the host bus 20. The current bus master of the host bus 20 determines when arbitration occurs where control is transferred to another bus master as indicated by the HBUSY* signal. When the current bus master is finished with the host bus 20, it negates the HBUSY* signal. The prioritizer 64 detects the negation of the HBUSY* signal and freezes the HACK<n>* acknowledge signals until the HBUSY* signal is asserted again.

Pipelining is supported where the next bus master may initiate its cycle before the current bus master has completed its cycle. Pipelined rearbitration may also occur which provides an efficient transfer of control of the host bus 20 from one bus master to the next without incurring wait states or idle transfers.

The presence of the EHM 66 does not disturb the relative priorities of the CPUs 22–28, but requires higher priority. The prioritizer 64 gives the EHM 66 higher priority unless one of the CPUs 22–28 is a temporary bus master performing a write-back cache intervention cycle. Temporary bus masters are given the highest priority. The CPUs 22–28 may be implemented to keep their HBREQ<n>* request signals asserted until it detects its HACK<n>* acknowledge signal negated or until the CPU arbitrates the host bus 20 to another bus master depending upon which of the modifier equations disclosed above are used.

The E_RTRY* signal prevents a CPU cycle from being posted if the address posting buffers within the SDB 40 are full. The LE_RTRY* signal allows non-locked cycles to be posted, but prevents a CPU locked cycle from being posted while the EISA bus 36 is owned by a master other than a CPU. If a CPU attempts to perform a locked EISA cycle on the EISA bus 36 when the EBC 38 is not available, one of the ELIPn reservation bits are set within the prioritizer 64 to reserve the EISA bus 36 and the EBC 38 for the aborted CPU when they are next available. The prioritizer 64 also asserts the ELIP* signal to indicate the reservation to the EBC 38, and the EBC 38 asserts the E_RTRY* signal to prevent a non-locked cycle from being posted. Once the EISA bus 36 is available, the prioritizer 64 grants the host bus 20 to the aborted CPU, overriding normal priority, and the reservation is cleared.

Split transactions are supported so that a CPU posting a read to the EISA bus 36 can arbitrate the host bus 20 to another CPU if requesting it. The waiting CPU need not arbitrate for the host bus 20 when the data is available since the data is asserted on the host data bus when idle even though another device has control of the host bus 20. The waiting CPU reads the data when the HDREQ* signal is negated high after previously being asserted low by the EBC 38.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A computer system, comprising:

a system bus including a busy line, a plurality of request lines and a plurality of acknowledge lines;

a plurality of microprocessors coupled to said system bus, said plurality of microprocessors numbering n, each said microprocessor including means for providing a request signal on a corresponding one of said system bus request lines, means for detecting an acknowledge signal on a corresponding one of said system bus acknowledge lines, and means for detecting and providing a busy signal on said system busy line; and a prioritizer coupled to said system bus for receiving said request signals, for receiving said busy signal and providing said acknowledge signals, said prioritizer prioritizing between said plurality of microprocessors based on said received request signals, providing said acknowledge signals on said system bus acknowledge lines wherein only one acknowledge signal is provided at a time on one of said acknowledge lines corresponding to said microprocessor having the highest priority, said prioritizer further including:

means for providing a plurality of bus control signals, each said bus control signal indicating whether a corresponding microprocessor has control of said system bus;

a plurality of relative priority storage means, each said relative priority storage means corresponding to a unique pair of said plurality of microprocessors, each said unique pair being formed by combining a first microprocessor with a second microprocessor, each microprocessor being paired n–1 times, each microprocessor combining with a different microprocessor, each said relative priority storage means for providing a relative priority signal indicative of the relative priority between said microprocessors of said corresponding unique pair, each said relative priority storage means receiving said bus control signal corresponding to the first said microprocessor of said unique pair, each said relative priority storage means including an update input receiving an update signal for indicating that said value of said microprocessor bus control signal is to be stored, said stored value indicating the relative priority between said microprocessors of said corresponding unique pair;

means receiving the plurality of microprocessor bus control signals for providing an update signal to a particular relative priority storage means storage update input when either of said microprocessors corresponding to said unique pair of microprocessors of said particular relative priority storage means has had control of said system bus; and means receiving all of said relative priority signals for combining said relative priority signals relating to each individual microprocessor and for indicating that a particular microprocessor has the highest priority of all of said plurality of microprocessors if all of said relative priority signals for said particular microprocessor indicate said particular microprocessor has priority relative to the other microprocessor of said unique pair, wherein each of said plurality of relative priority storage means further receives the request signals corresponding to the particular microprocessors of said unique pair and provides an output signal indicative of said stored value and further includes a passing and inverting means receiving said stored value output signal and said corresponding request signals and providing said relative priority signal for passing said stored value output signal as said relative priority signal if said stored value output signal indicates a particular microprocessor and said particular microprocessor request signal is provided and for inverting said stored value output signal and providing said inverted signal as said relative priority signal if said stored value output signal indicates a particular microprocessor, said particular microprocessor request signal is not provided and said other microprocessor request signal is provided and wherein said microprocessor means for detecting and providing a busy signal removes said busy signal when said microprocessor releases control of said bus and provides said busy signal when said acknowledge line for said microprocessor is provided and said bus signal is removed.

2. The computer system of claim 1, wherein said passing and inverting means further passes said stored value output signal as said relative priority signal if neither of said request signals from said corresponding microprocessors are provided.

3. The computer system of claim 1, wherein said passing and inverting means further inverts said stored value output signal and provides said inverted signal as said relative priority signal if neither of said request signals from said corresponding microprocessors are provided.

4. A computer system, comprising:

a system bus including a busy line, a plurality of request lines and a plurality of acknowledge lines;

a plurality of microprocessors coupled to said system bus, said plurality of microprocessors numbering n, each said microprocessor including means for providing a request signal on a corresponding one of said system bus request lines, means for detecting an acknowledge signal on a corresponding one of said system bus acknowledge lines, and means for detecting and providing a busy signal on said system busy line; and a prioritizer coupled to said system bus for receiving said request signals, for receiving said busy signal and providing said acknowledge signals, said prioritizer prioritizing between said plurality of microprocessors based on said received request signals, providing said acknowledge signals on said system bus acknowledge lines wherein only one acknowledge signal is provided at a time on one of said acknowledge lines corresponding to said microprocessor having the highest priority, said prioritizer further including:

means for providing a plurality of bus control signals, each said bus control signal indicating whether a corresponding microprocessor has control of said system bus;

a plurality of relative priority storage means, each said relative priority storage means corresponding to a unique pair of said plurality of microprocessors, each said unique pair being formed by combining a first microprocessor with a second microprocessor, each microprocessor being paired n–1 times, each microprocessor combining with a different microprocessor, each said relative priority storage means providing a relative priority signal indicative of the relative priority between said microprocessors of said unique pair, each said relative priority storage means having a storage input;

means receiving all of said relative priority signals for combining said relative priority signals relating to each individual microprocessor and for indicating that a particular microprocessor has the highest priority of all of said plurality of microprocessors if all said relative priority signals for said particular microprocessor indicate said particular microprocessor has priority relative to the other microprocessor of said unique pair; and a plurality of passing and inverting means receiving said request signals and said relative priority signals, each said passing and inverting means corresponding to a particular said relative priority storage means, each said passing and inverting means receiving the request signals corresponding to the particular microprocessors in the unique pair of said corresponding relative priority storage means and the relative priority signal from said corresponding relative priority storage means, each said passing and inverting means having a relative requested priority signal which is connected to said storage input of said corresponding relative priority storage means, each said passing and inverting means for passing said relative priority signal as said relative requested priority signal if said relative priority signal indicates a particular microprocessor and said particular microprocessor request signal is provided and for inverting said relative priority signal and providing said inverted signal as said relative requested priority signal if said relative priority signal indicates a particular microprocessor, said particular microprocessor request signal is not provided and said other microprocessor request signal is provided, wherein said microprocessor means for detecting and providing a busy signal removes said busy signal when said microprocessor releases control of said bus and provides said busy signal when said acknowledge line for said microprocessor is provided and said busy signal is removed.

5. The computer system of claim 4, wherein said passing and inverting means further passes said stored value output signal as said relative priority signal if neither of said request signals from said corresponding microprocessors are provided.

6. The computer system of claim 4, wherein said passing and inverting means further inverts said stored value output signal and provides said inverted signal as said relative priority signal if neither of said request signals from said corresponding microprocessors are provided.

7. A computer system, comprising:

a system bus including a data bus, an address bus, a busy line, a plurality of request lines and a plurality of acknowledge lines;

a plurality of microprocessors coupled to said system bus, said plurality of microprocessors numbering n, each said microprocessor including means for providing an address on said address bus, means for receiving and providing data on said data bus, means for providing a request signal on a corresponding one of said system bus request lines, means for detecting an acknowledge Signal on a corresponding one of said system bus acknowledge lines, and means for detecting and providing a busy signal on said system busy line; and a prioritizer coupled to said system bus for receiving said request signals, for receiving said busy signal and providing said acknowledge signals, said prioritizer prioritizing between said plurality of microprocessors based on said received request signals, providing said acknowledge signals on said system bus acknowledge lines wherein only one acknowledge signal is provided at a time on one of said acknowledge lines corresponding to said microprocessor having the highest priority, wherein said microprocessor means for detecting and providing a busy signal removes said busy signal when said microprocessor releases control of said bus and provides said busy signal when said acknowledge line for said microprocessor is provided and said busy signal is removed, and wherein a first microprocessor means for detecting and providing a busy signal removes said busy signal prior to completion of a data transfer cycle and said first microprocessor means for providing addresses removes said addresses prior to completion of said data cycle and a second microprocessor means for detecting and providing a busy signal provides said busy signal prior to completion of said data transfer cycle and said second microprocessor means for providing addresses provides addresses prior to completion of said data transfer cycle.

8. A computer system, comprising:

a system bus including a data bus, an address bust a backoff line, a busy line, a plurality of request lines and a plurality of acknowledge lines;

a plurality of microprocessors coupled to said system bus, said plurality of microprocessors numbering n, each said microprocessor including means for providing an address on said address bus, means for receiving and providing data on said data bus, means for providing a request signal on a corresponding one of said system bus request lines, means for detecting an acknowledge signal on a corresponding one of said system bus acknowledge lines, and means for detecting and providing a busy signal on said system busy line, and a prioritizer coupled to said system bus for receiving said request signals, for receiving said busy signal and providing said acknowledge signals, said prioritizer prioritizing between said plurality of microprocessors based on said received request signals, providing said acknowledge signals on said system bus acknowledge lines wherein only one acknowledge signal is provided at a time on one of said acknowledge lines corresponding to said microprocessor having the highest priority, wherein said microprocessor means for detecting and providing a busy signal removes said busy signal when said microprocessor releases control of said bus and provides said busy signal when said acknowledge line for said microprocessor is provided and said busy signal is removed;

wherein at least one microprocessor further includes means for providing a backoff signal to said backoff line to indicate need for temporary control; and wherein a first microprocessor means for providing an address and means for providing data receive said backoff signal and cease providing an address and data while said backoff signal is provided and said first microprocessor means for detecting and providing a busy signal continues to provide said busy signal while said backoff signal is provided.

9. A computer system, comprising:

a system bus including a busy line, a plurality of request lines, a plurality of acknowledge lines, a data bus, an address bus, a ready line, a data bus request line and a read-write line;

an I/O bus;

a device coupled to said I/O bus;

a plurality of microprocessors coupled to said system bus, said plurality of microprocessors numbering n, each said microprocessor including means for providing a request signal on a corresponding one of said system bus request lines, means for detecting an acknowledge signal on a corresponding one of said system bus acknowledge lines, and means for detecting and providing a busy signal on said system busy line, each said microprocessor including means for initiating a read cycle which is posted by providing an address on said address bus for selecting said device coupled to said I/O bus and providing a read signal on said read-write line and receiving a ready signal, wherein each said microprocessor releases control of said system bus after receiving said ready signal and retrieves data from said data bus when a data bus request signal is negated after being asserted on said data bus request line while another of said plurality of microprocessors is in control of said system bus;

a prioritizer coupled to said system bus for receiving said request signals, for receiving said busy signal and providing said acknowledge signals, said prioritizer prioritizing between said plurality of microprocessors based on said received request signals, providing said acknowledge signals on said system bus acknowledge lines wherein only one acknowledge signal is provided at a time on one of said acknowledge lines corresponding to said microprocessor having the highest priority wherein said microprocessor means for detecting and providing a busy signal removes said busy signal when said microprocessor releases control of said bus and provides said busy signal when said acknowledge line for said microprocessor is provided and said busy signal is removed; and an I/O bus controller means coupled to said system bus and said I/O bus, said I/O bus controller means comprising:

means for posting a read cycle on said system bus to said I/O bus, wherein said posting means receives said address on said address bus for selecting said device coupled to said I/O bus and further receives said read signal on said read-write line, wherein said posting means provides said ready signal on said ready line in response to posting said read cycle;

means coupled to said read cycle posting means and said I/O bus for providing said posted address and read signal to said I/O bus and controlling a read cycle on said I/O bus to perform the read operation of said device;

means coupled to said I/O bus for retrieving said data from said device coupled to said I/O bus in response to said read cycle being performed by said device;

means for determining when said data bus is idle and for providing an idle signal when said data bus is idle; and means receiving said idle signal for providing said data from said device coupled to said I/O bus to said data bus, wherein said providing means includes means for asserting said data bus request signal on said data bus request line after said read cycle is posted by said read cycle posting means and before said idle signal is received and for asserting said data on said data bus and negating said data bus request signal when said idle signal is received.

* * * * *

UNITED STATES PATENT AND TRADEMARK OFFICE
CERTIFICATE OF CORRECTION

PATENT NO. : 5,553,310
DATED : SEPTEMBER 3, 1996
INVENTOR(S) : Mark Taylor, Paul R. Culley, Maria L. Melo & Roger E. Tipley It is certified that error appears in the above-identified patent and that said Letters Patent is hereby corrected as shown below:

Col. 45 claim 7, line 35 the word "Signal" should be in lower case.

Col. 45 claim 8, line 65 the word "bust" should be "bus" and add a comma "," after the word bus.

Signed and Sealed this

Third Day of December, 1996

Attest:

BRUCE LEHMAN

Attesting Officer

Commissioner of Patents and Trademarks